US009317185B2

(12) United States Patent
Martin et al.

(10) Patent No.: US 9,317,185 B2
(45) Date of Patent: Apr. 19, 2016

(54) DYNAMIC INTERACTIVE ENTERTAINMENT VENUE

(71) Applicant: Apple Inc., Cupertino, CA (US)

(72) Inventors: Francisco J. Martin, Corvallis, OR (US); Jim Shur, Corvallis, OR (US); Marc Torrens, Corvallis, OR (US); Rick Hangartner, Corvallis, OR (US); Guillermo Caudevilla-Laliena, Corvallis, OR (US); David del Ser Bartolome, Corvallis, OR (US); Craig Rowley, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/261,340

(22) Filed: Apr. 24, 2014

(65) Prior Publication Data
US 2014/0237361 A1 Aug. 21, 2014

Related U.S. Application Data

(63) Continuation of application No. 12/278,148, filed as application No. PCT/US2006/034218 on Aug. 31, 2006, now abandoned.

(60) Provisional application No. 60/796,724, filed on May 1, 2006, provisional application No. 60/774,072, filed on Feb. 15, 2006, provisional application No. 60/772,502, filed on Feb. 10, 2006.

(51) Int. Cl.
*G06F 3/0482* (2013.01)
*G06F 17/30* (2006.01)
(Continued)

(52) U.S. Cl.
CPC ........ *G06F 3/0482* (2013.01); *G06F 17/30035* (2013.01); *G06F 17/30053* (2013.01);
(Continued)

(58) Field of Classification Search
CPC ............ G06F 3/0482; G06F 17/30035; G06F 17/30053
See application file for complete search history.

(56) References Cited

U.S. PATENT DOCUMENTS

| 4,996,642 A | 2/1991 | Hey |
| 5,355,302 A | 10/1994 | Martin |

(Continued)

FOREIGN PATENT DOCUMENTS

| EP | 1 050 833 | 8/2000 |
| EP | 1050833 | 8/2000 |

(Continued)

OTHER PUBLICATIONS

IEEE, no matched results, Nov. 11, 2009, 1 page.
(Continued)

*Primary Examiner* — Usmaan Saeed
*Assistant Examiner* — Paul Kim
(74) *Attorney, Agent, or Firm* — Novak Druce Connolly Bove + Quigg LLP

(57) ABSTRACT

Disclosed are various embodiments of systems and methods for generating composite mediasets from mediasets, each comprising media items, associated with a plurality of users. In some embodiments, individual and/or group recommendations are provided for creating a group playlist by aggregating user taste data for a plurality of users in a group. In other embodiments, systems and methods are provided which allow for sharing and playing of a group playlist by users in a group, each of which has a media playback device. In still other embodiments, systems and methods are provided for dynamically building a composite playlist that may be updated as users enter and/or leave the group. One example of an interactive entertainment application also is described for use at a venue to entertain live guests with music selections that are dynamically influenced by the guests' individual tastes.

24 Claims, 34 Drawing Sheets

Aggregating individual recommended mediasets into a recommended mediaset suitable for the whole group of users.

(51) Int. Cl.
*G11B 27/10* (2006.01)
*H04N 21/262* (2011.01)
*H04N 21/466* (2011.01)
*H04N 21/482* (2011.01)

(52) U.S. Cl.
CPC ........ *G11B27/105* (2013.01); *H04N 21/26258* (2013.01); *H04N 21/4668* (2013.01); *H04N 21/4826* (2013.01)

(56) References Cited

U.S. PATENT DOCUMENTS

| | | |
|---|---|---|
| 5,375,235 A | 12/1994 | Berry |
| 5,464,946 A | 11/1995 | Lewis |
| 5,483,278 A | 1/1996 | Strubbe |
| 5,583,763 A | 12/1996 | Atcheson |
| 5,724,521 A | 3/1998 | Dedrick |
| 5,749,081 A | 5/1998 | Whiteis |
| 5,754,939 A | 5/1998 | Herz |
| 5,758,257 A | 5/1998 | Herz |
| 5,765,144 A | 6/1998 | Larche |
| 5,890,152 A | 3/1999 | Rapaport |
| 5,918,014 A | 6/1999 | Robinson |
| 5,926,624 A | 7/1999 | Katz et al. |
| 5,950,176 A | 9/1999 | Keiser |
| 6,000,044 A | 12/1999 | Chrysos |
| 6,041,311 A | 3/2000 | Chislenko et al. |
| 6,047,311 A | 4/2000 | Ueno |
| 6,112,186 A | 8/2000 | Bergh |
| 6,134,532 A | 10/2000 | Lazarus |
| 6,345,288 B1 | 2/2002 | Reed |
| 6,346,951 B1 | 2/2002 | Mastronardi |
| 6,347,313 B1 | 2/2002 | Ma |
| 6,349,339 B1 | 2/2002 | Williams |
| 6,381,575 B1 | 4/2002 | Martin |
| 6,430,539 B1 | 8/2002 | Lazarus |
| 6,434,621 B1 | 8/2002 | Pezzillo |
| 6,438,579 B1 | 8/2002 | Hosken |
| 6,457,018 B1 | 9/2002 | Rubin |
| 6,487,539 B1 | 11/2002 | Aggarwal |
| 6,526,411 B1 | 2/2003 | Ward |
| 6,532,469 B1 | 3/2003 | Feldman |
| 6,577,716 B1 | 6/2003 | Minter |
| 6,587,127 B1 | 7/2003 | Leeke |
| 6,615,208 B1 | 9/2003 | Behrens |
| 6,647,371 B2 | 11/2003 | Shinohara |
| 6,687,696 B2 | 2/2004 | Hofmann |
| 6,690,918 B2 | 2/2004 | Evans |
| 6,704,576 B1 | 3/2004 | Brachman |
| 6,727,914 B1 | 4/2004 | Gutta |
| 6,748,395 B1 | 6/2004 | Picker |
| 6,751,574 B2 | 6/2004 | Shinohara |
| 6,785,688 B2 | 8/2004 | Abajian |
| 6,842,761 B2 | 1/2005 | Diamond |
| 6,850,252 B1 | 2/2005 | Hoffberg |
| 6,914,891 B2 | 7/2005 | Ha |
| 6,931,454 B2 | 8/2005 | Deshpande |
| 6,933,433 B1 | 8/2005 | Porteus |
| 6,941,324 B2 | 9/2005 | Plastina |
| 6,947,922 B1 | 9/2005 | Glance |
| 6,950,804 B2 | 9/2005 | Strietzel |
| 6,987,221 B2 | 1/2006 | Platt |
| 6,990,497 B2 | 1/2006 | O'Rourke |
| 6,993,532 B1 | 1/2006 | Platt |
| 7,013,238 B1 | 3/2006 | Weare |
| 7,020,637 B2 | 3/2006 | Bratton |
| 7,021,836 B2 | 4/2006 | Anderson et al. |
| 7,043,479 B2 | 5/2006 | Ireton |
| 7,051,352 B1 | 5/2006 | Schaffer |
| 7,072,846 B1 | 7/2006 | Robinson |
| 7,082,407 B1 | 7/2006 | Bezos |
| 7,096,234 B2 | 8/2006 | Plastina |
| 7,111,240 B2 | 9/2006 | Crow |
| 7,113,917 B2 | 9/2006 | Jacobi |
| 7,113,999 B2 | 9/2006 | Pestoni |
| 7,120,619 B2 | 10/2006 | Drucker |
| 7,127,143 B2 | 10/2006 | Elkins, II |
| 7,136,866 B2 | 11/2006 | Springer, Jr. |
| 7,139,723 B2 | 11/2006 | Conkwright |
| 7,174,126 B2 | 2/2007 | McElhatten |
| 7,180,473 B2 | 2/2007 | Horie |
| 7,194,421 B2 | 3/2007 | Conkwright |
| 7,196,258 B2 | 3/2007 | Platt |
| 7,197,472 B2 | 3/2007 | Conkwright |
| 7,224,282 B2 | 5/2007 | Terauchi |
| 7,227,072 B1 | 6/2007 | Weare |
| 7,236,941 B2 | 6/2007 | Conkwright |
| 7,246,041 B2 | 7/2007 | Fukuda |
| 7,256,341 B2 | 8/2007 | Plastina |
| 7,277,870 B2 | 10/2007 | Mourad et al. |
| 7,302,419 B2 | 11/2007 | Conkwright |
| 7,302,468 B2 | 11/2007 | Wijeratne |
| 7,358,434 B2 | 4/2008 | Plastina |
| 7,363,314 B2 | 4/2008 | Picker |
| 7,392,212 B2 | 6/2008 | Hancock |
| 7,403,769 B2 | 7/2008 | Kopra |
| 7,415,181 B2 | 8/2008 | Greenwood |
| 7,434,247 B2 | 10/2008 | Dudkiewicz |
| 7,457,852 B2 | 11/2008 | O'Rourke et al. |
| 7,457,862 B2 | 11/2008 | Hepworth |
| 7,478,323 B2 | 1/2009 | Dowdy |
| 7,487,107 B2 | 2/2009 | Blanchard et al. |
| 7,490,775 B2 | 2/2009 | Biderman |
| 7,493,572 B2 | 2/2009 | Card |
| 7,499,630 B2 | 3/2009 | Koch et al. |
| 7,505,959 B2 | 3/2009 | Kaiser |
| 7,546,254 B2 | 6/2009 | Bednarek |
| 7,568,213 B2 | 7/2009 | Carhart |
| 7,571,121 B2 | 8/2009 | Bezos |
| 7,571,183 B2 | 8/2009 | Renshaw et al. |
| 7,574,422 B2 | 8/2009 | Guan et al. |
| 7,574,513 B2 | 8/2009 | Dunning |
| 7,580,932 B2 | 8/2009 | Plastina |
| 7,599,847 B2 | 10/2009 | Block et al. |
| 7,599,906 B2 | 10/2009 | Kashiwagi |
| 7,599,950 B2 | 10/2009 | Walther |
| 7,644,077 B2 | 1/2010 | Picker |
| 7,647,613 B2 | 1/2010 | Darkoulis |
| 7,650,570 B2 | 1/2010 | Torrens et al. |
| 7,657,224 B2 | 2/2010 | Goldberg |
| 7,657,493 B2 | 2/2010 | Meijer |
| 7,680,849 B2 | 3/2010 | Heller |
| 7,680,959 B2 | 3/2010 | Svendsen |
| 7,685,204 B2 | 3/2010 | Rogers |
| 7,693,887 B2 | 4/2010 | McLaughlin |
| 7,707,603 B2 | 4/2010 | Abanami |
| 7,720,871 B2 | 5/2010 | Rogers |
| 7,725,494 B2 | 5/2010 | Rogers |
| 7,734,569 B2 | 6/2010 | Martin |
| 7,743,009 B2 | 6/2010 | Hangartner |
| 7,797,321 B2 | 9/2010 | Martin |
| 7,797,446 B2 | 9/2010 | Heller et al. |
| 7,826,444 B2 | 11/2010 | Irvin |
| 7,831,199 B2 | 11/2010 | Ng |
| 7,840,570 B2 | 11/2010 | Cervera et al. |
| 7,853,712 B2 | 12/2010 | Amidon |
| 7,875,788 B2 | 1/2011 | Benyamin |
| 7,889,724 B2 | 2/2011 | Irvin |
| 8,260,656 B1 * | 9/2012 | Harbick et al. ............ 705/7.31 |
| 2001/0007099 A1 | 7/2001 | Rau |
| 2001/0021914 A1 | 9/2001 | Jacobi et al. |
| 2001/0056434 A1 | 12/2001 | Kaplan |
| 2002/0002899 A1 | 1/2002 | Gjerdingen |
| 2002/0042912 A1 | 4/2002 | Iijima |
| 2002/0059094 A1 | 5/2002 | Hosea et al. |
| 2002/0082901 A1 | 6/2002 | Dunning |
| 2002/0087970 A1 | 7/2002 | Dorricott et al. |
| 2002/0152117 A1 | 10/2002 | Cristofalo |
| 2002/0164973 A1 | 11/2002 | Janik et al. |
| 2002/0178223 A1 | 11/2002 | Bushkin |
| 2002/0178276 A1 | 11/2002 | McCartney |
| 2002/0194215 A1 | 12/2002 | Cantrell |
| 2002/0194309 A1 | 12/2002 | Carter et al. |
| 2003/0022953 A1 | 1/2003 | Zampini et al. |

(56) References Cited

U.S. PATENT DOCUMENTS

| | | |
|---|---|---|
| 2003/0033321 A1 | 2/2003 | Schrempp |
| 2003/0055689 A1 | 3/2003 | Block |
| 2003/0089218 A1 | 5/2003 | Gang et al. |
| 2003/0097379 A1 | 5/2003 | Ireton |
| 2003/0120630 A1 | 6/2003 | Tunkelang |
| 2003/0182254 A1 | 9/2003 | Plastina et al. |
| 2003/0212710 A1 | 11/2003 | Guy |
| 2003/0229537 A1 | 12/2003 | Dunning |
| 2004/0002993 A1 | 1/2004 | Toussaint |
| 2004/0003392 A1 | 1/2004 | Trajkovic |
| 2004/0068552 A1 | 4/2004 | Kotz |
| 2004/0070538 A1 | 4/2004 | Horie et al. |
| 2004/0073924 A1 | 4/2004 | Pendakur |
| 2004/0078383 A1 | 4/2004 | Mercer et al. |
| 2004/0128286 A1 | 7/2004 | Yasushi et al. |
| 2004/0139064 A1 | 7/2004 | Chevallier |
| 2004/0148424 A1 | 7/2004 | Berkson |
| 2004/0158860 A1 | 8/2004 | Crow |
| 2004/0162738 A1 | 8/2004 | Sanders |
| 2004/0186780 A1* | 9/2004 | Short et al. ............... 705/14 |
| 2004/0194128 A1 | 9/2004 | McIntyre |
| 2004/0215657 A1 | 10/2004 | Drucker et al. |
| 2004/0263337 A1 | 12/2004 | Terauchi et al. |
| 2004/0267715 A1 | 12/2004 | Polson et al. |
| 2005/0005246 A1 | 1/2005 | Card et al. |
| 2005/0021470 A1 | 1/2005 | Martin et al. |
| 2005/0050079 A1 | 3/2005 | Plastina et al. |
| 2005/0060350 A1 | 3/2005 | Baum et al. |
| 2005/0075908 A1 | 4/2005 | Stevens |
| 2005/0091146 A1 | 4/2005 | Levinson |
| 2005/0102610 A1 | 5/2005 | Jie |
| 2005/0114357 A1 | 5/2005 | Chengalvarayan |
| 2005/0131752 A1 | 6/2005 | Gracie |
| 2005/0141709 A1 | 6/2005 | Bratton |
| 2005/0154608 A1 | 7/2005 | Paulson |
| 2005/0160458 A1 | 7/2005 | Baumgartner |
| 2005/0193014 A1 | 9/2005 | Prince |
| 2005/0193054 A1 | 9/2005 | Wilson |
| 2005/0195696 A1 | 9/2005 | Rekimoto |
| 2005/0198075 A1 | 9/2005 | Plastina et al. |
| 2005/0203807 A1 | 9/2005 | Bezos et al. |
| 2005/0210009 A1 | 9/2005 | Tran |
| 2005/0210101 A1 | 9/2005 | Janik |
| 2005/0216855 A1 | 9/2005 | Kopra |
| 2005/0216859 A1 | 9/2005 | Paek et al. |
| 2005/0222989 A1 | 10/2005 | Haveliwala |
| 2005/0223039 A1 | 10/2005 | Kim |
| 2005/0234891 A1 | 10/2005 | Walther |
| 2005/0235811 A1 | 10/2005 | Dukane |
| 2005/0251440 A1 | 11/2005 | Bednarek |
| 2005/0256764 A1 | 11/2005 | Beaumont et al. |
| 2005/0256867 A1 | 11/2005 | Walther |
| 2005/0276570 A1 | 12/2005 | Reed |
| 2006/0015571 A1 | 1/2006 | Fukuda |
| 2006/0015904 A1 | 1/2006 | Marcus |
| 2006/0018208 A1 | 1/2006 | Nathan |
| 2006/0018209 A1 | 1/2006 | Darkoulis |
| 2006/0020062 A1 | 1/2006 | Bloom |
| 2006/0020662 A1 | 1/2006 | Robinson |
| 2006/0026263 A1 | 2/2006 | Raghaven |
| 2006/0031288 A1 | 2/2006 | Ter Horst et al. |
| 2006/0032363 A1 | 2/2006 | Platt |
| 2006/0053077 A1 | 3/2006 | Mourad |
| 2006/0062094 A1 | 3/2006 | Nathan et al. |
| 2006/0067296 A1 | 3/2006 | Bershad |
| 2006/0074750 A1 | 4/2006 | Clark |
| 2006/0080251 A1 | 4/2006 | Fried |
| 2006/0080356 A1 | 4/2006 | Burges |
| 2006/0091203 A1 | 5/2006 | Bakker |
| 2006/0095516 A1* | 5/2006 | Wijeratne ............... 709/205 |
| 2006/0100978 A1 | 5/2006 | Heller |
| 2006/0107823 A1 | 5/2006 | Platt et al. |
| 2006/0112098 A1 | 5/2006 | Renshaw |
| 2006/0123052 A1 | 6/2006 | Robbin |
| 2006/0136344 A1 | 6/2006 | Jones |
| 2006/0143236 A1 | 6/2006 | Wu |
| 2006/0156239 A1 | 7/2006 | Jobs et al. |
| 2006/0165571 A1 | 7/2006 | Seon et al. |
| 2006/0168616 A1 | 7/2006 | Candelore |
| 2006/0173910 A1 | 8/2006 | McLaughlin |
| 2006/0173916 A1 | 8/2006 | Verbeck |
| 2006/0174008 A1 | 8/2006 | Abanami |
| 2006/0195462 A1 | 8/2006 | Rogers |
| 2006/0195512 A1 | 8/2006 | Rogers et al. |
| 2006/0195513 A1 | 8/2006 | Rogers et al. |
| 2006/0195514 A1 | 8/2006 | Rogers et al. |
| 2006/0195515 A1* | 8/2006 | Beaupre et al. ............... 709/203 |
| 2006/0195516 A1 | 8/2006 | Beaupre |
| 2006/0195521 A1 | 8/2006 | New |
| 2006/0195581 A1 | 8/2006 | Vaman et al. |
| 2006/0195789 A1* | 8/2006 | Rogers et al. ............... 715/727 |
| 2006/0195790 A1 | 8/2006 | Beaupre et al. |
| 2006/0206478 A1 | 9/2006 | Glaser |
| 2006/0253874 A1 | 11/2006 | Stark |
| 2006/0265421 A1 | 11/2006 | Ranasinghe |
| 2006/0277098 A1 | 12/2006 | Chung |
| 2006/0282304 A1 | 12/2006 | Bedard et al. |
| 2006/0282311 A1 | 12/2006 | Jiang |
| 2006/0288044 A1 | 12/2006 | Kashiwagi |
| 2006/0288367 A1 | 12/2006 | Swix |
| 2007/0016507 A1 | 1/2007 | Tzara |
| 2007/0043829 A1 | 2/2007 | Dua |
| 2007/0073596 A1 | 3/2007 | Alexander |
| 2007/0100690 A1 | 5/2007 | Hopkins |
| 2007/0101373 A1 | 5/2007 | Modlanender |
| 2007/0118546 A1 | 5/2007 | Acharya |
| 2007/0136264 A1 | 6/2007 | Tran |
| 2007/0156677 A1 | 7/2007 | Szabo |
| 2007/0156732 A1 | 7/2007 | Surendran et al. |
| 2007/0161402 A1 | 7/2007 | Ng |
| 2007/0162546 A1 | 7/2007 | McLaughlin |
| 2007/0203790 A1 | 8/2007 | Torrens |
| 2007/0244880 A1 | 10/2007 | Martin |
| 2007/0250429 A1 | 10/2007 | Walser |
| 2007/0250761 A1 | 10/2007 | Bradley |
| 2007/0265979 A1 | 11/2007 | Hangartner |
| 2007/0271286 A1 | 11/2007 | Purang |
| 2007/0271287 A1 | 11/2007 | Acharya et al. |
| 2007/0282848 A1 | 12/2007 | Kiilerich et al. |
| 2007/0294096 A1 | 12/2007 | Randall |
| 2008/0004948 A1 | 1/2008 | Flake |
| 2008/0004990 A1 | 1/2008 | Flake |
| 2008/0021851 A1 | 1/2008 | Alcalde |
| 2008/0027881 A1 | 1/2008 | Bisse |
| 2008/0040326 A1 | 2/2008 | Chang et al. |
| 2008/0046317 A1 | 2/2008 | Christianson |
| 2008/0046389 A1 | 2/2008 | Cohen |
| 2008/0065659 A1 | 3/2008 | Watanabe et al. |
| 2008/0077264 A1 | 3/2008 | Irvin |
| 2008/0082467 A1 | 4/2008 | Meijer |
| 2008/0109378 A1 | 5/2008 | Papadimitriou |
| 2008/0120339 A1 | 5/2008 | Guan et al. |
| 2008/0133601 A1 | 6/2008 | Cerera |
| 2008/0154942 A1 | 6/2008 | Tsai et al. |
| 2008/0155057 A1 | 6/2008 | Khedouri |
| 2008/0155588 A1 | 6/2008 | Roberts |
| 2008/0195438 A1 | 8/2008 | Manfredi |
| 2008/0201226 A1 | 8/2008 | Carlson et al. |
| 2008/0215173 A1 | 9/2008 | Hicken |
| 2008/0220855 A1 | 9/2008 | Chen |
| 2008/0256106 A1 | 10/2008 | Whitman |
| 2008/0256378 A1 | 10/2008 | Guillorit |
| 2008/0270221 A1 | 10/2008 | Clemens |
| 2009/0006353 A1 | 1/2009 | Vignoli |
| 2009/0024504 A1 | 1/2009 | Lerman |
| 2009/0024510 A1 | 1/2009 | Chen |
| 2009/0048957 A1 | 2/2009 | Celano |
| 2009/0070267 A9 | 3/2009 | Hangartner |
| 2009/0073174 A1 | 3/2009 | Berg |
| 2009/0076939 A1 | 3/2009 | Berg |
| 2009/0076974 A1 | 3/2009 | Berg |
| 2009/0083307 A1 | 3/2009 | Cervera |
| 2009/0089222 A1 | 4/2009 | Ferreira |
| 2009/0106085 A1 | 4/2009 | Raimbeault |

(56) References Cited

U.S. PATENT DOCUMENTS

| | | |
|---|---|---|
| 2009/0125526 A1 | 5/2009 | Neufeld |
| 2009/0164641 A1 | 6/2009 | Rogers |
| 2009/0210415 A1 | 8/2009 | Martin |
| 2009/0276368 A1 | 11/2009 | Martin et al. |
| 2010/0161595 A1 | 6/2010 | Martin |
| 2010/0169328 A1 | 7/2010 | Hangartner |
| 2011/0060738 A1 | 3/2011 | Gates et al. |
| 2011/0119127 A1 | 5/2011 | Hangartner |

FOREIGN PATENT DOCUMENTS

| | | |
|---|---|---|
| EP | 1231788 | 8/2002 |
| EP | 1231788 A | 8/2002 |
| EP | 1420388 | 5/2004 |
| EP | 1 548 741 A1 | 6/2005 |
| EP | 1548741 | 6/2005 |
| JP | 11-052965 | 2/1999 |
| JP | 2002-108351 | 4/2002 |
| JP | 2002-320203 | 10/2002 |
| JP | 2003-255958 | 9/2003 |
| JP | 2003255958 A | 9/2003 |
| JP | 2004-221999 | 8/2004 |
| JP | 2005-027337 | 1/2005 |
| KR | 2002025579 | 4/2002 |
| WO | 03/036541 | 5/2003 |
| WO | WO 03/036541 A1 | 5/2003 |
| WO | 03/051051 | 6/2003 |
| WO | WO03051051 A1 | 6/2003 |
| WO | 2004/070538 | 8/2004 |
| WO | WO2004070538 | 8/2004 |
| WO | WO 2004/107757 | 12/2004 |
| WO | 2005/013114 | 2/2005 |
| WO | WO2005013114 A1 | 2/2005 |
| WO | WO 2005/106877 | 11/2005 |
| WO | 2005/115107 | 12/2005 |
| WO | WO 2005115107 A2 | 12/2005 |
| WO | 2006/052837 | 5/2006 |
| WO | WO2006052837 | 5/2006 |
| WO | 2006/075032 | 7/2006 |
| WO | WO2006075032 | 7/2006 |
| WO | 2006/034218 | 8/2006 |
| WO | 2006/114451 | 11/2006 |
| WO | WO2006114451 | 11/2006 |
| WO | 2007/038806 | 4/2007 |
| WO | WO 2007/038806 A3 | 4/2007 |
| WO | WO2007134193 | 5/2007 |
| WO | 2007/075622 | 7/2007 |
| WO | WO2007075622 | 7/2007 |
| WO | 2007/092053 | 8/2007 |
| WO | 2007/134193 | 11/2007 |
| WO | 2009/149046 | 12/2009 |
| WO | WO20090149046 A1 | 12/2009 |

OTHER PUBLICATIONS

PCTfES2005f00003 Written Opinion of the International Preliminary Examining Authority dated Mar. 19, 2007.
PCTfES2005f00003 Written Opinion of the International Searching Authority Report dated Jun. 10, 2005.
PCTfES2005f000213 International Preliminary Report on Patentability (Ch II) Report Dated Nov. 15, 2007.
www.ecastinc.com/music_licensing.html, Web Page, ECAST Network, interactive entertainment network, Music/ Licensing.
PCT/US2006/048330; International Bureau; PCT Search Report and Written Opinion; Mar. 20, 2008; 10 pages, Mar. 20, 2008, 10 pages.
"Communications of the ACM" Dec. 1992, vol. 35, No. 12 at pp. 26-28 (Introduction to special issue regarding Workshop on High Performance Information Filtering, Morristown, N.J. Nov. 1991), Dec. 1992, 26-28.
"Apple: iTunes 4.2 User Guide for Windows", Apple: iTunes 4.2 User Guide for Windows; Dec. 2003; retrieved from the internet: URL: http://www2.austin.cc.tx. us/tcm/projects/itunes.pdf; pp. 10, 17-19. (Added Ref Nov. 5, 2009), Dec. 2003.
"Architecting Personalized Delivery of Multimedia Information", "Architecting Personalized Delivery of Multimedia Information", Communications of the ACM (Dec. 1992), Dec. 1992.
"Digital Music Sales Triple to $1.1 Billion in 2005", Maintenance Fees, Feb. 24, 2006, Axcessnews.com,, available online www.axcessnews.com/modules/wfsection/article.php?articleid=8327, last viewed Feb. 24, 2006, Feb. 24, 2006.
"International Search Report and Written Opinion", for PCT application No. PCT/US2012/057660, dated Jan. 7, 2013, 28 pages.
"Lessons from LyricTimeTM: A Prototype Multimedia System", "Lessons from LyricTimeTM: A Prototype Multimedia System" 4th IEEE ComSoc International Workshop on Multimedia Communications (Apr. 1992), Apr. 1992.
"New Music Recommendation System is Based on FOAF Personal Profiling", "New Music Recommendation System is Based on FOAF Personal Profiling," www.masternewmedia.org/music_recommendation/music_recommendation_system_FOAF, Oct. 1, 2005., Oct. 1, 2005.
"Not Your Average Jukebox", www.alwayson-network.com/comments.php?id=P12663 0 37 0 C, Web Page, Not Your Average Jukebox, On Hollywood 1000 contender Ecast uses broadbank to being the digital media experience to your watering hole. Posted Nov. 4, 2005, Nov. 4, 2005.
"PCT International Preliminary Report on Patentability (Ch II) dated May 22, 2007", PCT Application No. PCT/ES2005/00003, May 22, 2007.
"PCT International Search Report and Written Opinion dated Nov. 8, 2010", PCT Application No. PCT/US2010/47955, (16 pages).
"PCT International Search Report and Written Opinion dated Dec. 7, 2007", PCT Application No. PCT/US2007/068708, Dec. 7, 2007, (6 pages).
"PCT International Search Report and Written Opinion dated Feb. 17, 2010", PCT Application No. PCT/US09/068604, Feb. 17, 2010.
"PCT International Search Report and Written Opinion dated May 28, 2008", PCT Application No. PCT/US2006/003795, May 28, 2008.
"PCT International Search Report and Written Opinion dated Jun. 5, 2009", PCT Application No. PCT/US09/42002, Jun. 5, 2009.
"PCT International Search Report and Written Opinion dated Jul. 15, 2009", PCT Application No. PCT/US2009/45911, Jul. 15, 2009.
"PCT International Search Report dated Feb. 9, 2007", PCT Application No. PCT/US2006/034218, Feb. 9, 2007, (3 pages).
"PCT International Search Report dated Mar. 25, 2008", PCT Application No. PCT/US2006/38769, Mar. 25, 2008, (3 pages).
"PCT International Search Report dated Jul. 15, 2009", PCT Application No. PCT/US2009/45725, Jul. 15, 2009.
"PCT International Search Report Dated Sep. 4, 2009", PCT Application No. PCT/US2009/051233, Sep. 4, 2009.
"PCT International Written Opinion dated Aug. 10, 2008", PCT Application No. PCT/US2006/034218, Aug. 10, 2008, (5 pages).
"PCT Written Opinion of the International Searching Authority dated Jan. 12, 2006", PCT Application No. PCT/ES2005/000213, Jan. 12, 2006.
"RFID Brings Messages to Seattle Sidewalks", www.rfidjournal.comfarticle/articleview/1619/1/1, Web Page, RFID brings messages to Seattle sidewalks on RFID system being deployed next week will send marketing and assistive information to users carrying active RFID tags. RFID Journal (pp. 1-4), May 26, 2004, 1-4.
"Social Networking Meets Music Listening: Mecora Launches Radio 2.0", "Social Networking Meets Music Listening: Mecora Launches Radio 2.0," www.masternewmedia.org/news/2006/04/13/social_networking_meets_music_listening.htm, Apr. 13, 2006.
"TouchTunes Signs License Agreement for BMI Music in Digital Jukeboxes", www.bmi.com/news/200403/20040324b.asp, Web Page, BMI™ Figures Don't Lie, Mar. 24, 2004, Touch Tunes Signs License Agreement for BMI Music in Digital Jukeboxes., Mar. 24, 2004.
"Treemap", Treemap, University of Maryland, http://www.cs.umd.edu/hcil/treemap/, last updated Aug. 5, 2003, 4 pages, Aug. 5, 2003, 4 Pages.
"Variations 2", The Trustees of Indiana University, Variations 2, The Indiana University Digital Music Library, http://dml.indiana.edu/, last updated May 11, 2005, 1 page, May 11, 2005, 1 page.

(56) References Cited

OTHER PUBLICATIONS

Alvear, Jose, "Risk-Free Trial Streaming Media Delivery Tools,", Alvear, Jose, "Risk-Free Trial Streaming Media Delivery Tools," Streaming Media.com; www.streamingmedia.com/ article. ap?id=5768, Jun. 30, 2000.
Baluja, S et al., "Video Suggestion and Discovery for YouTube: Taking Random Walks through the View Graph", Baluja, S., Seth, R., Sivakumar, D., Jing, Y., Yagnik, J., Kumar, S., Ravichandran, D., and Aly, M. "Video Suggestion and Discovery for YouTube: Taking Random Walks Through the View Graph". In WWW '08: Proceedings of the 17th International conference o, 2008, 895-904.
Belkins, et al., "Information Filtering and Information Retrieval: Two Sides of the Same Coin?", Belkins, et al., "Information Filtering and Information Retrieval: Two Sides of the Same Coin?", Communications of the ACM (Dec. 1992), Dec. 1992.
Bender, "Twenty Years of Personalization: All about the Daily Me,", Bender, "Twenty Years of Personalization: All about the Daily Me," Educause Review (Sep./Oct. 2002), 2002.
Bender, et al., "Newspace: Mass Media and Personal Computing", Bender, et al., "Newspace: Mass Media and Personal Computing," Proceedings of USENIX, Conference, pp. 329-348(Summer 1991), 1991, 329-348.
Bollen, Johan et al., "Toward alternative metrics of journal impact: a comparison of download and citation data", Toward alternative metrics of journal impact: a comparison of download and citation data, Johan Bollen, Herbert Van de Sompel, Joan Smith, Rick Luce, Google.com, 2005, pp. 1-2, 1-2.
Bunzel, Tom, "Easy Digital Music", Tom Bunzel, "Easy Digital Music," QUE Publisher, Aug. 18, 2004, Chapters 5 and 8., Aug. 18, 2004, chapters 5 and 8.
Cano, Pedro et al., "On the Use of FastMap for Audio Retrieval and Browsing", Cano, Pedro et al., On the Use of FastMap for Audio Retrieval and Browsing, The International Conference on Music Information Retrieval and Related Activities (ISMIR 2002), Paris, France, Oct. 2002,2 pages, 2002.
Carlson, et al., "Internet Banking Market Developments and Regulatory Issues in the New Economy: What Changed, and the Challenges for Economic Policy . . . ", Carlson et al. "Internet Banking Market Developments and Regulatory Issues in the New Economy: What Changed, and the Challenges for Economic Policy . . . "; May 2001; http://www.occ.gov/netbank/SGEC2000.pdf, May 2001, 33 pages.
Chao-Ming, et al., "Design and Evaluation and mProducer: a Mobile Authoring Tool for Personal Experience Computing", Chao-Ming et al. (Chao-Ming), Design and Evaluation and mProducer: a Mobile Authoring Tool for Personal Experience Computing [online], MUM 2004, College Park, Maryland, USA, Oct. 27-29, 2004 [retrieved on Dec, 17, 2010]. [http://citeseerx.ist.psu.edu/vie, [http://citeseerx.ist.psu.edu/viewdoc/download?doi=10.1.1.131.2933&rep=rep1&type=pdf], Oct. 27-29, 2004.
Connell, Lain et al., "Ontological Sketch Models: Highlighting User-System Misfits", Connell, Iain et al., Ontological Sketch Models: Highlighting User-System Misfits, In P. Palanque, E. O'Neill and P. Johnson, editors, Proceedings of Human Computer Interaction (HCI) Bath, England, Sep. 2003, London Springer, pp. 1-16, Sep. 2003, 1-16.
Das, A et al., "Google News Personalization: Scalable Online Collaborative Filtering", Das,A., Datar,M., Garg,A., and Rajaram,S. "Google News Personalization: Scalable Online Collaborative Filtering". In WWW '07: Proceedings of the 16th international conference on World Wide Web, pp. 271-280, New York, NY, D USA, 2007. ACM Press, 2007, 271-280.
Dean, J et al., "MapReduce: Simplied Data Processing on Large Clusters", Dean, J. and Ghemawat, S. "MapReduce: Simplied Data Processing on Large Clusters". Commun. ACM, 51(1):107-113, 2008, 107-113.
Dempster, Y, "Maximum Likelihood from Incomplete Data via the EM Algorithm", Dempster, Y., Laird, N., and Rubin, D. "Maximum Likelihood from Incomplete Data via the EM Algorithm". Jour. of the Royal Stat. Soc., Ser. B., 39:1047-1053,1977, 1047-1053.

Deshpande, Mukund et al., "Item-Based Top-N Recommendation Algorithms", Deshpande, Mukund, et al., "Item-Based Top-N Recommendation Algorithms," ACM Transactions on Information Systems, 22:1 (Jan. 2004), pp. 143-177, Jan. 2004, 143-177.
Hofmann, T, "Latent Semantic Models for Collaborative Filtering", Hofmann, T. "Latent Semantic Models for Collaborative Filtering". ACM Transactions on Information Systems, 22:89-115, 2004, 89-115.
Hofmann, T, "Unsupervised Learning by Probabilistic Latent Semantic Analysis", Hofmann, T. "Unsupervised Learning by Probabilistic Latent Semantic Analysis". Mach. Learn., 42:177-196, 2001, 177-196.
Indyk, P et al., "Low-Distortion Embeddings of Finite Metric Spaces", Indyk, P. and Matousek, J. "Low-Distortion Embeddings of Finite Metric Spaces". In Handbook of Discrete and Computational Geometry, pp. 177-196. CRC Press, 2004, 177-196.
Jacucci, Giulio et al., "IP City, Integrated Project on Interaction and Presence on Urban Environments-Demonstrators on Large-Scale Events Applications", IP City, Integrated Project on Interaction and Presence on Urban Environments-Demonstrators on Large-Scale Events Applications; ipcity.eu; Giulio Jacucci, John Evans, Tommi Ilmonen; pp. 1-37; Feb. 9, 2007, 1-37.
Lazar, N A., "Bayesian Empirical Likelihood", N.A. Lazar; Bayesian Empirical Likelihood; Technical Report, Carnegie Mellon University, Department of Statistics, 2000; 26 pages, 2000.
Lie, "The Electronic Broadsheet—All the News That Fits the Display", Lie, "The Electronic Broadsheet—All the News That Fits the Display," MIT Master's Thesis, pp. 1-96 (Jun. 1991), 1-96.
Lippman, et al., "News and Movies in the 50 Megabit Living Room", Lippman, et al., "News and Movies in the 50 Megabit Living Room," IEEE/IEICE, Global Telecommunications Conference, pp. 1976-1981 (Nov. 15, 1987), 1976-1981.
Loeb, Shoshana, "Delivering Interactive Multimedia Documents over Networks", Delivering Interactive Multimedia Documents over Networks; Shoshana Loeb; IEEE Communications Magazine; May 1992; 8 pages.
Logan, Beth, "A Music Similarity Function Based on Signal Analysis", Logan, Beth et al., A Music Similarity Function Based on Signal Analysis, IEEE International Conference on Multimedia and Expo (ICME), Tokyo, Japan, Aug. 2001, IEEE Press, pp. 952-955, 952-955.
Logan, Beth, "Content-Based Playlist Generation: Exploratory Experiments", Logan, Beth, Content-Based Playlist Generation: Exploratory Experiments, The International Conference on Music Information Retrieval and Related Activities (ISMIR 2002), Paris, France, Oct. 2002,2 pages.
Maidin, Donncha et al., "The Best of Two Worlds: Retrieving and Browsing", Maidin, Donncha 0 et al., The Best of Two Worlds: Retrieving and Browsing, Proceedings of the COST G-6 Conference on Digital Audio Effects (DAFX-OO), Verona, Italy, Dec. 7-9, 2000,4 pages.
McCarthy, et al., "Augmenting the Social Space of an Academic Conference", Augmenting the Social Space of an Academic Conference; McCarthy, et al. Information School, University of Washington and Department of Computer Science and Engineering, University of Minnesota; pp. 1-10; Nov. 6-10, 2004, 1-10.
EP Search, App. No. EP 10175868.8, dated Dec. 21, 2010, 6 pages.
Notess, Mark et al., Notess, Mark et al., Variations2: Toward Visual Interface for Digital Music Libraries, Second International Workshop on Visual Interfaces to Digital Libraries, 2002, 6 pages.
O'Connor, M et al., "PolyLens: A Recommender System for Groups of Users", PolyLens: A Recommender System for Groups of Users; M. O'Connor, D. Cosley, J.A. Konstan, J. Riedl; European Conference on Computer Supported Co-Operative Work at Bonn, Germany; Published 2001; pp. 199-218, 2001, 199-218.
Orwant, Jonathon L., "Appraising the User of User Models: Doppelganger's Interface", Jon Orwant, "Appraising the User of User Models: Doppelganger's Interface," in: A. Kobsa and D. Litman (eds.), Proceeding of the 4th International Conference on User Modeling (1994).

(56) References Cited

OTHER PUBLICATIONS

Orwant, Jonathon L., "Doppelganger Goes to School: Machine Learning for User Modeling", Jonathan L. Orwant, "Doppelganger Goes to School: Machine Learning for User Modeling," MIT Master of Science Thesis (Sep. 1993).

Orwant, Jonathon L., "Doppelganger: A User Modeling System", Jonathan L. Orwant, "Doppelganger: A User Modeling System," MIT Bachelor's Thesis (Jun. 1991).

Pachet, Francois et al., "A Taxonomy of Musical Genres, Content-Based Multimedia Information Access Conference (RIAO)", Pachet, Francois, A Taxonomy of Musical Genres, Content-Based Multimedia Information Access Conference (RIAO), Paris, Apr. 2000, 8 pages.

Paek, Tim et al., "Toward University Mobile Interaction for Shared Displays", Toward University Mobile Interaction for Shared Displays; Tim Paek, et al.; Microsoft Research, Redmond, WA; pp. 1-4; Nov. 6-10, 2004. Retrieved from the internet: <URL: http://research.microsoft.com/-timpaekiPapers/cscw2004. pdf> entire document, Nov. 2004, 1-4.

Pampalk, Elias et al., "Content-based Organization and Visualization of Music Archives", Pampalk, Elias et al., Content-based Organization and Visualization of Music Archives, ACM Multimedia, Juan les Pins, France, Dec. 2002, pp. 570-579, 570-579.

Pauws, Steffen et al., "PATS: Realization and User Evaluation of an Automatic Playlist Generator", Pauws, Steffen et al., PATS: Realization and User Evaluation of an Automatic Playlist Generator, The International Conferences on Music Information Retrieval and Related Activities (ISMIR 2002), Paris, France, Oct. 2002,9 pages.

Platt, John C. et al., "Learning a Gaussian Process Prior for Automatically Generating Music Playlists", Platt, John C. et al., "Learning a Gaussian Process Prior for Automatically Generating Music Playlists," Microsoft Corporation {platt, cburgess, sswenson, chriswea}@microsoft.com, alcez@cs.berkeley.edu, 2002; pp. 1-9.

Platt, John S., "Fasting Embedding of Sparse Music Similarity Graphs", Platt, John S., "Fasting Embedding of Sparse Music Similarity Graphs," Microsoft Corporation, {jplatt@microsoft.com}, 2004.

Rauber, Andreas et al., "The SOM-enhanced JukeBox: Organization and visualization of Music Collections Based on Perceptual Models", Rauber, Andreas et al., The SOM-enhanced JukeBox: Organization and Visualization of Music Collections Based on Perceptual Models, Journal of New Music Research, vol. 32, Nov. 2, 2003, pp. 193-210, 193-210.

Rudstrom, Asa, "Co-Construction of Hybrid Spaces", Co-Construction of Hybrid Spaces; Asa Rudstrom; A Dissertation submitted to the University of Stockholm in partial fulfillment of the requirements for the Degree of Doctor of Philosophy; Department of Computer and Systems Sciences Stockholm University and, Nov. 2005, 1-69.

Scheible, Jurgen et al., "MobiLenin—Combining a Multi-Track Music Video, Personal Mobile Phones and a Public Display into Multi-User Interactive Entertainment", MobiLenin—Combining a Multi-Track Music Video, Personal Mobile Phones and a Public Display into Multi-User Interactive Entertainment; Jurgen Scheible, et al. Media Lab, University of Art and Design, Helsinki, Finland; pp. 1-10; Nov. 6-10, 2005.

Scihira, I, "A Characterization of Singular Graphs", Scihira, I. "A Characterization of Singular Graphs". Electronic Journal of Linear Algebra, 16:451-462, 2007.

Shneiderman, Ben, "Tree Visualization with Tree-Maps: 2-d Space-Filling Approach", Shneiderman, Ben, Tree Visualization with Tree-Maps: 2-d Space-Filling Approach, ACM Transactions on Graphics, vol. 11, No. 1, Jan. 1992, pp. 92-99.

Shneiderman, Ben, "Treemaps for Space-Contrained Visualization of Hierarchies", Shneiderman, Ben, Treemaps for Space-Contrained Visualization of Hierarchies, http://www.sc.umd.edu/heil/treemap-history, last updated Apr. 28, 2006, 16 pages.

Smart Computing, "The Scoop on File-Sharing Services", Smart Computing, "The Scoop on File-Sharing Services," Dec. 2000, vol. 11, Issue 12; pp. 30-33 in printed issue. Available at www.smartcomputing.com/editorial/article.asp?article=articles%2F2000%Fs1112%2FOBs12.asp, Dec. 2000, 30-33.

Strands Business Solutions, "Integration Document v.2.0", Strands Business Solutions. "Integration Document v.2.0"; Published May 2008; [online retrieved on Jan. 21, 2010] Retrieved from the internet <URL: http://recommender.strands.com/doc/SBS-Integration-Document.pdf>; entire document—18 pages, May 2008.

Sun, Jimeng et al., "Incremental tensor analysis: theory and applications", Incremental tensor analysis: theory and applications, Jimeng Sun, Dacheng Tao, Spiros Papadimitriou, Philip Yu, Christos Faloutsos, ACM, Oct. 2008, pp. 1-37.

Thompson, John, "A Graphic Representation of Interaction With the NEXIS News Database", John Thompson, "A Graphic Representation of Interaction With the NEXIS News Database," MIT Thesis (May 1983).

Tzanetakis, George et al., "A Prototype Audio Browser-Editor Using a Large Scale Immersive Visual and Audio Display", Tzanetakis, George et al., MARSYAS3D: A Prototype Audio Browser-Editor Using a Large Scale Immersive Visual and Audio Display, Proceedings of the 2001 International Conference on Auditory Display, Espoo, Finland, Jul./Aug. 2001, 5 pages.

Wolfers, Justin et al., "Prediction Markets", Wolfers, Justin and Zitzewitz, Eric, Prediction Markets, Journal of Economic Perspectives, Spring 2004, pp. 107-126, vol. 18, No. 2, 2004.

Yates, Alexander et al., "ShopSmart; Product Recommendations through Technical Specifications and User Reviews", ShopSmart: Product Recommendations through Technical Specifications and User Reviews; Alexander Yates et al. Temple University; CIKM; Oct. 26-30, 2008, Napa Valley, CA, USA; 2 pages.

Yen, Yi-Wyn, "Apple announces a 32GB iPhone 3G by Jun. 15, 2009", Yen, Yi-Wyn, Apple announces a 32GB iPhone 3G by Jun. 15, 2009, The Industry Standard, Apr. 2, 2009, http://www.thestandard.com/preditions/channel/hardware, downloaded Apr. 8, 2009.

"International Search Report and Written Opinion", for PCT application No. PCT/US2012/057660, 28 pages.

"iTunes Sync is Syncing the Music Playlist One Way Only for iPhone. How to Fix it?", Jul. 25, 2011, 3 pages.

"Will iCloud Sync Which Playlist I Put Purchased Songs in?", Aug. 8, 2011, 1 page.

Olma, Alex, "Erfolgreich bei iTunes Match Angemeldt", Sep. 16, 2011, 2 pages.

Canada—Examiner's Report for App. No. 2713507 mailed on Sep. 21, 2011.

UK Search Examination Report, App. No. GB1014954.0, mailed Dec. 16, 2010.

PCT/US2006/034218; International Search Report Feb. 9, 2007.

"Apple: iTunes 4.2 User Guide for Windows", Apple: iTunes 4.2 User Guide for Windows; Dec. 2003; retrieved from the internet: URL: http://www2.austin.cc.tx. us/tcm/projects/itunes.pdf; pp. 10, 17-19. (Added Ref Nov. 5, 2009), Dec. 2003, 10,17-19.

"Communication from the Examining Division dated Jul. 22, 2011", European Patent Application No. 09169573.4 (8 pages).

"Final Office Action dated Jan. 1, 2012", U.S. Appl. No. 12/242,728 (15 pages).

"Final Office Action dated Nov. 10, 2011", U.S. Appl. No. 12/242,768 (10 pages).

"Non-Final Office Action dated Feb. 16, 2012", U.S. Appl. No. 12/242,758.

"Non-Final Office Action dated Feb. 9, 2012", U.S. Appl. No. 12/646,916 (13 pages).

"Non-Final Office Action dated Jan. 9, 2012", U.S. Appl. No. 12/242,735 (12 pages).

"PCT International Search Report dated Oct. 23, 2009", PCT Application No. PCT/US2006/004257, Oct. 23, 2009.

Bollen, Johan et al., "Toward alternative metrics of journal impact: a comparison of download and citation data", Toward alternative metrics of journal impact: a comparison of download and citation data, Johan Bollen, Herbert Van de Sompel, Joan Smith, Rick Luce, Google.com, 2005, pp. 1-2, 2005, 1-2.

Australia Examiner's 1st Report on patent application No. 2010212503 mailed Jun. 27, 2011.

EP Search, App. No. EP 10175868.8.

(56) References Cited

OTHER PUBLICATIONS

"PCT/US 10/47955 International Search Report", PCT/US 10/47955 International Search Report mailed Nov. 8, 2010.
Platt, John C. et al., "Learning a Gaussian Process Prior for Automatically Generating Music Playlists", Platt, John C. et al., "Learning a Gaussian Process Prior for Automatically Generating Music Playlists," Microsoft Corporation {platt, cburgess, sswenson, chriswea}@microsoft.com, alcez@cs.berkeley.edu, 2002; pp. 1-9., 1-9.
Platt, John S. , "Fasting Embedding of Sparse Music Similarity Graphs,", Platt, John S., "Fasting Embedding of Sparse Music Similarity Graphs," Microsoft Corporation, {jplatt@microsoft.com}; 2004.
Sun, Jimeng et al., "Incremental tensor analysis: theory and applications", Incremental tensor analysis: theory and applications, Jimeng Sun, Dacheng Tao, Spiros Papadimitriou, Philip Yu, Christos Faloutsos, ACM, Oct. 2008, pp. 1-37, 1-37.
Chao-Ming et al. (Chao-Ming), Design and Evaluation and mProducer: a Mobile Authoring Tool for Personal Experience Computing [online], MUM 2004, College Park, Maryland, USA, Oct. 27-29, 2004 [retrieved on Dec. 17, 2010]. [http://citeseerx.ist.psu.edu/viewdoc/download?doi=10.1.1.131.2933&rep=rep1&type=pdf].
Tom Bunzel, "Easy Digital Music," QUE Publisher, Aug. 18, 2004, Chapters 5 and 8.
Strands Business Solutions. "Integration Document v.2.0"; Published May 2008; [online retrieved on Jan. 21, 2010] Retrieved from the internet <URL: http://recommender.strands.com/doc/SBS-Integration-Document.pdf>; entire document—18 pages.
PCT/US09/68604 International Search Report and Written Opinion of the International Searching Authority; dated Feb. 17, 2010.
Delivering Interactive Multimedia Documents over Networks; Shoshana Loeb; IEEE Communications Magazine; May 1992; 8 pages.
"Communications of the ACM" Dec. 1992, vol. 35, No. 12 at pp. 26-28 (Introduction to special issue regarding Workshop on High Performance Information Filtering, Morristown, N.J. Nov. 1991).
John Thompson, "A Graphic Representation of Interaction With the NEXIS News Database," MIT Thesis (May 1983).
Lippman, et al., "News and Movies in the 50 Megabit Living Room," IEEE/IEICE, Global Telecommunications Conference, pp. 1976-1981 (Nov. 15, 1987).
Bender, et al., "Newspace: Mass Media and Personal Computing," Proceedings of USENIX, Conference, pp. 329-348 (Summer 1991).
Lie, "The Electronic Broadsheet—All the News That Fits the Display," MIT Master's Thesis, pp. 1-96 (Jun. 1991).
Jonathan L. Orwant, "Doppelganger: A User Modeling System," MIT Bachelor's Thesis (Jun. 1991).
"Lessons from LyricTimeTM: A Prototype Multimedia System" 4th IEEE ComSoc International Workshop on Multimedia Communications (Apr. 1992).
Belkins, et al., "Information Filtering and Information Retrieval: Two Sides of the Same Coin?", Communications of the ACM (Dec. 1992).
Architecting Personalized Delivery of Multimedia Information,: Communications of the ACM (Dec. 1992).
Jonathan L. Orwant, "Doppelgänger Goes to School: Machine Learning for User Modeling," MIT Master of Science Thesis (Sep. 1993).
Jon Orwant, "Appraising the User of User Models: Doppelgänger's Interface," in: A. Kobsa and D. Litman (eds.), Proceeding of the 4th International Conference on User Modeling (1994).
Bender, "Twenty Years of Personalization: All about the Daily Me," Educause Review (Sep./Oct. 2002).
PCT/ES2005/00003 Written Opinion of the International Searching Authority Report dated Jun. 10, 2005.
PCT/ES2005/000213 Written Opinion of the International Searching Authority dated Jan. 12, 2006.
PCT/ES2005/00003 Written Opinion of the International Preliminary Examining Authority dated Mar. 19, 2007.
PCT/ES2005/00003 International Preliminary Report on Patentability (Ch II) Report dated May 22, 2007.
PCT/ES2005/000213 International Preliminary Report on Patentability (Ch II) Report Dated Nov. 15, 2007.
ShopSmart: Product Recommendations through Technical Specifications and User Reviews; Alexander Yates et al. Temple University; CIKM; Oct. 26-30, 2008, Napa Valley, CA, USA; 2 pages.
PolyLens: A Recommender System for Groups of Users; M. O'Connor, D. Cosley, J.A. Konstan, J. Riedl; European Conference on Computer Supported Co-Operative Work at Bonn, Germany; Published 2001; pp. 199-218.
Augmenting the Social Space of an Academic Conference; McCarthy, et al. Information School, University of Washington and Department of Computer Science and Engineering, University of Minnesota; pp. 1-10; Nov. 6-10, 2004.
International Search Report PCT/US2009/051233; Sep. 4, 2009; Strands, Inc.
MobiLenin—Combining a Multi-Track Music Video, Personal Mobile Phones and a Public Display into Multi-User Interactive Entertainment; Jurgen Scheible, et al. Media Lab, University of Art and Design, Helsinki, Finland; pp. 1-10; Nov. 6-10, 2005.
PCT/US07/068708; Filed May 10, 2007; International Search Report and Written Opinion; WO 2007/134193; Dec 7, 2007.
PCT/US09/42002; Filed Apr. 28, 2009; International Search Report and Written Opinion; Jun. 2009.
PCT/US09/45911; Filed Jun. 2, 2009; International Search Report and Written Opinion.
PCT/US2007/068708; International Search Report; May 10, 2007.
PCT/US2007/09/45725; International Search Report_WO; Jul. 15, 2009.
Scihira, I. "A Characterization of Singular Graphs". Electronic Journal of Linear Algebra, 16:451-462, 2007.
Toward University Mobile Interaction for Shared Displays; Tim Paek, et al.; Microsoft Research, Redmond, WA; pp. 1-4; Nov. 6-10, 2004.
Wolfers, Justin and Zitzewitz, Eric, Prediction Markets, Journal of Economic Perspectives, Spring 2004, pp. 107-126, vol. 18, No. 2.
Yen, Yi-Wyn, Apple announces a 32GB iPhone 3G by Jun. 15, 2009, The Industry Standard, Apr. 2, 2009, http://www.thestandard.com/preditions/channel/hardware, downloaded Apr. 8, 2009.
Baluja, S., Seth, R., Sivakumar, D., Jing, Y., Yagnik, J., Kumar, S., Ravichandran, D., and Aly, M. "Video Suggestion and Discovery for YouTube: Taking Random Walks Through the View Graph". In WWW '08: Proceedings of the 17th international conference on World Wide Web, pp. 895-904, Beijing, China, 2008. ACM Press.
Carlson et al. "Internet Banking Market Developments and Regulatory Issues in the New Economy: What Changed, and the Challenges for Economic Policy . . . "; May 2001; http://www.occ.gov/netbank/SGEC2000.pdf.
Co-Construction of Hybrid Spaces; Asa Rudstrom; A Dissertation submitted to the University of Stockholm in partial fulfillment of the requirements for the Degree of Doctor of Philosophy; Department of Computer and Systems Sciences Stockholm University and Royal Institute of Technology; pp. 1-69; Nov. 2005.
Das,A., Datar,M., Garg,A., and Rajaram,S. "Google News Personalization: Scalable Online Collaborative Filtering". In WWW '07: Proceedings of the 16th international conference on World Wide Web, pp. 271-280, New York, NY, USA, 2007. ACM Press.
Dean, J. and Ghemawat, S. "MapReduce: Simplied Data Processing on Large Clusters". Commun. ACM, 51 (1):107-113, 2008.
Dempster, Y., Laird, N., and Rubin, D. "Maximum Likelihood from Incomplete Data via the EM Algorithm". Jour. of the Royal Stat. Soc., Ser. B., 39:1047-1053, 1977.
Hofmann, T. "Latent Semantic Models for Collaborative Filtering". ACM Transactions on Information Systems, 22:89-115, 2004.
Hofmann, T. "Unsupervised Learning by Probabilistic Latent Semantic Analysis". Mach. Learn., 42:177-196, 2001.
Industry Standard, The, Help FAQs for Standard Prediction Market, http://www.thestandard.com/help, downloaded Jun. 29, 2009.
Indyk, P. and Matousek, J. "Low-Distortion Embeddings of Finite Metric Spaces". In Handbook of Discrete and Computational Geometry, pp. 177-196. CRC Press, 2004.

(56) References Cited

OTHER PUBLICATIONS

IP City, Integrated Project on Interaction and Presence on Urban Environments—Demonstrators on Large-Scale Events Applications; ipcity.eu; Giulio Jacucci, John Evans, Tommi Ilmonen; pp. 1-37; Feb. 9, 2007.
Lazar, N.A.; Bayesian Empirical Likelihood; Technical Report, Carnegi Mellon University, Department of Statistics, 2000; 26 pages.
N.A. Lazar; Bayesian Empirical Likelihood; Technical Report, Carnegi Mellon University, Department of Statistics, 2000; 26 pages.
S. Baluja, R. Seth, D. Sivakumar, Y. Jing, J. Yagnik, S. Kumar, D. Ravichandran, and M. Aly, "Video Suggestion and Discovery for YouTube: Taking Random Walks Through the View Graph". In WWW '08: Proceedings of the 17th international conference on World Wide Web, pp. 895-904, Beijing, China, 2008. ACM Press.
A. Das, M. Datar, A. Garg, and S. Rajaram. "Google News Personalization: Scalable Online Collaborative Filtering". In WWW '07: Proceedings of the 16th international conference on World Wide Web, pp. 271-280, New York, NY, USA, 2007. ACM Press.
J. Dean and S. Ghemawat, "MapReduce: Simplied Data Processing on Large Clusters". Commun. ACM, 51 (1):107-113, 2008.
Y. Dempster, N. Laird, and D. Rubin. "Maximum Likelihood from Incomplete Data via the EM Algorithm". Jour. of the Royal Stat. Soc., Ser. B., 39:1047-1053, 1977.
T. Hofmann. "Unsupervised Learning by Probabilistic Latent Semantic Analysis". Mach. Learn., 42:177-196, 2001.
T. Hofmann. "Latent Semantic Models for Collaborative Filtering". ACM Transactions on Information Systems, 22:89-115, 2004.
P. Indyk and J. Matousek. "Low-Distortion Embeddings of Finite Metric Spaces". In Handbook of Discrete and Computational Geometry, pp. 177-196. CRC Press, 2004.
I. Scihira. "A Characterization of Singular Graphs". Electronic Journal of Linear Algebra, 16:451-462, 2007.
Alvear, Jose, "Risk-Free Trial Streaming Media Delivery Tools," Streaming Media.com; www.streamingmedia.com/article.ap?id=5768, Jun. 30, 2000.
Deshpande, Mukund, et al., "Item-Based Top-N Recommendation Algoriths," ACM Transactions on Information Systems, 22:1 (Jan. 2004), pp. 143-177.
Pachet, Francois, A Taxonomy of Musical Genres, Content-Based Multimedia Information Access Conference (RIAO), Paris, Apr. 2000, 8 pages.
Smart Computing, "The Scoop on File-Sharing Services," Dec. 2000, vol. 11, Issue 12; pp. 30-33 in printed issue. Available at www.smartcomputing.com/editorial/article.asp?article=articles%2F2000%Fs1112%2F08s12.asp.
www.akoo.com/Akoo/, Web Page, Akoo, Pick the Music, Waiting in the line at the Theme Park, Introducing the m-Venue™ platform.
www.axcessnews.com/modules/wfsection/article.php?articleid=8327, Web Page, Feb. 24, 2006, Maintenance Fees, Digital Music Sales Triple to $1.1 Billion in 2005.
www.bmi.com/news/200403/20040324b.asp, Web Page, BMI™ Figures Don't Lie, Mar. 24, 2004, Touch Tunes Signs License Agreement for BMI Music in Digital Jukeboxes.
www.ecastinc.com/music_licensing.html, Web Page, Ecast Network, interactive entertainment network, Music/Licensing.
www.rfidjournal.com/article/articleview/1619/1/1, Web Page, RFID brings messages to Seattle side walks on RFID system being deployed next week will send marketing and assistive information to users carrying active RFID tags. RFID Journal (pp. 1-4).
www.roweinternational.com/jukeboxes_dia.html, Web Page, Digital Internet Access Jukeboxes, Rowe International.
www.touchtunes.com, Web Page, Touchtunes, Turn your ROWE 100A's and 100B's into touch tunes Digital Jukeboxes—BOSE.
www.alwayson-network.com/comments.php?id=P12663 0 37 0 C, Web Page, Not Your Average Jukebox, on Hollywood 1000 contender Ecast uses broadbank to being the digital media experience to your watering hole.
Cano, Pedro et al., On the Use of FastMap for Audio Retrieval and Browsing, The International Conference on Music Information Retrieval and Related Activities (ISMIR 2002), Paris, France, Oct. 2002, 2 pages.
Connell, Iain et al., Ontological Sketch Models: Highlighting User-System Misfits, in P. Palanque, E. O'Neill and P. Johnson, editors, Proceedings of Human Computer Interaction (HCI) Bath, England, Sep. 2003, London Springer, pp. 1-16.
The Trustees of Indiana University, Variations2, The Indiana University Digital Music Library, http://dml.indiana.edu/, last updated May 11, 2005, 1 page.
Logan, Beth, Content-Based Playlist Generation: Exploratory Experiments, The International Conference on Music Information Retrieval and Related Activities (ISMIR 2002), Paris, France, Oct. 2002, 2 pages.
Logan, Beth et al., A Music Similarity Function Based on Signal Analysis, IEEE International Conference on Multimedia and Expo (ICME), Tokyo, Japan, Aug. 2001, IEEE Press, pp. 952-955.
Maidin, Donncha O et al., The Best of Two Worlds: Retrieving and Browsing, Proceedings of the COST G-6 Conference on Digital Audio Effects (DAFX-00), Verona, Italy, Dec. 7-9, 2000, 4 pages.
Notess, Mark et al., Variations2: Toward Visual Interface for Digital Music Libraries, Second International Workshop on Visual Interfaces to Digital Libraries, 2002, 6 pages.
Pampalk, Elias et al., Content-based Organization and Visualization of Music Archives, ACM Multimedia, Juan les Pins, France, Dec. 2002, pp. 570-579.
Pauws, Steffen et al., PATS: Realization and User Evaluation of an Automatic Playlist Generator, The International Conferences on Music Information Retrieval and Related Activities (ISMIR 2002), Paris, France, Oct. 2002, 9 pages.
Rauber, Andreas et al., The SOM-enhanced JukeBox: Organization and Visualization of Music Collections Based on Perceptual Models, Journal of New Music Research, vol. 32, Nov. 2, 2003, pp. 193-210.
Shneiderman, Ben, Tree Visualization with Tree-Maps: 2-d Space-Filling Approach, ACM Transactions on Graphics, vol. 11, No. 1, Jan. 1992, pp. 92-99.
Treemap, University of Maryland, http://www.cs.umd.edu/hcil/treemap/, last udpated Aug. 5, 2003, 4 pages.
Shneiderman, Ben, Treemaps for Space-Contrained Visualization of Hierarchies, http://www.sc.umd.edu/heil/treemap-history/, last updated Apr. 28, 2006, 16 pages.
Tzanetakis, George et al., MARSYAS3D: A Prototype Audio Browser-Editor Using a Large Scale Immersive Visual and Audio Display, Proceedings of the 2001 International Conference on Auditory Display, Espoo, Finland, Jul./Aug. 2001, 5 pages.
"New Music Recommendation System is Based on FOAF Personal Profiling," www.masternewmedia.org/music_recommendation/music_recommendation_system_FOAF, Oct. 1, 2005.
"Social Networking Meets Music Listening: Mecora Launches Radio 2.0," www.masternewmedia.org/news/2006/04/13/social_networking_meets_music_listening.htm, Apr. 13, 2006.
PCT/US06/38769; International Search Report; Mar. 25, 2008.
PCT/US06/48330; International Bureau; PCT Search Report and Written Opinion; Mar. 20, 2008.
PCT/US2006/003795; International Search Report and Written Opinion; May 28, 2008.
USPTOSearch Authority; PCT International Search Report; Feb. 9, 2007; 3 Pages.

\* cited by examiner

Synthesizing user tastes from playcounts and playlists.

Getting individual recommended mediasets.

Aggregating individual recommended mediasets into a recommended mediaset suitable for the whole group of users.

User Addition Process

DISTRIBUTION, LICENSING AND REVENUE SHARING EXAMPLE

DYNAMIC INTERACTIVE ENTERTAINMENT VENUE

PRIORITY CLAIMS

This application is a continuation of U.S. application Ser. No. 12/278,148, filed on Feb. 18, 2009, which is a 371 national stage entry of PCT Application No. PCT/US2006/034218, filed on Aug. 31, 2006, which claims priority to U.S. Provisional Patent Application No. 60/772,502 filed Feb. 10, 2006, and titled "System and Method for Building and Sharing a Composite Playlist from Collective Group Tastes on Multiple Media Playback Devices," and U.S. Provisional Patent Application No. 60/774,072 filed Feb. 15, 2006, and titled "Mediaset Recommendations for a Group of Users," and U.S. Provisional Patent Application No. 60/796,724 filed May 1, 2006, and titled "Dynamically Building Composite Playlist for Merging Collective User Tastes;" all of which are hereby incorporated by reference in their entireties.

BRIEF DESCRIPTION OF THE DRAWINGS

Understanding that drawings depict only certain preferred embodiments of the invention and are therefore not to be considered limiting of its scope, the preferred embodiments will be described and explained with additional specificity and detail through the use of the accompanying drawings in which.

DETAILED DESCRIPTION OF PREFERRED EMBODIMENTS

Figure 1:
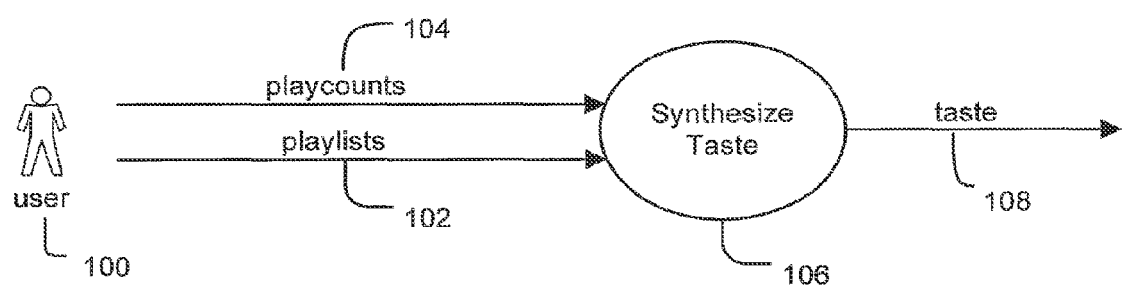
FIG. 1 is a diagram of one embodiment of a system for synthesizing a user's taste by analyzing the user's playlist(s) and playcounts.

In the following description, certain specific details of programming, software modules, user selections, network transactions, database queries, database structures, etc., are provided for a thorough understanding of the specific preferred embodiments of the invention. However, those skilled in the art will recognize that embodiments can be practiced without one or more of the specific details, or with other methods, components, materials, etc.

In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. In some embodiments, the methodologies and systems described herein may be carried out using one or more digital processors, such as the types of microprocessors that are commonly found in PC's, laptops, PDA's and all manner of other desktop or portable electronic appliances.

Disclosed are embodiments of systems, methods, and apparatus for generating mediasets comprising a plurality of media data items. As used herein, the term "media data item" is intended to encompass any media item or representation of a media item. A "media item" is intended to encompass any type of media file which can be represented in a digital media format, such as a song, movie, picture, e-book, game, etc. Thus, it is intended that the term "media data item" encompass, for example, playable media item files (e.g., an MP3 file), as well as metadata that identifies a playable media file (e.g., metadata that identifies an MP3 file). It should therefore be apparent that in any embodiment providing a process, step, or system using "media items," that process, step, or system may instead use a representation of a media item (such as metadata), and vice versa.

In one embodiment, a system to provide recommendations of mediasets for a given group of users is provided. Embodiments of such a system may comprise a mechanism to store playlists and/or playcounts of each member in a community of users. Playlists and playcounts may be used to define the taste of each user and may therefore be used in performing taste analyses for each of the respective users.

In accordance with the general principles set forth above, embodiments of the invention may be used to address the problem of recommending a mediaset or group playlist to a group of users in a community or network. In some embodiments, a mediaset recommender may be provided where the input is a set of media items, and the output is a mediaset of weighted media items. Two illustrative methods for providing group recommendations of mediasets include: 1) building a common profile that expresses the taste of the group of users as a whole and applying that profile to the recommender; and 2) considering individual recommendations of each member taste, and aggregating the results.

Media players are typically capable of reproducing all types of media items and collecting playcounts and playlists. Playcounts are the number of times a media item has been played in the media player. Playlists are groupings of media items that users create to organize their libraries of media items. A system (e.g., a server) may be used to collect playcounts and playlists of media items of a community of users.

Playcounts and playlists of a user may be used to synthesize her or his taste or perform a taste analysis. In that sense, user's taste may be considered a collection of the most relevant taste data considering that user's playcounts and playlists.

The task of certain embodiments of this system is to recommend a mediaset for a group of users. A mediaset recommendation for a group of users may be the result of an aggregation process of the different mediasets that are recommended to each user of the group. Thus, some embodiments of this system may include a component that recommends a mediaset from another mediaset (by performing an analysis of the taste of each user, for example). The aggregation process may apply, for example, a voting schema and/or an optimization schema.

Mediaset recommendations for a group of users may be useful in a variety of scenarios. An example is a party where a group of people want to enjoy music together. Instead of playing the music that may be recommended to a particular individual in the group, it may be desirable to play the music that would be recommended to the group as a whole.

As such, in certain embodiments, the system's task is to find a mediaset or playlist to be recommended to a group of users. In embodiments wherein the system is collecting playcounts and/or playlists from the users, such a recommender system may be composed of three main steps:

1) Synthesizing user tastes;
2) Producing recommended mediasets for each user taste; and
3) Aggregating the set of recommended mediasets into a single mediaset to be recommended to the whole group of users.

It should be understood that numerous variations on the content, scope, and order of these steps are contemplated. For example, the step of producing recommended mediasets for each user taste may be optional.

FIG. 1 depicts how the taste 108 of a user 100 may be built from the playcounts 104 and playlists 102 of that user 100 through a process 106 called Synthesize Taste. It should be understood that process 106 is one example of a taste analysis. Process 106 produces a taste 108, which may be encoded as a mediaset. As part of process 106, media items with higher playcounts and/or those that appear more in playlists may be selected. The selected media items may include those that are played more often by the user and/or those that are used in more different contexts and situations (because they appear in many different playlists). In some embodiments, playcounts may also be associated with play dates. In such cases, the process may weigh the playcounts with the play dates and therefore give more relevance to recent playcounts than to older playcounts.

Process 106 may comprise a ranking process of the media items of a user where items with higher playcounts, more recent plays, and/or more playlist appearances get a higher ranking. The process may select the top m ranked media items as the encoding of the user's taste 108. Note that this process may produce different results over time for the same user. This may be a desirable feature in embodiments in which the goal is to encode the taste of a user as it evolves over time.

Figure 2:
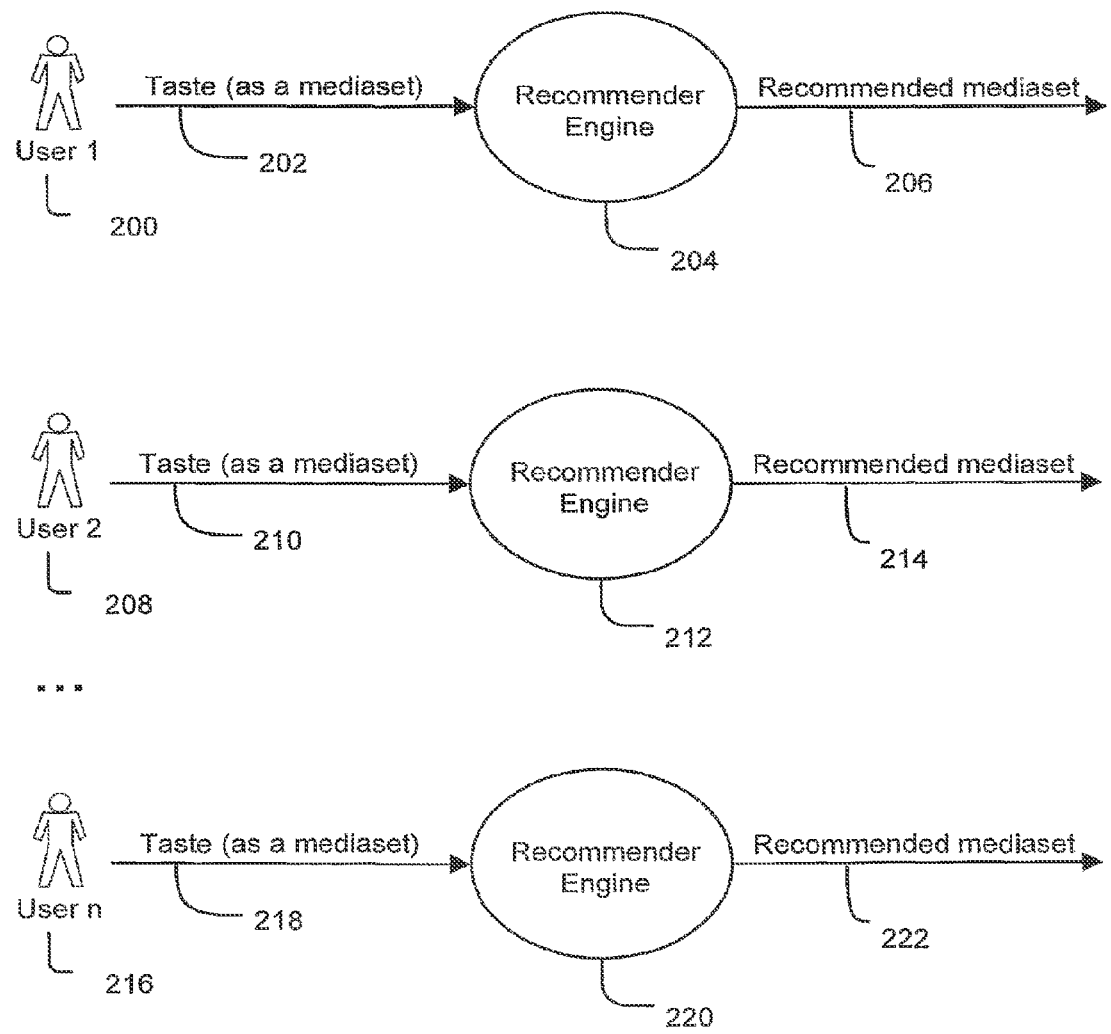
FIG. 2 is a diagram of one embodiment of a system for using taste analyses from a plurality of users to generate a plurality of recommended mediasets.

In some embodiments, the system may provide individual mediaset recommendations. For example, with reference to FIG. 2, given a group of n users 200, 208, and 216, the system may compute the individual taste (202, 210, and 218, respectively) for each user with, for example, the process described above. The system may provide a recommended mediaset for each user using a recommender engine (204, 212, and 220, respectively) that processes user tastes (mediasets 202, 210, and 218) to produce recommended mediasets 206, 214, and 222. It should be understood that a separate recommended engine may be used for each user (recommender engines 204, 212, and 220), as shown in FIG. 2 or, alternatively, a single recommender engine may be used for the entire group. Thus, in total the depicted system may compute n mediasets of m media items.

Figure 3:
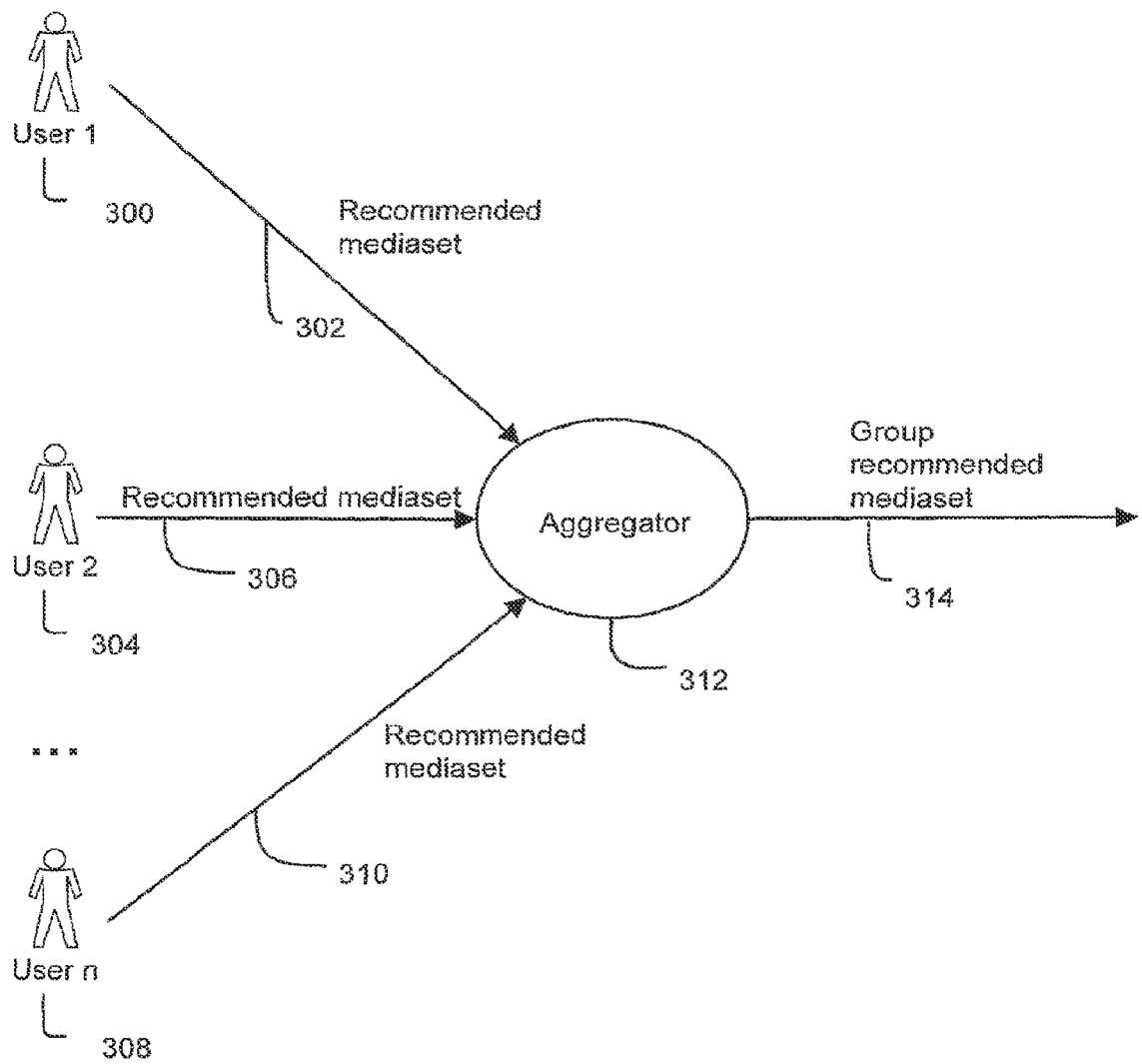
FIG. 3 is a diagram of one embodiment of a system for using recommended mediasets from a plurality of users to generate a recommended mediaset for a group of users.

In some embodiments, the system may also provide for aggregating individual recommended media sets into a group recommended mediaset or group playlist. For example, with reference to FIG. 3, once the system has computed the n mediasets of m media items (one for each user 300, 304, 308 of the group), an aggregation step may be used to produce the final mediaset of p (p≤n*m) media items 314 to be recommended to the group of users. As shown in FIG. 3, the system may provide an aggregator 312, which takes as input a recommended mediaset (302, 306, and 310, respectively) from each of the users in the group and provides therefrom a group recommended mediaset 314.

The aggregation step may be performed, for example, by following different approaches that serve different goals. As previously mentioned, in two preferred embodiments, the system may follow a) a voting schema; or b) an optimization schema. A voting schema may serve the goal of finding a mediaset that the majority of users would be happy with, without considering the degree of dislike by the rest of the members of the group. On the other hand, an optimization schema may produce a mediaset that minimizes the dislike (or maximizes the like) of all the members of the group. In order to apply an optimization schema, the media items in the n recommended mediasets 302, 306, 310 may each be linked with an associated weight. The weight of a media item in a mediaset for a user may be used to indicate the relevance of that media item for the user.

With a voting schema, the aggregation process may take the p media items that appear the most in the n mediasets. If there are items that appear the same number of times in the n mediasets (tie-break), then those items may be picked randomly.

Some recommender engines may produce mediasets having weighted media items. In such embodiments, when a tie-break situation happens, instead of picking the items randomly, the process may pick the media items with highest weights. For example, considering the following mediasets:
 ms1={s3, s7, s8, s10}
 ms2={s2, s3, s4, s10}
 ms3={s3, s4, s7}
then, following the voting schema described above, the media items (s#) in the mediasets (ms#) would be ranked as follows:
 s1=0, s2=1, s3=3, s4=2, s5=0, s6=0, s7=2, s8=1, s9=0, s10=2

Thus, the media items for the recommended group mediaset would be selected in the following order: s3, s4, s7, s10, s2, s8. Media items s7 and s10 are in a tie-break situation, so they could be ordered in accordance with their respective weights within their mediasets, if any. If the media items do not have associated weights, then the order of s7 and s10 may be randomized. The same would apply for items s2 and s8.

With an aggregation schema, the aggregation process may take the p media items that optimize some utility function considering all the users of the group, that is, considering all n mediasets 302, 306, 310. In order to apply the optimization schema, the media items in the n mediasets 302, 306, 310 may have an associated weight, for example, in the range from 0 to 1, where 0 means that the item is not relevant at all and 1 means that the item is the most relevant. For a given mediaset j, a media item i may therefore have a weight w(j,i). If a media item i is not in a mediaset j, then it may be considered to have a weight 0. The following example illustrates the weights associated with media items for a collection of mediasets:
 ms1={s3, s7, s8, s0})
 ms2={s2, s3, s4, s7, s10}
 ms3={s3, s4, s7}
 w(1)=[0, 0, 0.1, 0, 0, 0, 0.3, 0.2, 0, 0.9]
 w(2)=[0, 0.2, 0.5, 0.4, 0, 0, 0.3, 0, 0, 0.9]
 w(3)=[0, 0, 0.1, 0.8, 0, 0, 0.3, 0, 0, 0.5]

A number of different utility functions may be chosen in order to aggregate the media items. For example, a utility function may be selected to maximize the sum for all p selected items of the highest weight in any of the n mediasets. If it is desired to select p=3 items in accordance with this utility function, s10, s4, and s3 would be selected. The sum of the highest weights for these items is 0.9+0.8+0.5=2.2, which is the maximum we can get with the above example.

Alternatively, a utility function may be selected to maximize the sum for all p selected items of the lowest weight in any of the n mediasets. If it is desired to select p=3 items in accordance with this utility function, s10, s7, and s3 would be selected. The sum of the lowest weights for these items is 0.5+0.3+0.1=0.9, which is the maximum we can get with the above example.

As still another alternative, a utility function may be selected to maximize the sum for all p selected items of the mean weight of all of the n mediasets. If it is desired to select p=3 items in accordance with this utility function, s10, s4, and s7 would be selected. The sum of the average of weights for these items is 2.3/3+1.2/3+0.9/3=1.16, which is the maximum we can get with the above example. Of course, other utility functions may be employed, as will be apparent to one having ordinary skill in the art.

A recommender engine may be provided in some embodiments. In embodiments that do not include a recommender engine, the mediasets that encode the user tastes may be directly aggregated to form the mediaset that would be recommended to the whole group of users.

A system using the recommender engine may propose mediasets to discover new music, whereas a system that does not provide a recommender engine may propose mediasets with media items already known by at least one of the users in the group.

As should be apparent, the aforementioned systems and methods may produce mediaset recommendations for a group of n users so as to enable proposing a mediaset that can be enjoyed simultaneously by a group of users. The system may analyze user tastes from playlists and/or playcounts, so as to allow the user tastes to be represented as mediasets. These n user tastes can be then the input of a recommender engine that may suggest another n mediasets. An aggregation process that takes these mediasets and produces a single group mediaset may also be provided. Such a process can be done using, for example, a voting schema or an optimization schema. Similar systems may operate without a recommender engine. In such embodiments, the aggregation process may operate with the mediasets that represent the tastes of the n users, and the result may comprise a mediaset that can be recommended to the whole group of users.

Additional embodiments are disclosed and described with reference to FIGS. 4-14. In some of these embodiments, composite playlists may be built of media items in individual libraries on multiple media devices in a common location and/or through a communication network. The media devices in the group may include portable and/or non-portable devices. A means for playing the composite playlist may step through the playlist in sequence and cause the media player with the indicated media item to stream it to one or more of the other players where possible. Such embodiments may operate under, for example, a client-server architecture or a P2P distributed architecture. These embodiments may therefore be used to coordinate a set of media players to transmit media items on the specified group playlist in streaming fashion to each of the individual media players, or to a specified subset of the media players, in the sequential order they are listed on the group playlist. This may be accomplished without transferring standalone copies of the media items between the various media players.

Those skilled in the art will recognize that systems incorporating the features of one or more of the above-described embodiments may be realized as a collection of media devices whose design embodies the disclosed functional behavior, as a collection of layered protocols in the 7-level ISO Open Systems Interconnection Reference Model, or as an application task in media devices communicating using standard networking protocols.

Some preferred implementations may comprise three major components. The first component is a plurality of Session Managers which collectively coordinate the information needed to designate and manage the status of each media player with regard to a plurality of other media player devices engaged in a period of collaborative activity referred to as a "session". In a preferred implementation, one Session Manager may be associated with each media player device, although this need not be the case in all implementations. The Session Managers may include means for verifying the eligibility of each device to join the session. This may be accomplished by virtue of the eligible users being subscribed to a service, which may provide legal access to the media items to be collectively enjoyed.

The second component of the aforementioned implementation is a Playlist Builder, which may reside, for example, on one of the media players, on a server, on a network access controller included in the system, or on a third-party server accessible to the media player devices through a communication network. The Playlist Builder may use information, such as taste data, available about the users in the group, and the collective set of media items available to the media players, to build a group playlist compatible with the collective tastes of the group.

The third component of the aforementioned implementation is a plurality of Playlist Managers, one associated with each media player device, which collectively communicate with the Playlist Builder to provide the information needed to build the group playlist and to play the media items on the group playlist. The Playlist Manager associated with each media player device may include functionality for communicating the availability of media items on the media player device, either in a local library or from a media streaming service accessible by a media player, for example. The Playlist Manager may also include a Playlist Play subcomponent, which may work in coordination with the counterpart subcomponents on the other media players in the session to step through each item on the group playlist, and may be configured to cause the media player associated with a media item to stream it to one or more of the other players as each media item is encountered.

Figure 4:
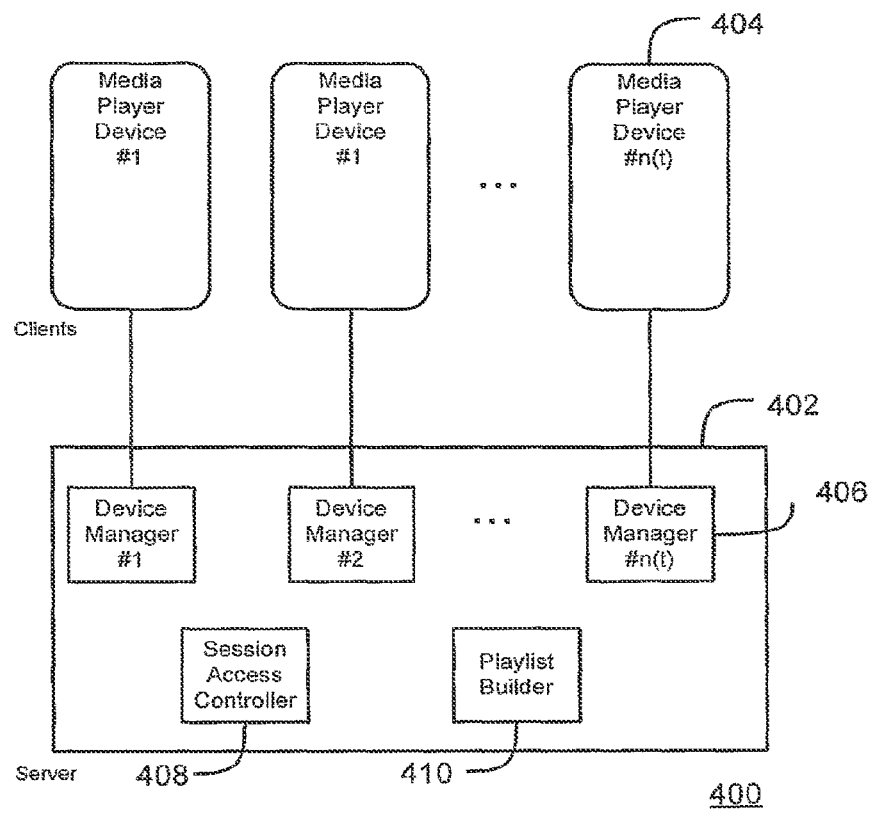
FIG. 4 is a system diagram of a client-server embodiment of the invention.
Figure 5:
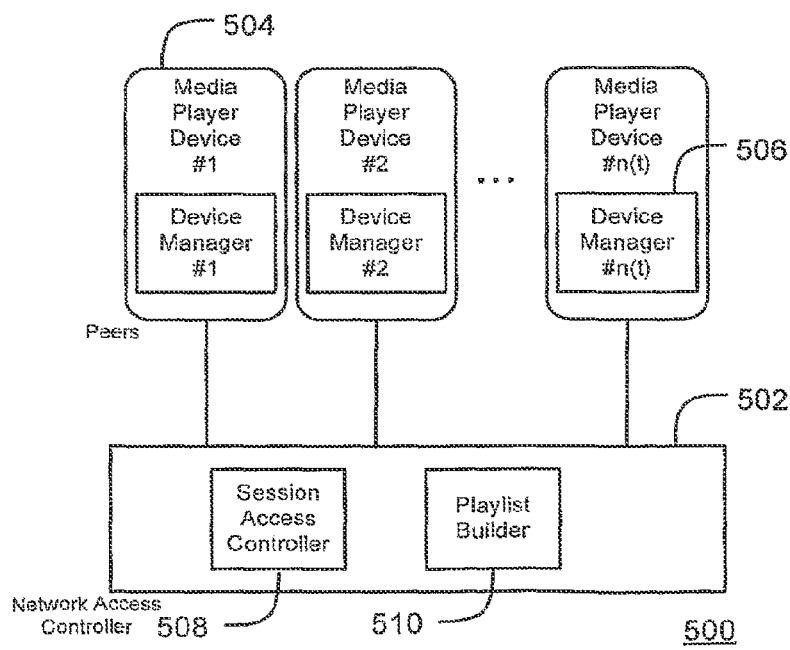
FIG. 5 is a system diagram of a peer-to-peer embodiment of the invention.

With reference again to the drawings, further aspects of certain embodiments will now be described in greater detail. Two such alternative embodiments are shown in FIGS. 4 and 5. FIG. 4 is a system diagram of a client-server embodiment 400 and FIG. 5 is a system diagram of a peer-to-peer embodiment 500. Both embodiments of the invention may have the same essential components. However, the client-server embodiment 400 of FIG. 4 will be described in greater detail herein than the peer-to-peer embodiment. Nevertheless, it should be understood that the disclosure provided herein may apply equally to the peer-to-peer system with the appropriate system organizational differences, as depicted in the figures.

The key components of a client-server embodiment 400 are the server functional unit 402 and one or more Media Player Device clients 404. The server 402 may include three basic functional components: 1) A Session Access Controller 408, which may be used to grant permission for an individual media player to join the collaborative interaction between devices; 2) A Playlist Builder 410, may be used to construct the list and sequence of media items to be played in the group playlist during the session; and 3) A Device Manager 406 for each Media Player Device 404 in the session, which may be used to control the session-related functions of the device.

The peer-to-peer embodiment 500, as shown in FIG. 5, also includes a plurality of media player devices 504. Each of the media player devices 504 may include a device manager 506. A network access controller 502 may also be provided, which includes a session access controller 508 and a playlist builder 510 for receiving media item data from the plurality of media devices and for building a composite playlist of media data items from the media item data.

Figure 6:
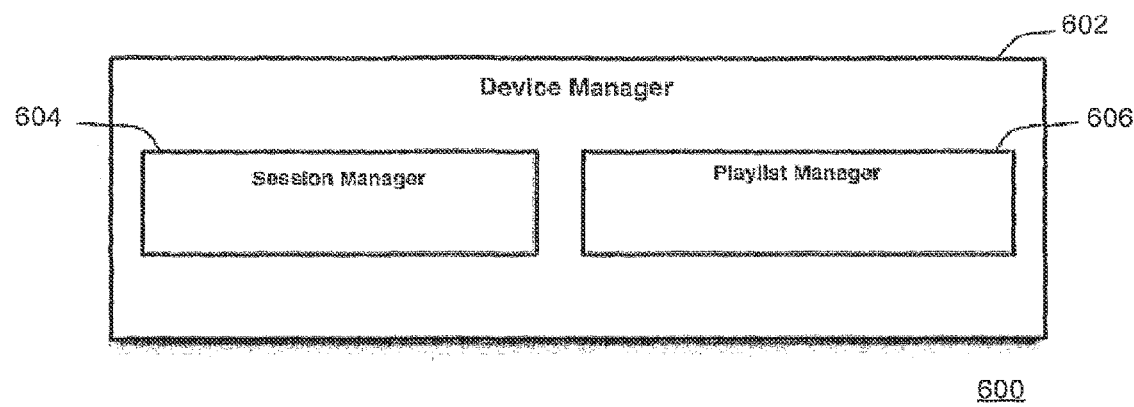
FIG. 6 depicts the main functional components of a Device Manager according to one embodiment.

The device manager for each media player device may include a session manager and a playlist manager. For example, FIG. 6 depicts a device manager 602 having a session manager 604 and a playlist manager 606. Session manager 602 may be configured to manage the status of the media device with which it is associated.

Figure 7:
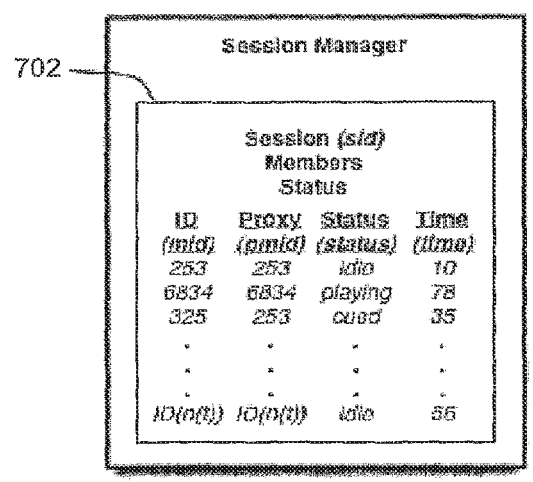
FIG. 7 depicts a Member Status screen of a Session Manager, which presents the relevant details of the data structures in the Session Manager subcomponent of the Device Manager of one embodiment.

FIG. 7 depicts a Member Status screen 702 that is associated with one embodiment of a session manager. As shown in FIG. 7, the session manager may track a series of categories of information for each of the media players in the session, such as ID, proxy, status, and time period information.

Playlist manager 606 may be configured to communicate with a playlist builder to send the media item data of the media device with which it is associated to the playlist builder and to play the media data items on the composite playlist on the media device with which it is associated.

As shown in FIG. 4 for the server-client configuration, and FIG. 5 for the peer-to-peer configuration, each media player device 404 may have an associated instance of the device manager 602 of FIG. 6. In addition, the server 402 and network access controller 502 may include a single instance of the session access controller 408, 508 and the playlist builder 410, 510.

The session access controller 408, 508 may interact, as described in greater detail later, with the session manager 604 in the device manager 602 of each media device 404 in a system to define the set of media devices comprising a session, and to enable communications between them. Similarly, the playlist builder 410, 510 may operate with the playlist manager 606 in the device manager 602 to define and perform a sequence of media items in a session.

Figure 8:
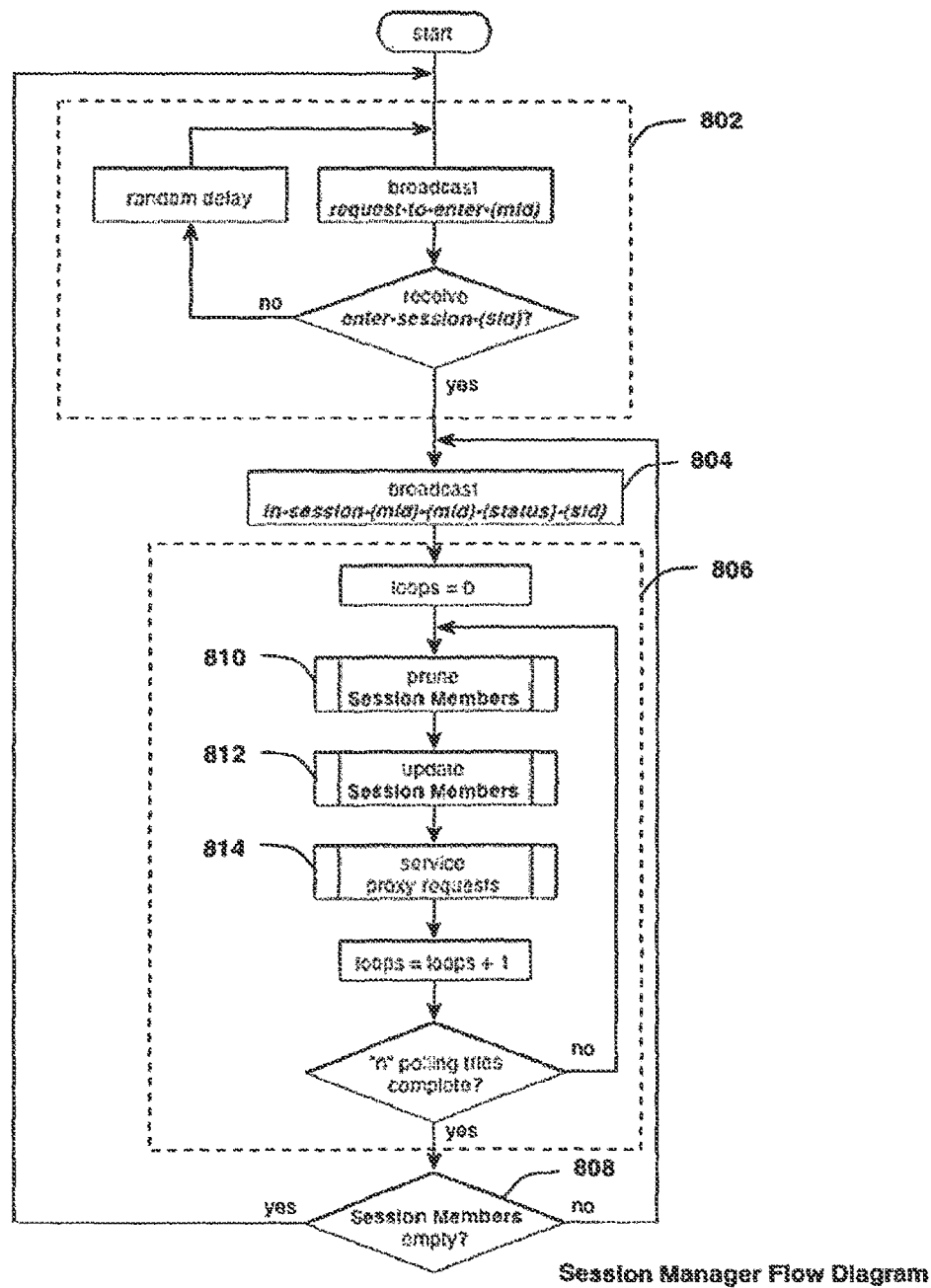
FIG. 8 is a top-level flow diagram of the operation of the Session Manager subcomponent of the Device Manager of one embodiment.

FIG. 8 presents a top-level flow diagram of one embodiment of a session manager 604 in a device manager 602. The session manager of an individual media player device may be used to negotiate the introduction, operation, and departure of the device in a media playing session (henceforth "session"). This may include maintaining knowledge of all other media players devices in the session.

The session manager 604 may assume the presence of a single session access controller 408 on a server system 402 in, the client-server configuration, or on a privileged peer-to-peer network access system 502 in the peer-to-peer configuration. In peer-to-peer embodiments, the network access system could be implemented on the system found in some peer-to-peer networks, which hosts network-level functions, while in other embodiments it could be implemented on one peer system in the network.

The session access controller's primary function in some embodiments is to serve a session sID code in response to a "request-to-enter" session message from devices seeking admission into a session as an indication permission has been granted to the device. In some embodiments, that permission may be granted if the media player mID code from the device supplied with the "request-to-enter" message is recognized as an mID eligible for admission to a session. In other embodiments, the session access controller may instead supply a dynamic mID back to the requesting media player device to serve as a unique identifier for the device in the context of the session along with the returned session sID code. In some embodiments, the session access controller may largely be functional in the networking protocol for the underlying communications network linking the media player devices, and the mID and sID may be codes derived from parameters in the network protocol that identify devices and communication sessions or transactions.

The session manager may include two major subfunctions 802 and 806, as shown in FIG. 8. Subfunction 802 mediates the admission of the media player into a session while subfunction 806 implements the process by which the media player maintains cognizance of the other media players in the session via the communication network linking.

The starting step for the session manager flow diagram of FIG. 8 assumes the media player is not participating in a session. As shown in the subfunction of 802, the session manager broadcasts a "request-to-enter" message with an optional "mID" code. If the media device successfully communicates with a session access controller that grants the media player access to a session, the media player will receive an "enter-session-sID" message indicating that the media player has been granted permission to enter the session identified by the sID code. In embodiments having only one session, the sID code would be superfluous and may be omitted or a default value returned.

If an "enter-session-sID" response message is not received, the session manager waits a random amount of time before transmitting another "request-to-enter" message. In some embodiments, the session manager may just wait a random amount of time after transmitting a "request-to-enter" message before transmitting another "request-to-enter" message if an "enter-session-sID" response is not received. In other embodiments, the session manager may wait a fixed amount of time after sending the "request-to-enter" message and then, if no "enter-session-sID" response is received, wait a random amount of time before transmitting the next "request-to-enter" message. In yet other embodiments, the session manager may wait until some external event occurs after sending the "request-to-enter" message, rather than receiving an "enter-session-sID", and then wait a random amount of time before transmitting the next "request-to-enter" message.

Upon receipt of an "enter-session-sID" response from the session access controller, the session manager broadcasts the "in-session-mId-mId-status-sID" message, as indicated at 804. By broadcasting this message, the session manager indicates its presence in the session to the session managers in all of the other devices in the session. The parameters of this message (m/D, mID, status, sID), are the mID of this media player device, the mID of another media player device in the session that knows about this device by proxy (set here to the mID of this media player device because no proxy is involved), the status of the playlist manager component 606 of the device manager 602, and the session sID.

After broadcasting the "in-session-mId-mId-status-sID" message, the session manager initiates the subfunction 806, which maintains knowledge of the other media players in the session identified by a particular sID. Subfunction 506 is a polling loop that maintains the information in a session manager state data structure, such as that shown in FIG. 7. The Device Manager 602 in each media player maintains a copy of the session manager state autonomously for each session, as identified by a unique sID, in which the media player is a participant. This state information may include several elements for each of the other media players in the session known to the subject media player: One such element is the mID of the media player. Another is the mID (referred to as the pmID) of the proxy media player in the session known to the subject media player, which knows the media player identified by mID is in the session, even if that media player is not known directly to the subject media player. A third example is the status of the media player. Still another example is the amount of time since this media player was last affirmatively known to be in the current session by the subject media player.

The polling loop in Subfunction 806 may be executed a number of times "n" as determined by the implementation. This number is relatively arbitrary, and typically is selected to achieve a desired "liveliness" criteria for the session manager and the session maintenance protocol. "Liveliness" here refers to how often the subject media player indicates its presence in the session to the other media players in the session. As the flow diagram indicates at 804, the session manager may broadcast an "in-session-mid-mid-status-sid" message to the other media players to indicate the subject media player is still active in the session and make its status known to those media players if the session manager state data table 702 includes entries for other media players. If the session manager state data table 702 is empty, the session manager may instead revert to searching for a session to join by initiating the session join subfunction 802.

Figure 9:
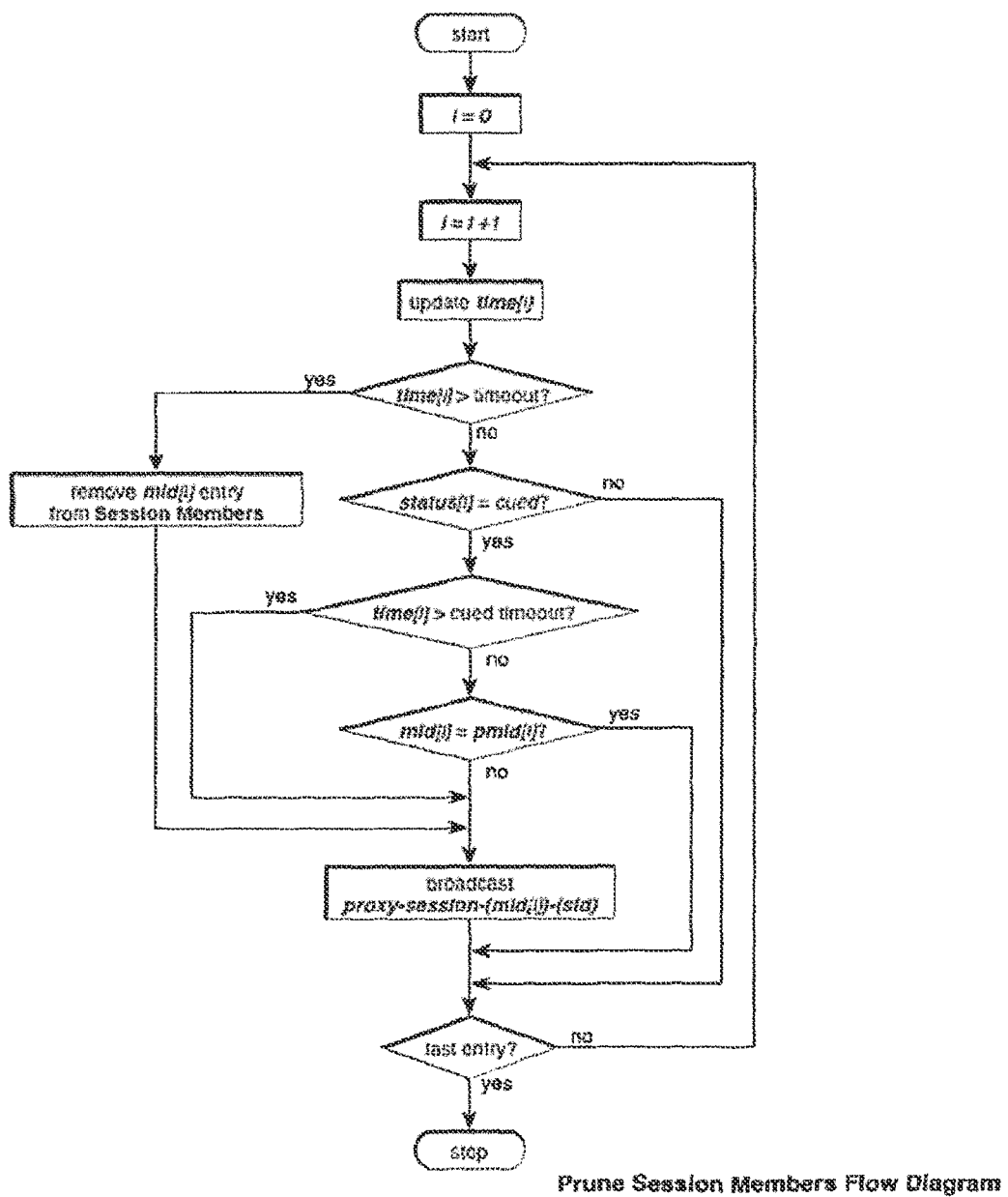
FIG. 9 is a more detailed flow diagram of the "Prune Session Members" step in the Session Manager flow diagram of FIG. 8.
Figure 10:
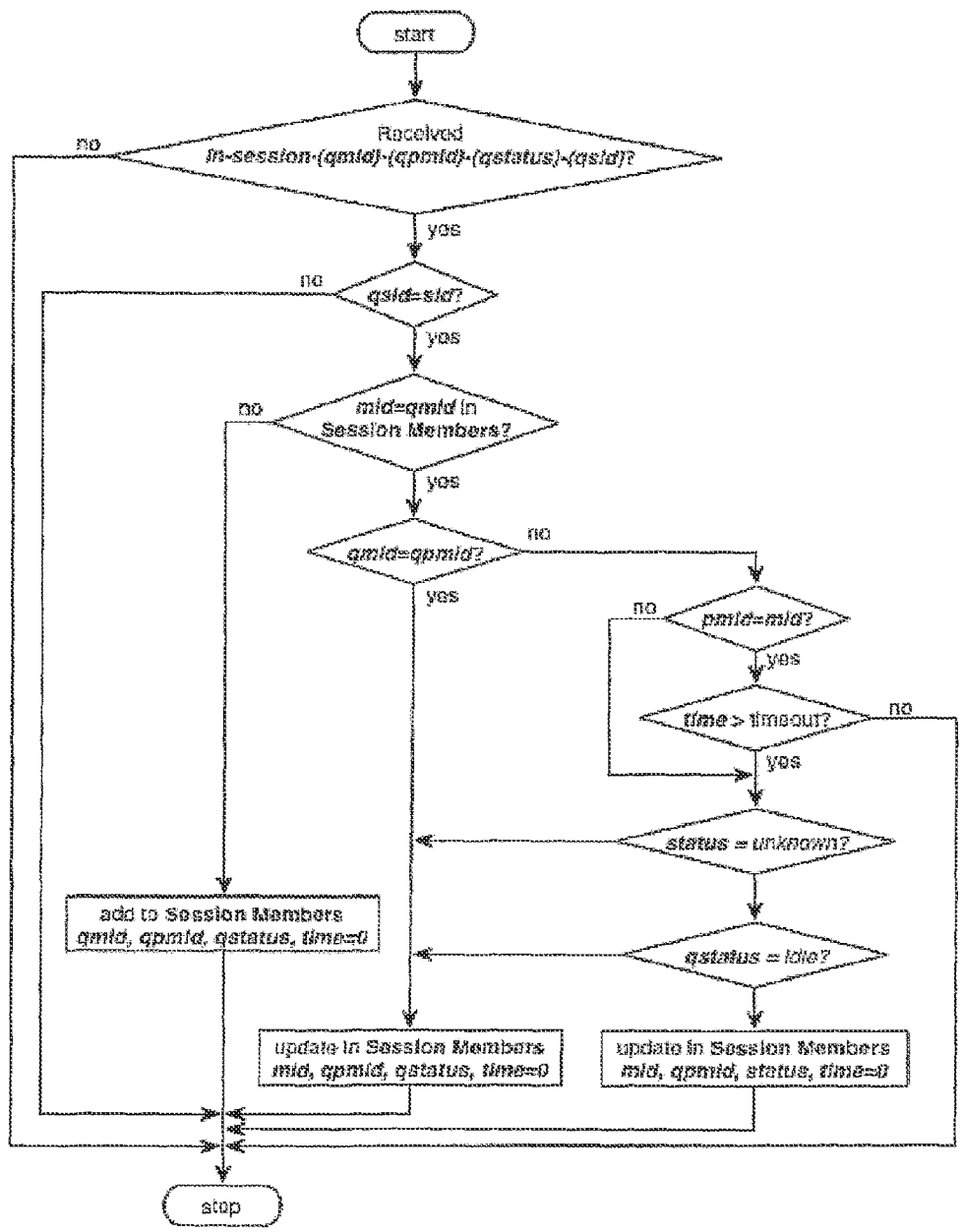
FIG. 10 is a more detailed flow diagram of the "Update Session Members" step in the Session Manager flow diagram of FIG. 8.
Figure 11:
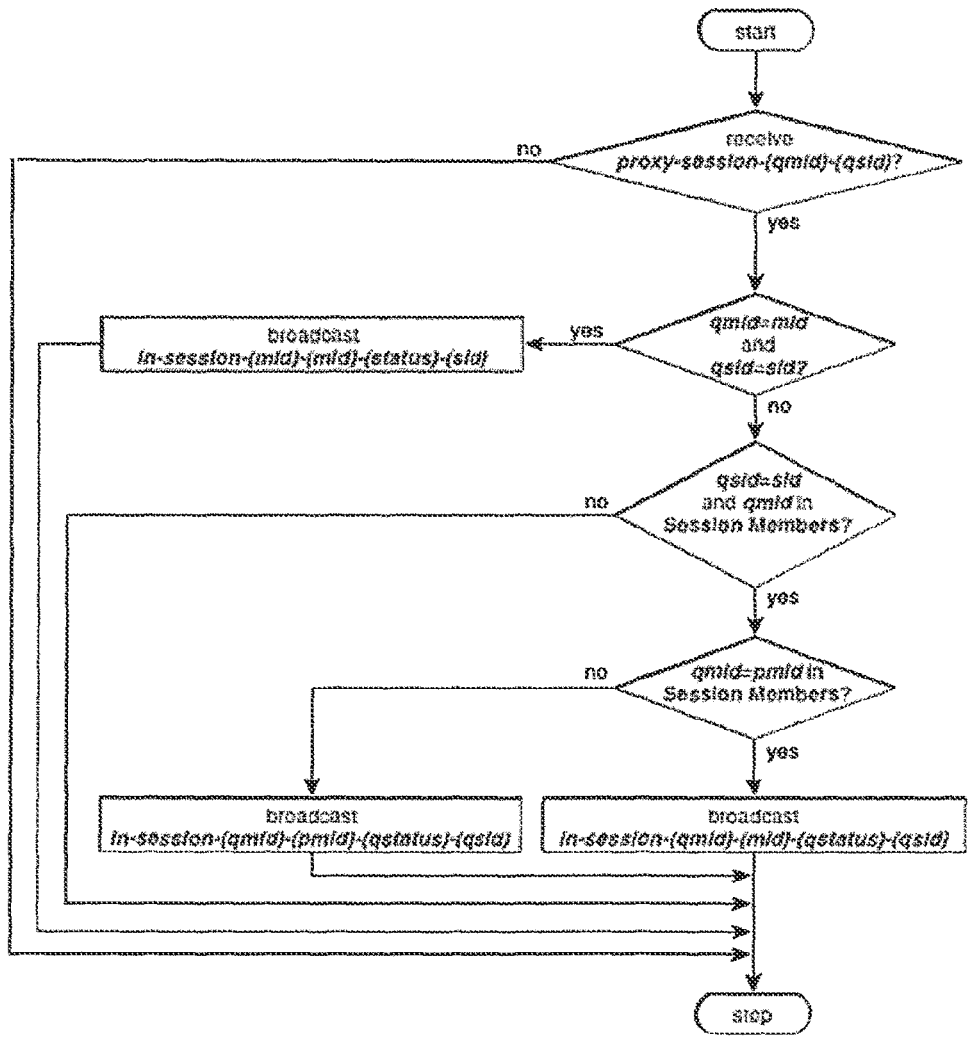
FIG. 11 is a more detailed flow diagram of the "Service Proxy Requests" step in the Session Manager flow diagram of FIG. 8.
Figure 12:
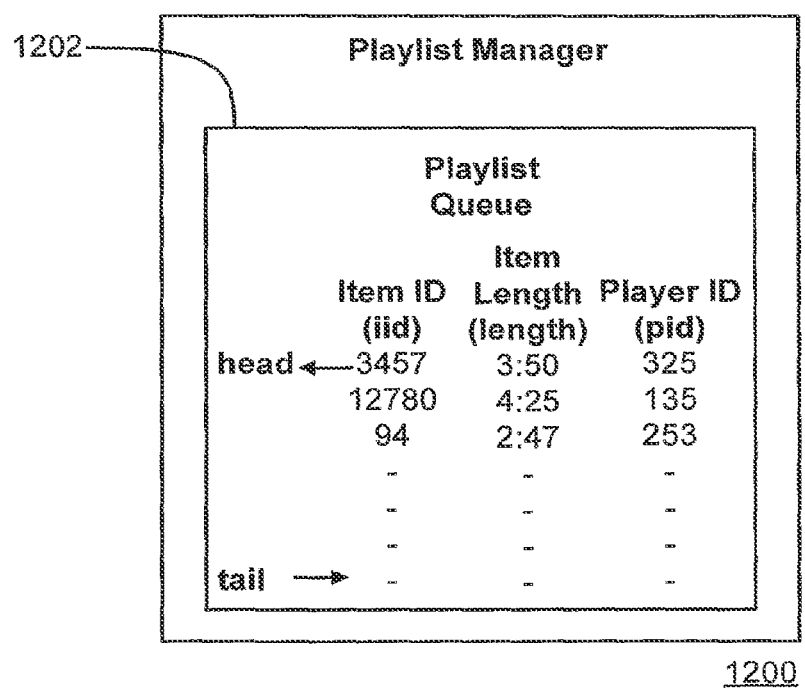
FIG. 12 depicts a Playlist Queue screen of a Playlist Manager, which presents the relevant details of the data structures in the Playlist Manager subcomponent of the Device Manager of one embodiment.

Subfunction 806 may maintain knowledge of the other media players in the session by repetitively executing the three processes 810, 812, and 814 shown in FIG. 8, each of which are shown in greater detail in FIGS. 9-11, respectively. The "Prune Session Members" process 810 scans the session manager state data structure 702 and removes entries corresponding to media players from which the subject media player has not received an affirmative indication that they are still in the session, and therefore are inferred to have left the session. The "Update Session Members" process 812 processes messages from other media players that are therefore inferred to have joined or remained in the session. Finally, the "Service Proxy Requests" process 814 responds to requests from other media players if the session manager state data structure 702 includes an entry for a media player known directly to the subject media player that has been only known to another media player by proxy via the subject media player.

Describing each of the processes 810, 812, and 814 in turn, the "Prune Session Members" process 810 (FIG. 9) may perform one of the following three operations on the entry for each media player i in the session manager data structure 702.

1) The entry is removed if the time if that the media player was last affirmatively known to the subject media player exceeds an implementation specified timeout value. A "proxy-session-mID-sID" query is then broadcast to request if the media player corresponding to the removed entry is still known to another media player in the session.

2) A "proxy-session-mID-sID" query is broadcast to request if the media player is still known to another media player in the session, and the media player entry status has been marked as "cued" (meaning that the media player was scheduled to perform a track by the Playlist Manager process described below), and if one of the two following conditions exist: a) If the time[i] that the media player was last affirmatively known to the subject media player exceeds an implementation specified cued timeout value, meaning that the subject media player did not receive an indication that the media player corresponding to the entry transmitted a state change out of the cued state; b) If the time[i] that the media player was last affirmatively known to the subject media player does not exceed an implementation specified cued timeout value, but the media player corresponding to the entry is only known to the subject media by proxy via another media player in the session. In this case, the subject media player would only learn of a state change by the media player corresponding to the entry if that state change is broadcast by the proxy media player in response to the "proxy-session-mID-sID" query.

3) Nothing is done to the entry for the media player in the event neither of the above conditions apply.

The "Update Session Members" process 812 (FIG. 10) receives the "in-session-mID-pmID-status-sID" messages broadcast by the session manager and the "Service Proxy Requests" process 814 and updates the session manager state data structure 702. The process assumes that the protocol of the network over which the media players communicate buffers all "in-session-mID-pmID-status-sID" messages until they can be processed. Each received message in which the message sID matches the ID of the session is processed in one of the five following ways:

1) An entry corresponding to the media player with the mID of the message is added to the Session Manager state data structure if no entry with mID as the ID already exists.

2) If the mID and the pmID of the message match, implying that this message was transmitted by a media player that is now directly known to the subject media player, the entry in the data table for the media player with mID is updated with the status from the message. The time since the media player with mID was last affirmatively known to the subject media player is reset to 0 seconds.

3) The entry in the data table for the media player with mID is updated with the proxy media player ID pmID and the status from the received "in-session-mID-pmID-status-sID" message, if the received message is a proxy message (miID, pmID differ), the media player referenced by the message is currently known to the subject media by proxy (mID, pmID for the entry in the Session Manager state data structure differ) or the time since the media player with mID was last affirmatively known to the subject media player has exceeded an implementation timeout value, and either the status of the referenced media player is unknown or the status in the message is idle. The time since the media player with mID was last affirmatively known to the subject media player is reset to 0 secs.

4) The entry in the data table for the media player with mID is updated with just the proxy media player ID pmID from the received "in-session-mID-pmID-status-sID" message, if the received message is a proxy message (miID, pmID differ), the media player referenced by the message is currently only known to the subject media by proxy (mID, pmID for the entry in the Session Manager state data structure differ) or the time since the media player with mID was last affirmatively known to the subject media player has exceeded an implementation timeout value, and the status of the referenced media player known and the status in the message is idle. The time since the media player with mID was last affirmatively known to the subject media player is reset to 0 secs.

5) Nothing is done if the received "in-session-mID-pmID-status-sID" is a proxy message (miID, pmID differ), the media player referenced by the message is currently known to the subject media player (mID, pmID for the entry in the session manager state data structure match), and the time since the referenced media play was last affirmatively known to the subject media player does not exceed an implementation-defined timeout value.

The "Service Proxy Request" process 814 (FIG. 11) provides information about any media players the subject media player affirmatively knows to the other media players in the session in response to the "proxy-session-mID-sID" request messages, which may have been broadcast by the "Prune Session Members" process 810 of any media player in the session identified by sID. As with the "Update Session Members" process, this process assumes that the protocol of the network over which the media players communicate buffers all "proxy-session-mID-sID" messages until they can be processed. Each received "proxy-session-mID-sID" message in which the message sID matches the ID of the session may be processed in one of the four following ways:

1) An "in session-mID-pmID-status-sID" message is broadcast, where pmID=mID and the status is that of the subject media player, if the subject media player corresponds to the mID of the request.

2) An "in session-mID-pmID-status-sID" message is broadcast, where pmID=mID, and the mID and status parameters are those in the session manager state data structure 702 for the media player referenced by the query, if the media player mID of the query is known affirmatively to the subject media player (mID of the query and pmID in the state manager state data structure match).

3) An "in session-mID-pmID-status-sID" message is broadcast, where the pmID and status parameters are those in the session manager state data structure 702 for the media player referenced by the query, if the media player mID of the query is only known to the subject media player by proxy (mID of the query and pmID in the State Manager state data structure differ).

4) Nothing is broadcast if the "proxy-session-mID-sID" message does not reference the subject media player or a media player in the Session Manager state data structure 402 known to the subject media player.

Figure 13:
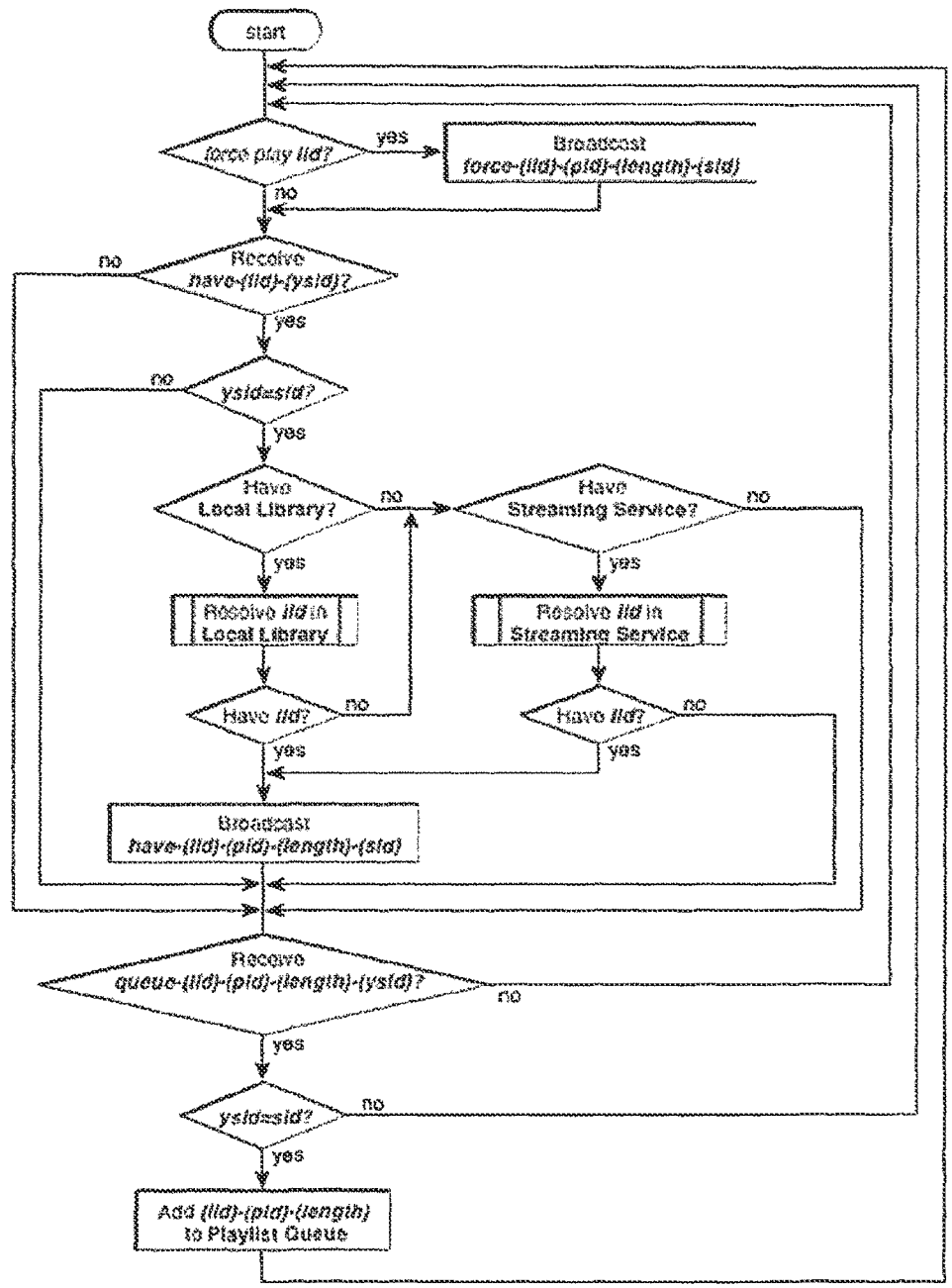
FIG. 13 is a flow diagram showing the operation of the Playlist Manager subcomponent of the Device Manager of one embodiment.
Figure 14:
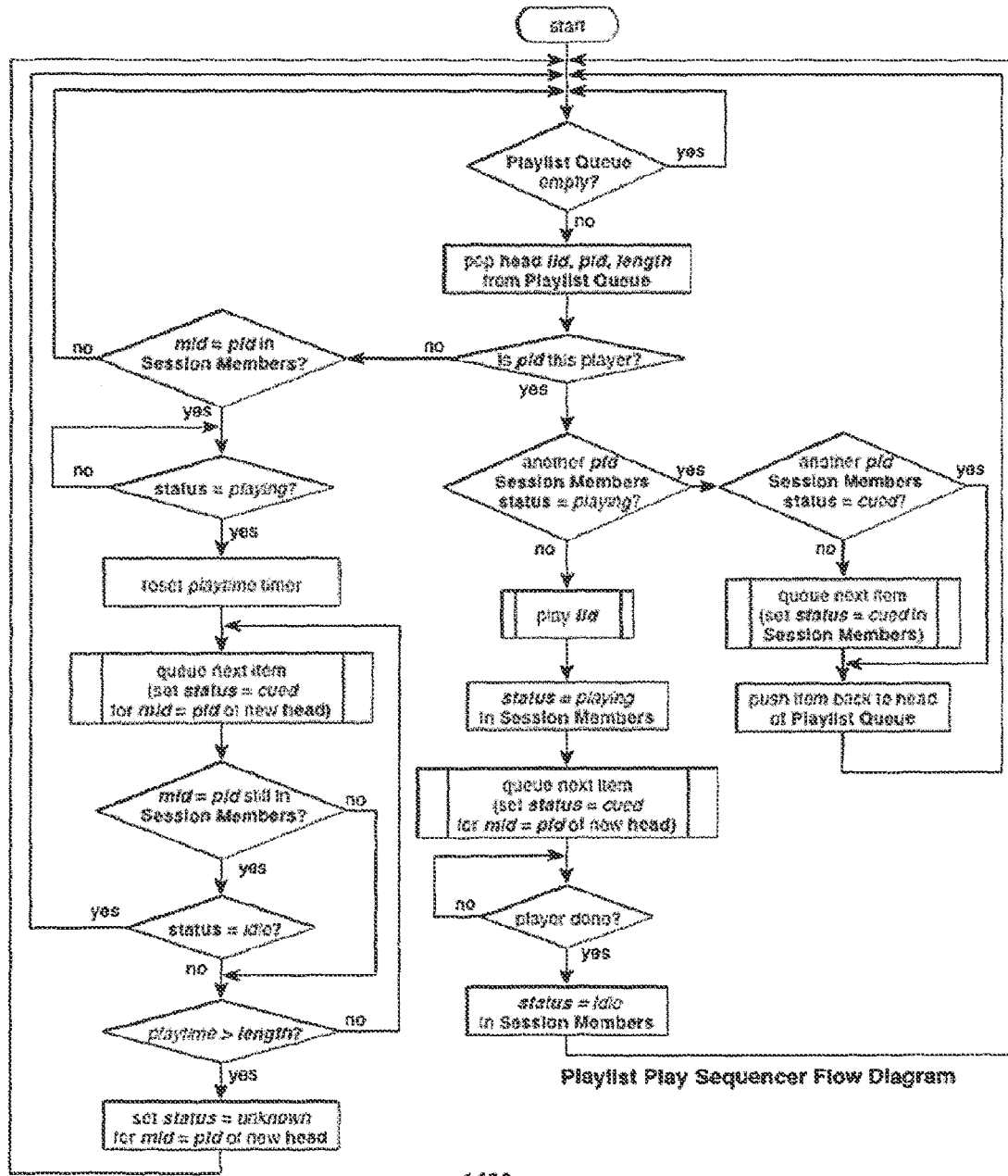
FIG. 14 is a flow diagram showing the operation of the Playlist Play subcomponent of the Playlist Manager of a Media Player Client embodiment.

The Playlist Manager of an individual media player device may consist of two major subfunctions: First, the "Playlist Queue Updater" process 1300, as depicted in FIG. 13, which negotiates the sharing of playlist information between the media playing devices in the session. And, second, the "Playlist Play Sequencer" process 1400, as depicted in FIG. 14, which controls performance of the media items by the subject media player.

The Playlist Manager 1200 (FIG. 12) assumes the presence of a single Playlist Builder on a server system in the client-server configuration, or on a privileged peer-to-peer network access system in the peer-to-peer configuration. In peer-to-peer embodiments, the playlist builder could be implemented on the system found in some peer-to-peer networks, which hosts network-level functions, while in other embodiments it could be implemented on one peer system in the network. The "Playlist Queue Updater" may provide the data from the media player to the Playlist Builder that is used in the playlist building process. The Playlist Builder will be described in detail subsequently.

Figure 15:
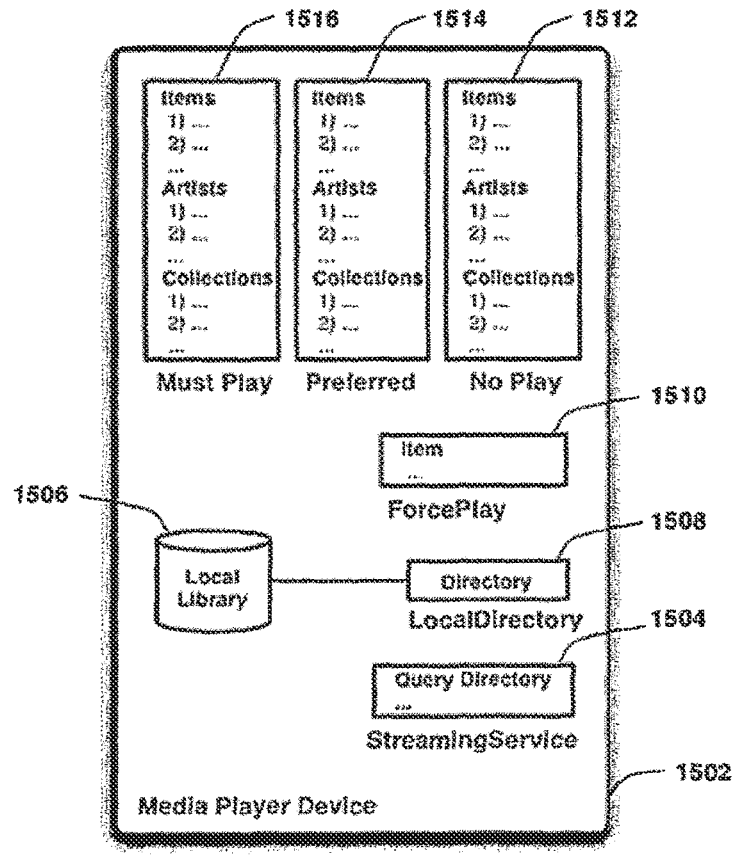
FIG. 15 depicts the relevant data structures in one embodiment of the Media Player Client supporting the Playlist Builder component of the system.

The Playlist Manager 1200 also assumes that the media player makes available several data items relevant to the playlist building process depicted conceptually in FIG. 15. In some embodiments, the media player device 1502 may store media items in a local library 1506, and provide a mechanism for querying the local directory 1508 to determine whether a specific media item is available for performance by the media player. In other embodiments, the media player 1502 may download or stream media items from a remote service over a communication network on demand, and provide a mechanism for querying a directory 1504 of media items available from the remote service for performance by the media player. FIG. 15 also depicts several other data items maintained by the media player relevant to the playlist building process, including indication 1510 of a media item that should be preemptively added to the playlist, and lists of items 1512, 1514, and 1516 of items that user does not want added, added preferentially, and added if at all possible, respectively, to the playlist.

FIG. 13 presents a top-level flow diagram of the "Playlist Queue Updater" process 1300. As the figure illustrates, this may be a repetitive process performed ad infinitum. The "Playlist Queue Updater" first determines if the user of the subject media player has requested that a particular media item be added to the playlist being built, and sends a "force-iId-pid-length-sid" message to the Playlist Builder if so. This message specifies the media item by iID, the pID of the media player (this is the same value as mID used by the Session Queue Updater described previously), the length in time units of the media item, and the sID for the session.

After any user request that a specific media item be added to the playlist has been processed, the "Playlist Queue Updater" then checks if a "have-iID-sID" request message has been received from the Playlist Builder inquiring whether the subject media player can provide a specific media item for the playlist. The process assumes that the protocol of the network over which the media players communicate buffers all "have-iiD-sID" request messages until they can be processed. Each received message in which the message sID matches the ID of the session may be processed in one of three following ways:

1) A "have-iID-pID-length-sid" message is broadcast if the subject media player pID has access to the requested media item iiD with length "length" from a local library of media items.

2) A "have-iID-pID-length-sid" message is broadcast if the subject media player pID does not have access to the requested media item if iiD with length "length" from a local library of media items, but does have access to the requested media item from a remote service.

3) No response is broadcast if the media player does not have access to the requested media item.

In some embodiments, the "Playlist Queue Updater" may take into account the user's preferences with regard to media items, as indicated by the lists 1512, 1514, and 1516 in determining whether to supply a "have-iID-pID-length-sid" message in response to a "have-iID-sID" request message. For example, the "Playlist Queue Updater" may not respond to the "have-iID-sID" message even if the requested item is in the catalog 1504 or 1506 of the device if it is also on the "no play" list 1512. Similarly, the "Playlist Queue Updater" may respond optionally according to some statistical or other criteria if the item is on the "preferred" list 1514. And the "Playlist Queue Updater" may always respond if the item is on the "must play" list 1514.

The last step in an iteration of the "Playlist Queue Updater" flow diagram processes at least one "queue-ID-pID-length-sID" message from the Playlist Builder, if any have been received. The process assumes that the protocol of the network over which the media players communicate buffers all "queue-iID-pID-length-sID" messages until they can be processed. In some embodiments, the "Playlist Queue Updater" may process only a single "queue-iID-pID-length-sID" message per iteration by adding an entry to the Playlist Queue data structure in the Playlist Manager, consisting of the iID, length, and pID items from the message. In other embodiments, it may process multiple or all pending "queue-iID-pID-length-sID" messages.

In one embodiment, performance of the playlist is, in effect, directed by the Playlist Builder. As described later, the Playlist Builder may broadcast a "queue-iId-pID-length-sid" message to all the media players in the session requesting that media item be added to the Playlist Queue data structure 1202 in the Playlist Manager 1200. The Playlist Builder sends this message at the actual time the media item should be performed and the media player accepts that message as a command to perform the specified media item. In a variant of this embodiment, the Playlist Builder may send this message just sufficiently before the time the media item should be performed to allow the media item to perform any processing required to initiate the performance by the time the performance is to start.

In another embodiment, the "Playlist Play Sequencer" process 1400 of the Playlist Manager 1200 shown in FIG. 14 locally coordinates the performance of the items on the playlist that are actually performed by the subject media player with the performance of the other media items on the playlist by the appropriate media players. All media players in the session may have a copy of the Playlist Queue 1202. This copy may be imperfect: It could be missing items at the head of the queue that were put on the playlist before the subject media player joined the session, or in the middle of the queue due to communication failures. The Playlist Play Sequencer may cause the subject media player to synchronize its performances of individual media items with the performance of media items by other media players in the session in the presence of these possible gaps in the playlist.

The "Playlist Play Sequencer" 1400 may be an iterative process which achieves the synchronized performance in the presence of gaps by processing the item at the head of the Playlist Queue 1202 in, for example, one of the three following ways:

1) If the pID of the media item at the head of the queue is not the pID of the subject media player, corresponding to the left branch of the flow diagram, the "Playlist Play Sequencer" essentially just idles, monitoring the status of the media player with mID=pID in the Session Members state data structure 702 until it is inferred that the media item has been performed. The subject media player infers the media item has been performed when either a transition from played to idle is observed, or the value of the local playtime timer exceeds the performance length of the media item.

2) If the pID of the media item at the head of the queue is the pID of the subject media player, and the Session Members state data structure 702 does not include an entry for another media player with the status value playing, corresponding to the middle branch of the flow diagram, the "Playlist Play Sequencer" plays the media item. The status of the subject media player is set to playing while the item is being performed, and then set back to idle after the performance is finished to signal the performance to the other media players in the session.

3) If the pID of the media item at the head of the queue is the pID of the subject media player, but the Session Members state data structure 702 includes an entry for another media player with the status value playing, corresponding to the right branch of the flow diagram, the performance of the media item is postponed. The "Playlist Play Sequencer" repeatedly traverses this branch of the flow diagram until no other media player has the status value cued, and then sets the status value for the subject media player to cued. On the next iteration the "Playlist Play Sequencer" takes the middle branch of the flow diagram and performs the media item as described above.

As previously described, the Playlist Manager of the Device Manager in each media player device may assume the existence of an autonomous Playlist Builder on the server system in the client-server configuration, or on a privileged peer-to-peer network access system in the peer-to-peer configuration. In peer-to-peer embodiments, the playlist builder could be implemented on the system found in some peer-to-peer networks which hostsnetwork-level functions, while in other embodiments it could be implemented on one peer system in the network.

Figure 16:
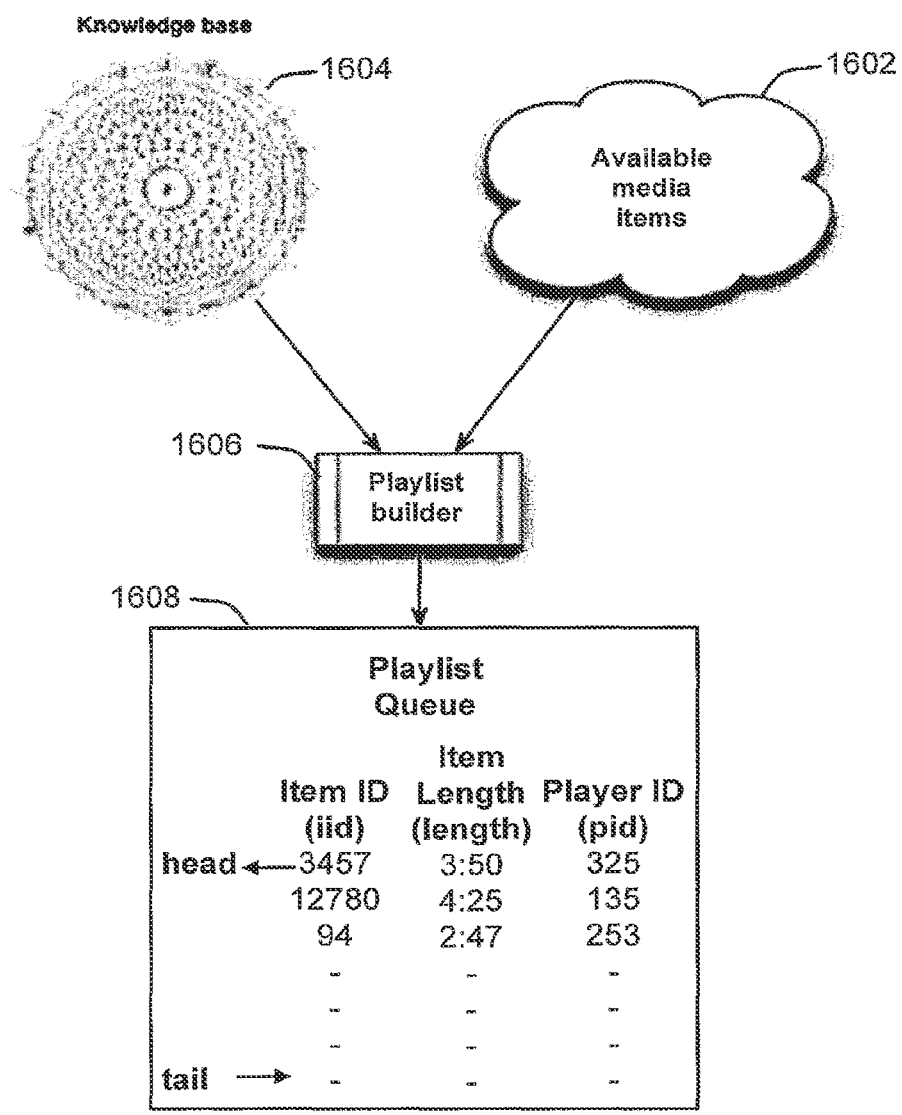
FIG. 16 presents a conceptual diagram of the playlist building function of one embodiment.

FIG. 16 depicts how the Playlist Builder 1606 draws on a knowledge base 1604 of information about media items to compose a playlist of media items in the playlist queue 1608 from the pool of media items 1602 available to the media playing devices in the session.

Figure 17:
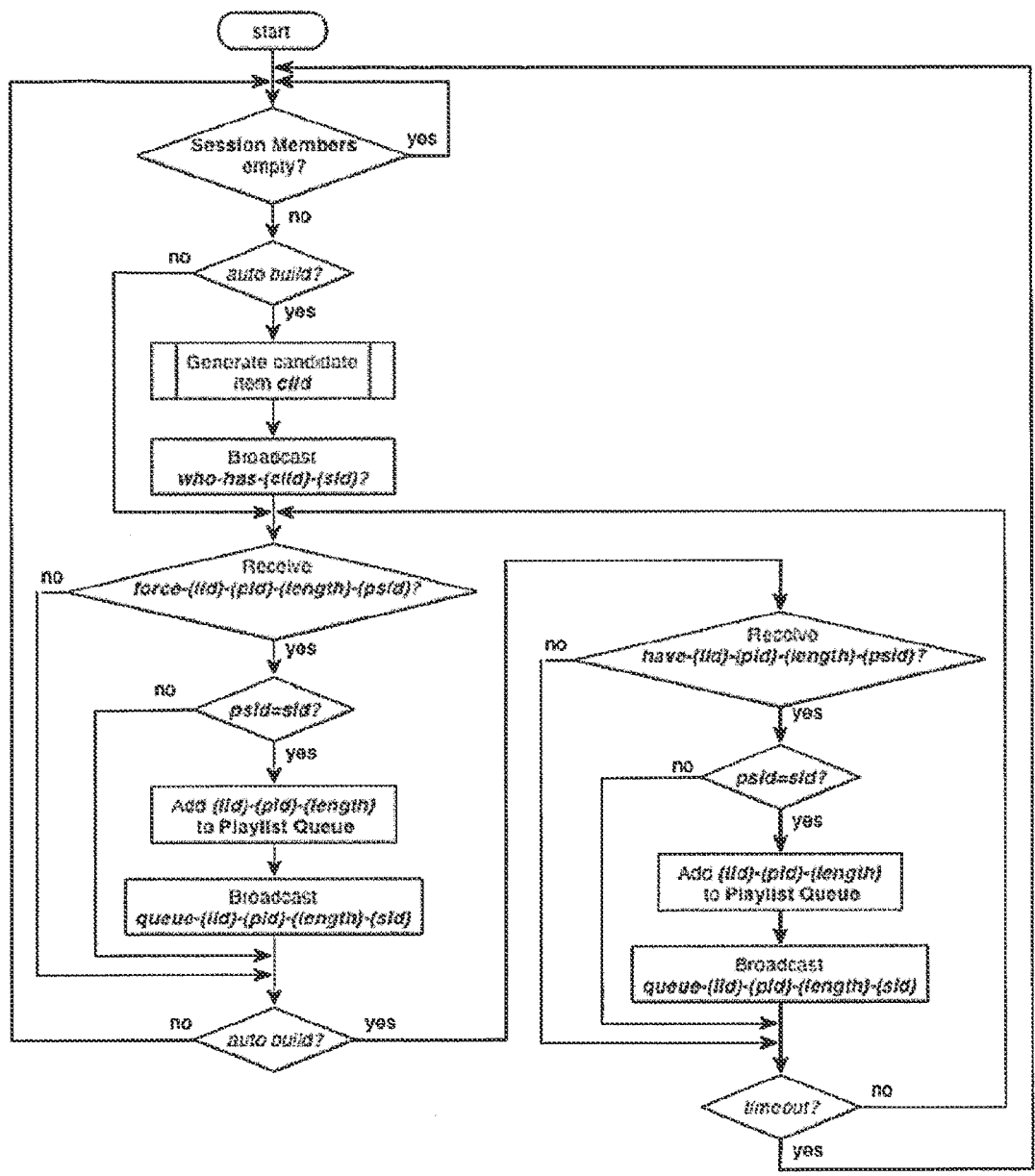
FIG. 17 is a flow diagram of the operation of one embodiment of the Playlist Builder component of the system.

FIG. 17 is a flow diagram of the playlist builder 1606 process. The process assumes the availability of a method for generating the IDs of media items that are candidates for inclusion in the playlist. Candidates may be proposed based on many criteria, including information in the knowledge base 1604, and knowledge of the preferences of the users whose media players are participating in the session.

The "Playlist Builder" may be an iterative process that adds a single media item to the playlist per iteration. Each iteration may include three steps:

1) A candidate media item with ciID is generated based on information in the knowledge base 1604 and/or other criteria. A "who-has-ciID-sID" query is broadcast to all of the media players in the session to determine if any of them has access to the proposed media item.

2) If the Playlist Queue Manager of any of the media players in the session has previously broadcast an unprocessed "force-iID-pID-length-sID" message, the requested media item iID is added to the playlist 2108. The Playlist Builder may broadcast a "queue-iID-pID-length-sID" message to all of the media players in the session, directing that they each add the requested media item to their local playlist that their Playlist Queue Manager is maintaining.

3) After an implementation-determined delay, a determination is made if the Playlist Queue Manager of any of the media players in the session has broadcast an unprocessed "have-iID-pID-length-sID" response message, indicating that a media player in the session has access to the requested media item iID. As one or more of the media players may have access to the requested item, one of those media players is selected either at random, or according to some other criteria, as the media player that will perform that media item and the item is added to the playlist. The Playlist Builder may then broadcast a "queue-iID-pID-length-sID" message to all of the media players in the session directing that they each add the requested media item to their local playlist maintained by their Playlist Queue Manager 1100.

The process assumes that the protocol of the network over which the media players communicate buffers all "force-iID-pID-length-sID" request messages and "have-iID-pID-length-sID" until they can be processed. In any particular embodiment, one or more of each type of message may be processed per iteration. In addition, as the flow diagram indicates, steps 2) and 3) may be repeated a number of times limited by a timeout value to increase the responsiveness of the communications between the Playlist Builder and the media player devices.

The Playlist Builder iterations may be repeated ad infinitum. The playlist is a non-terminating sequence of media items to be performed so long as there is at least one media player in the session. Furthermore, some embodiments may support building playlists consisting solely of media items suggested by users of the media devices, and communicated to the Playlist Builder with the "force-iID-pID-length-sID" request message, by providing an option for setting a option flag to "false" so that the "auto build?" tests in the flow diagram fail.

Still other implementations are disclosed and described with reference to FIGS. 18-26. In these embodiments, playlists of selected media items may be dynamically built from a collection of media items based on the preferences of a temporally-defined group of users with media player devices. Compositional goals and the collection of media items available to meet those goals may be dynamically computed using, for example, the composite taste data for the group as a whole as individual users enter and leave the group.

Some embodiments therefore relate to methods for dynamically creating a playlist of media items responsive to the collective tastes of a temporally-defined group of individuals. Some embodiments also provide for dynamically diversifying the group playlist so that it does not in whole, or in part, unduly reflect the taste of a single member of the group, or a particular subgroup of users within the whole group.

Additional embodiments may provide for a system and method for dynamically building a playlist of media items by using the collective taste preferences of the members of a group to determine compositional goals of the playlist, and then building a group playlist that achieves those compositional goals. The system may derive the compositional goals by analyzing the taste preferences of the current members of the group. Media items available to achieve those goals are typically a subset of the media items that are identified in response to analyzing taste data and may be selected from a collection of media items available to the system. The collection of available media items may be the aggregate of the sub-collections of media items provided by the users or, alternatively, may be a pre-existing set of media items stored, for example, in a central database or jukebox.

In a preferred implementation of the system, three primary processes are provided. The first process keeps track of users as they enter and/or leave the group by starting or ending communications with the system using, for example, individual networked communication devices. Example embodiments include Bluetooth® devices and other devices communicating in an ad-hoc network of Internet or other network-connected devices using, for example, the Apple Bonjour protocol. Users with individual communication devices may be added to and/or removed from the group by the system as they implicitly or explicitly connect and disconnect from the communication network, which links the individual devices to the computational means for building the group playlist.

As a user enters the group, the system may retrieve the user's taste data. Taste data may be retrieved by, for example, accessing a database of taste data from users known to the system or by requesting taste data directly from the users' communication devices and adding it to the pool of taste data for the group. As a user leaves the group, the system may also be configured to remove that user's taste data from the pool of taste data for the group. In some embodiments in which the media items available for inclusion in a playlist are provided by users and not centrally maintained by the system, the system may maintain a pool of media items available for the current group.

Using the pool of taste data for the group, and the pool of media items available for inclusion on a playlist, the first process may derive compositional goals for the playlist, such as requiring that the values for the selected media items of a specific attribute have a specified distribution. In some embodiments, the first process may also involve selecting a subset of media items from the total pool of media items to be used to build the playlist. This may be accomplished using a media item "recommender," as further described below with reference to FIGS. 41-42.

The second process may build the composite playlist by selecting media items from the total pool of media items in a manner which causes the evolving playlist to more closely approximate the specified compositional goal as the selected items are added to the playlist. Some implementations of the system may therefore be responsive to the constantly changing group membership. In particular, as users in the group continuously enter and leave the group, the compositional goals and/or the pool of media items available to achieve those goals may continually change. Some embodiments may remove media items from the dynamic playlist as users depart from the group, particularly in those situations where the group members actually contribute the media items to the pool. In such situations, the media items in the pool could be removed from the poet as users leave, such as by physically leaving a proximity or by logging out of a system. It should be understood, however, that such a feature is not necessary in all implementations, since a media item can be skipped if it is no longer available when it is to be performed.

The third process may involve diversifying the group playlist. The diversification process may involve shuffling media items on the list as necessary to ensure that no segment of the playlist is dominated by media items representative of the taste of one or more group members. In some embodiments, additional information about aesthetic properties of the media items might be used to rearrange the order of the media items in the group playlist to achieve specific aesthetic goals. Finally, in cases where there are few users, and therefore for each user the playlist includes a large number of items responsive to the taste of just that user, some embodiments may replace some media items with additional media items. These additional or supplemental media items may not be provided by any of the members in the group, and may be selected according to a diversifying criteria to bring more variety to the group playlist.

Figure 18:
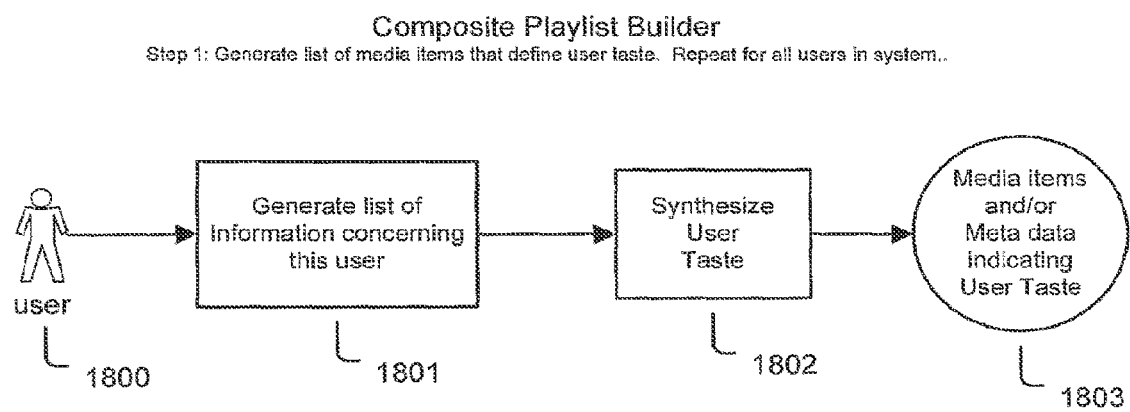
FIG. 18 is a diagram of a process for generating a list of media items that define a user taste.
Figure 19:
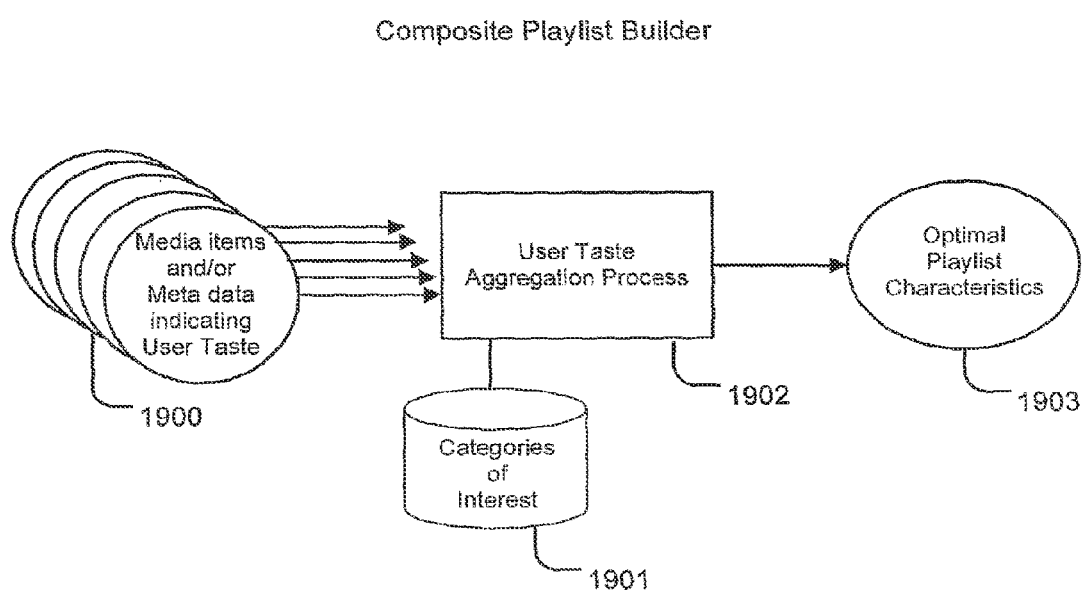
FIG. 19 is a diagram of a process for computing aggregate playlist goals and a list of desired categories.
Figure 20:
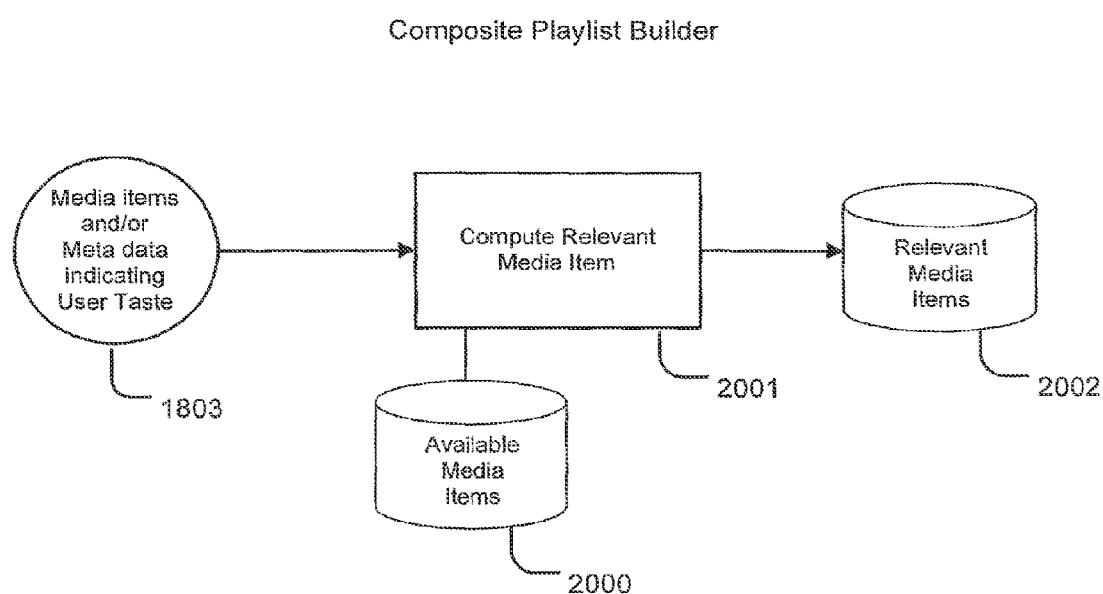
FIG. 20 is a diagram of a process for computing relevant media items for each user from total available media items.

One embodiment of the system may implement the processes detailed in FIGS. 18-20. This embodiment may be analogized to the automated evolution of a jukebox. Whereas a jukebox supplies local music and requires explicit user interaction from the user to pick desired music, these embodiments automatically build playlists based on previously collected data about users that are proximal (either physically or virtually) to the system.

In describing the embodiment of FIGS. 18-20 below, a process of adding users to the system will be described first, then a process for removing users, and finally the overall playlist construction process is described, including how the process uses information to build a targeted playlist that leverages knowledge of proximal users for building a playlist.

Figure 24:
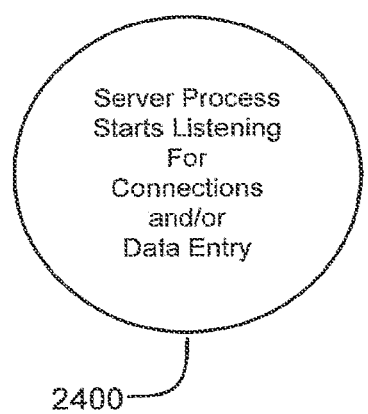
FIG. 24 represents a step of a user addition process for detecting new users.

In order for the system to "narrowcast" (i.e., to target content to a specific set of users) a playlist for proximal users, a mechanism may be provided to allows for discovery/detection of proximal users. In one embodiment, a server process 2400 (as shown in FIG. 24) may be provided using, for example, Bluetooth® technology to allow users to "log in" to the system. Users who are "logged in" to the system are considered proximal users, regardless of their physical proximity to the other users or server. In some embodiments, all proximal users immediately begin to affect the playlist being constructed, which will be discussed in greater detail later. It will be obvious to one of ordinary skill in the art that Bluetooth® is just one of many data discovery/entry mechanisms that could be used to add users to the system. Other embodiments may include explicit text entry from users, or even be a zero-configuration protocol such as Apple's BonJour protocol.

In step 1 of one implementation of a Bluetooth® user addition process, a Bluetooth® server with a predetermined service UUID (Universally Unique Identifier) is provided. The Bluetooth® specification uses UUIDs to identify services uniquely across many devices. By using a UUID, a Bluetooth® client is able to detect a specific service on a remote server.

Figure 25:
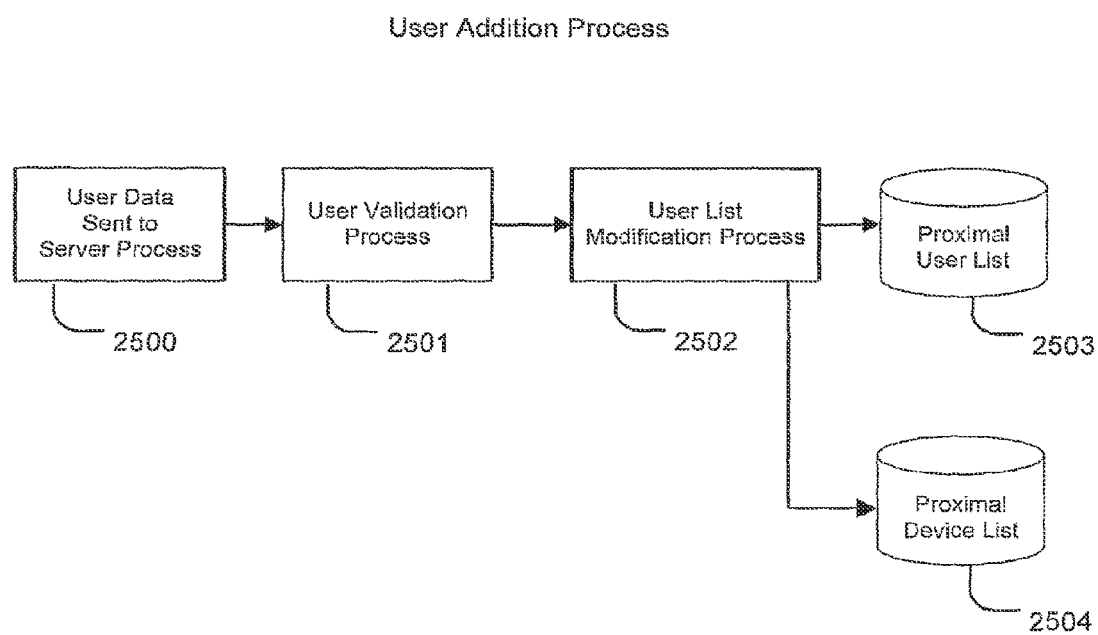
FIG. 25 represents another step of a user addition process in which new users are added to the system and source device information is stored.

In step 2, once a client Bluetooth® process has connected with the system's Bluetooth® server 2400, the client transmits user information to the server process 2400, as shown in FIG. 25 at 2500. The server process 2400 will then attempt to validate the user information, as indicated at 2501. If the user validation process 2501 fails, then the user is rejected and is not added to the proximal user list 2503 or the proximal device list 2504 by the user list modification process 2502. If the user validation process 2501 succeeds, then the user is added to the proximal user list 2503 and the user device is added to the proximal device list 2504. The means for entry of the user and the user device to the appropriate lists may vary, as would be understood by one of ordinary skill in the art.

Figure 26:
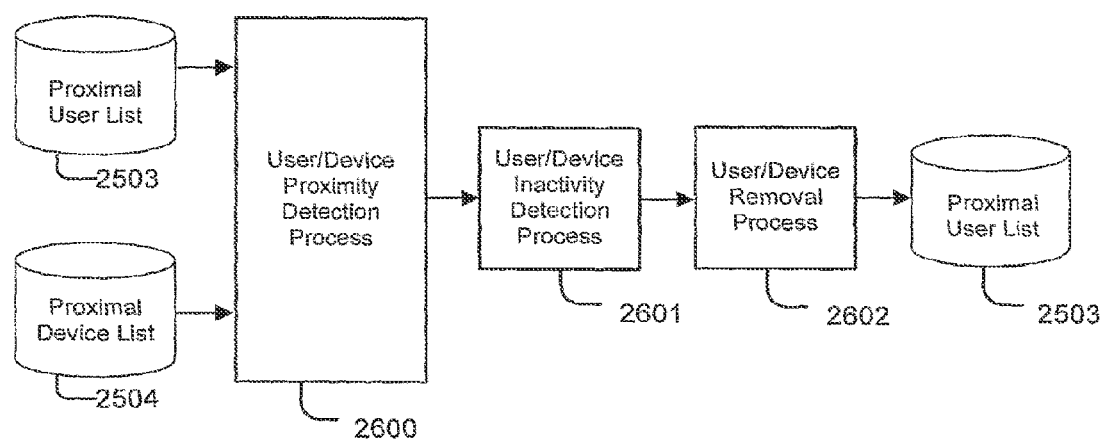
FIG. 26 is a diagram of a process for removing users from the system.

In order to provide real-time narrowcasted playlist content, the system preferably updates and maintains the contents of the proximal user list 2503 and proximal device list 2504 on a regular basis. At the same time, the system may be configured to reduce the chance that users are erroneously moved from either list. These concerns may be addressed by using a User/Device Proximity Detection Process 2600, as shown in FIG. 26, to identify which users are proximal to the system. Process 2600, like various other processes, may be implemented using Bluetooth® technology. The system may be able to determine when users are no longer proximal by, for example, detecting proximal devices and mapping the proximal device list 2504 to the proximal user list 2503.

After a user has been discovered to no longer be proximal, a User/Device Inactivity Detection Process 2601 may be used to begin considering whether a user should be removed from the proximal user list 2503 and the user's device removed from the proximal device list 2504. The User Device User/Device Inactivity Detection Process 2601 may be implemented as a time-based process. The system may be configured to remember the time when a user first became classified as non-proximal. Then, for example, if a specific time limit has been reached and the non-proximal user is identified as still being non-proximal, the user may be removed from the proximal user list 2503, along with the user's device from the proximal device list 2504, by the User/Device Removal Process 2602. If a user is found to be proximal by the User/Device Proximity Detection Process 2600 before the time limit of the User/Device Inactivity Detection Process 2601 is reached, then the user and their device will be left on the appropriate lists 2503/2504. It will be apparent to one skilled in the art that specific implementations of the aforementioned system may, but need not, rely on the use of Bluetooth® or a time-based user removal strategy.

The Composite Playlist Builder process may rely on the User Addition/Removal processes described above in order to determine which users to which a playlist is to be narrowcasted. In one implementation, the Composite Playlist Builder process may first generate a list of media items that define a user taste, and then repeat this step for all proximal users in the system.

As shown in FIG. 18, the process of generating a list of media items that define user taste may be accomplished by examining the users 1800 logged into the system and using information—i.e., media item taste data—to synthesize user taste, as shown at 1802. The media item taste data may be gathered by the system contemporaneously or, alternatively, it may be compiled into a list or database from previously gathered media item taste data. Either of the foregoing may be represented by step 1801 in FIG. 18. A list of media items and/or media item metadata (collectively "media data items") that contains information about the music that should be narrowcasted to user 1800 may then be generated, as indicated at 1803. It should be noted that it is not necessary to have any users logged into the system in order for a group playlist to be generated. Preconfigured goals can be used when no/few users or otherwise insufficient data is available to the system. This process may then be repeated for each user 1800 who is logged into the system.

The data in one embodiment may be cached to enable quick lookup. As will be demonstrated in other steps, the data which represents user taste may also provide the foundation from which other steps derive information. In some embodiments, user taste may be synthesized by first obtaining a set of the tracks that a user has listened to recently and/or those that a user has ranked highest. Of course, it will be obvious to those skilled in the art that there are many different ways to synthesize user taste based on collected user taste data.

As a second process of one implementation, aggregate playlist goals may be computed based on results of the first process and/or on a list of desired categories. Note that there will be typically be one set of input media data items for each user.

In order to compute aggregate playlist goals, each set of media items and/or metadata that indicates user taste 1900, and/or a predetermined or computed set of categories of interest 1901, may be used as input to a User Taste Aggregation Process 1902, as shown in FIG. 19. User Taste Aggregation Process 1902 may be used to create a set of optimal playlist characteristics 1903 for a group playlist that is intended to be narrowcasted to the proximal users. In certain embodiments, media items and/or metadata that are representative of more than one user's taste may not be viewed as duplicative. This feature may allow media items and/or metadata that are common between multiple users to be given increased levels of importance by the User Taste Aggregation Process 1902. The User Taste Aggregation Process 1902 may accept both user taste 1900 and desired categories of interest 1901 as input. Categories of interest 1901 are often (but not required to be) metadata indicators that indicate the set of metadata to be used in computing the optimal playlist characteristics 1903 for a narrowcast playlist targeted at a particular group of users.

One embodiment uses a category set 1901 that comprises a genre. Such a system may compute the frequency distribution of genres in the play histories retrieved for each connected user. The percentage of each genre may then be used as the optimal genre distribution for the generated group playlist. Of course, a genre is not the only category which could be used for generating a playlist. It should also be understood that a raw frequency distribution is not the only method for computing statistics about any given category. Other similar implementations are not limited to, but could employ, a weighting strategy or voting strategy to determine desired levels of each feature.

After the aggregate playlist goals have been computed, relevant media items for a user may be selected from the pool of available media items. This process may then be repeated for each proximal user in the system.

For example, in FIG. 20, the set of relevant media items 2002 that are associated with a given user may be computed/selected. To do this, a process 2001 for each user may be executed. Process 2001 may accept as input the set of media items and/or metadata that indicates a user's taste 1803 and/or the set of all available media items 2000. Process 2001 may also produce a subset of available media items that are relevant media items for a single user.

In one embodiment, process 2001 may be implemented by using a media item recommender, such as those described in U.S. patent application Ser. No. 11/346,818 titled "Recommender System for Identifying a New Set of Media Items Responsive to an Input Set of Media Items and Knowledge Base Metrics," which was previously incorporated by reference. Process 2001 may also be augmented by providing the media item recommender with the complete scope of recommended media items from which to recommend a subset of media items. In practice, this may be used to make sure that the recommended media items are available for use by the composite playlist builder application. For example, if there are one-thousand available media items 2000 to choose from, process 2001 may ensure that the relevant media items 2002 are within the one-thousand available media items 2000. This is analogous to a jukebox that has a limited set of media from which to produce a playlist. It should be apparent that the media items available to process 2001 do not need to be resident on the same machine that is executing process 2001. Any media item which is programmatically obtainable via any protocol may be considered an available media item.

Figure 21:
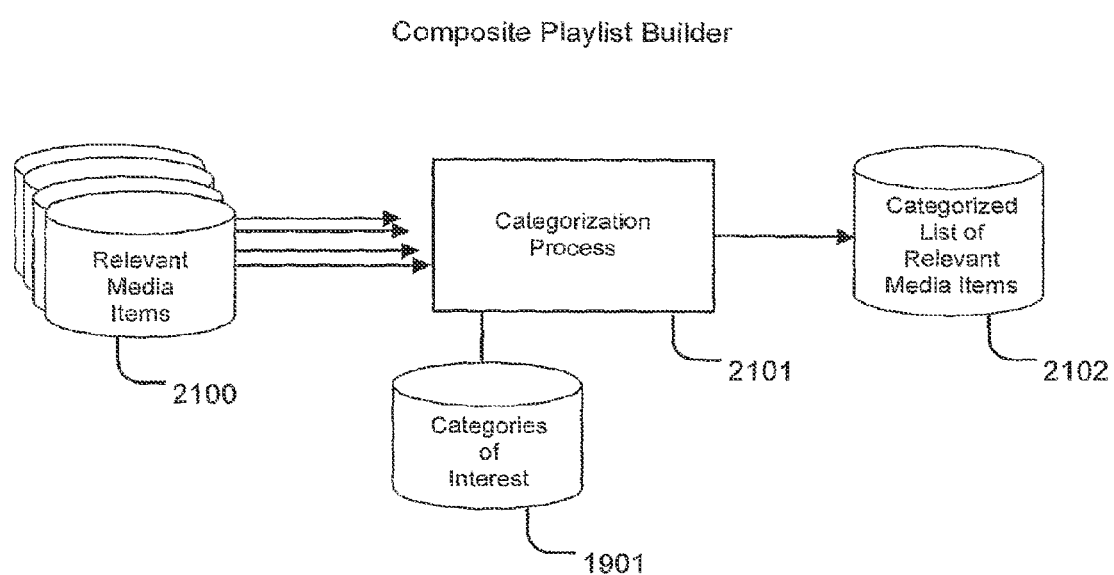
FIG. 21 is a diagram of a process for categorizing relevant media items according to desired attributes.
Figure 22:
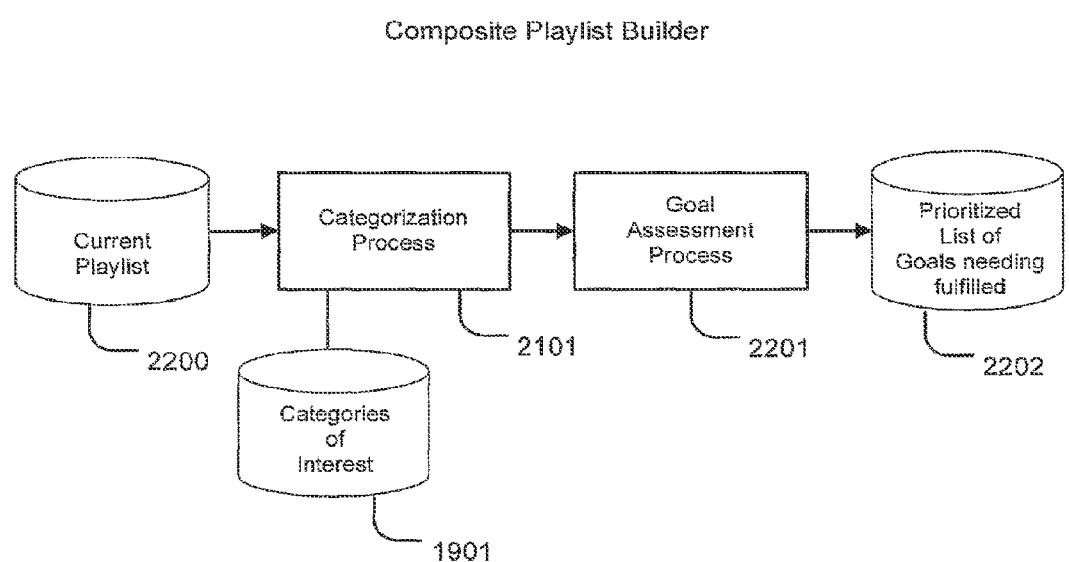
FIG. 22 is a diagram of a process for computing the status of the current group playlist's achievement of compositional goals.
Figure 23:
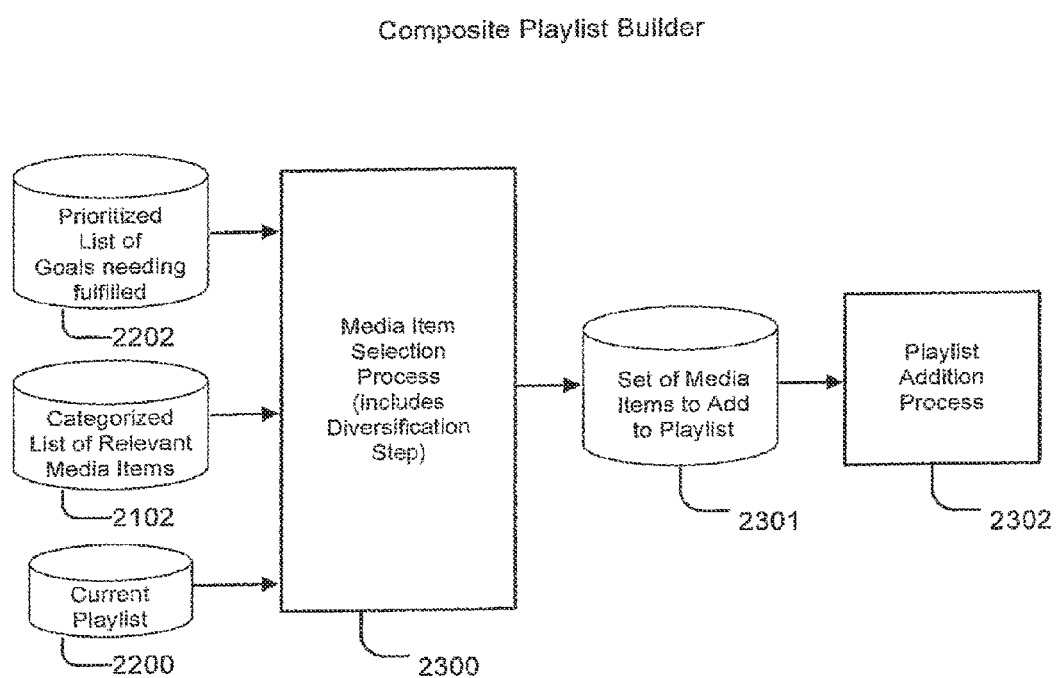
FIG. 23 is a diagram of a process for choosing a set of media items to add to a group playlist based on assessing needs according to compositional goal achievement assessment.

After the relevant media items for each user have been selected from the pool of available media items, the media items may be categorized according to a set of desired attributes. For example, as shown in FIG. 21, the relevant media items 2100 may be categorized via a categorization process 2101 according to the categories of interest 1901 used previously in the user taste aggregation process 1902. Categorization process 2101 may be used to produce a categorized list of relevant media items 2102. This list may enable the overall system to pick one or more media items based on one or more categories of interest 1901.

After the media items have been categorized according to a set of desired attributes, the status of the current group playlist's achievement of goals may be assessed/computed. For example, with reference to FIG. 22, a goal assessment process 2201 may be used, along with categorization process 2101, to produce a prioritized list of goals needing to be fulfilled 2202. The categorization process 2101 may accept the current playlist 2200 and categories of interest 1901 as input. The categorization process 2101 may use the categories of interest 1901 to categorize the media items on the current playlist 2200. The output of the categorization process 2101 may be sent to the goal assessment process 2201 that may be used to determine how close the current playlist 2200 characteristics are to the optimal playlist characteristics 1903. The output of the goal assessment process 2201 may be a prioritized list of goals needing to be fulfilled 2202.

In one embodiment, a frequency distribution of genres may be computed for the categorization process. The goal assessment process may comprise subtracting the achieved genre percentages for the current playlist from the target percentages for the optimal playlist. It can then take the largest value difference as the needed upcoming genre for the playlist. Of course, a variety of other approaches can be used for computing playlist needs.

After the status of the current group playlist's achievement of goals has been assessed/computed, a set of tracks may be selected to add to the group playlist based on assessing current needs for the playlist according to the goal achievement assessment process previously performed. For example, with reference to FIG. 23, a set of one or more media items 2301 are selected for addition to the current playlist 2200 by a playlist addition process 2302. The media item selection process 2300 may accept as input the prioritized list of goals needing fulfilled 2202, the categorized list of relevant items 2102, and the current playlist 2200. The media item selection process 2300 may attempt to fulfill the goals in a prioritized manner in some embodiments, such that the most important goal is fulfilled by picking a media item from the list of relevant items 2102 that best fulfills the goal. If multiple media items could help fulfill a goal, then a media item may be selected at random from the list or in another fashion, such as by some form of tiebreaker process.

The selected media item may also be subjected to a diversification step, which may be used to ensure that the media items being added to the playlist are not too similar to the current playlist contents. In some embodiments, the diversification step may comprise shuffling media items in the group playlist to diversify at least one segment of the group playlist that includes media data items that are overly representative of the tastes of one or more users. The system may be configured such that, in response to determining that the group playlist is dominated by media items representative of the taste of one or more users, removing at least one media data item from the group playlist that corresponds with the taste of the one or more users.

In some embodiments, in order for a media item to be selected and added to the current playlist 2200, it must pass through the diversification process (unless the diversification process eliminates all media items in the pool). Once a sufficient set of media items have been selected, the set of media items 2301 may be sent to a playlist addition process 2302 for addition to the active playlist. The playlist addition process 2302 may have the capability of creating/updating the current playlist 2200 and, in some implementations, initiating playing the media items in the current playlist 2200.

In one embodiment, a media item may be selected from the most needed genre for the current playlist by choosing at random from relevant tracks categorized in the appropriate genre. The diversification step may be used to ensure that no media item is repeated in the group playlist for a predetermined period of time. In other embodiments, the diversification step may also, or alternatively, be used to ensure that no subset of media items—such as artists, albums, genres, etc.— are repeated within a given subset of the group playlist. For example, the diversification step may be used to prevent media items from a particular artist from being repeated within a seven track window within the group playlist. If it is impossible to fulfill the requirements of the diversification process, then a media item may be chosen at random from all media items within the appropriate genre. If multiple genres are identified with equal priority, then the selected media item may be selected from any one of the identified genres, or by some other tie-breaking selection procedure.

Venue Recommendations

Figure 27:
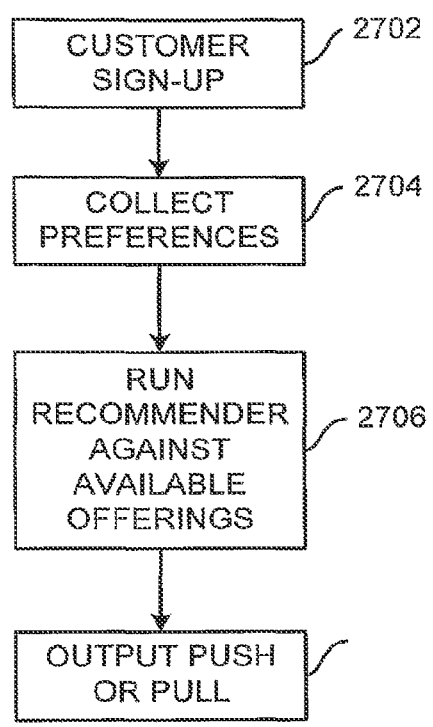
FIG. 27 is a simplified flow diagram illustrating one example of a process for a commercial establishment or venue to tailor its offerings to the tastes of an individual customer.

Turning now to FIG. 27, another application of the technologies described earlier is to enable a venue to tailor its offerings to the tastes of a user or customer. In this context, a "venue" can be an actual physical space such as a hotel, restaurant, bar, etc. or it can exist in virtual space, such as a venue on the Internet. Moreover, in the present context, a "user" can be an individual user, a user group, or a group of users.

A hotel is used as an example to illustrate this aspect of the invention. Referring now to FIG. 27, a customer would sign up as a hotel user. This could be, for example, an Internet-based service. It is known that many hotels currently have on-line registration systems, as well as "loyalty" or preferred customer arrangements whereby they store customers' preferences such as nonsmoking room and queen size bed. What they have not done in the past is to collect user preferences such as lists of one or more favorite movies, favorite foods and beverages, music (songs, albums or artists, etc.). Thus the present process begins with a customer signup step 2702 in the figure, followed by a collection of user preferences 2704. The hotel can then employ recommender software of the type described earlier, to identify recommendations that would be appropriate to this particular customer based upon the individual preferences collected, step 2706. Finally, these recommendations can be provided to the customer through various channels. For example, these recommendations might simply be delivered to the user via recorded telephone message, through a hotel room television system, email or wireless telecom messaging. Alternatively, the user, at his or her convenience, might use a device such as a mobile phone to access the hotel's recommendations as desired. For example, when the user is ready to go to lunch, he could simply access the hotel's recommendations for a restaurant for lunch, and in all likelihood the recommendations will be consonant with his personal preferences.

Figure 28:
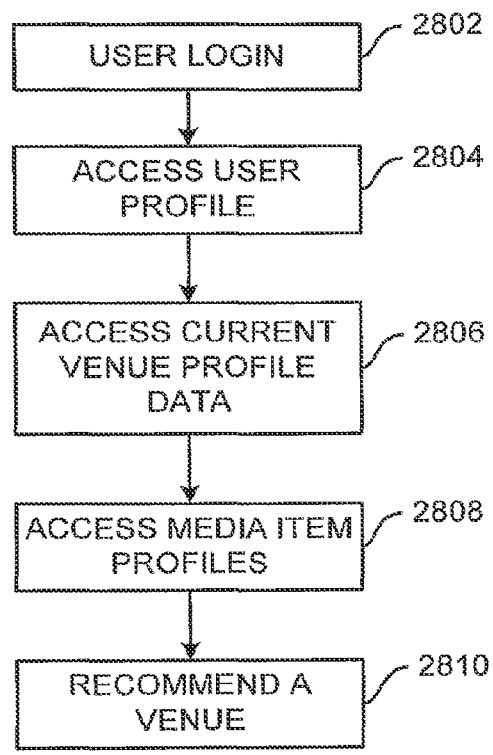
FIG. 28 is a simplified flow diagram illustrating one example of a process for recommending a commercial establishment or venue to a potential customer or group.

In another aspect of the invention, recommender technology can be employed to recommend one or more venues to an individual user based on that user's profile. A method for recommending a venue to a user is summarized in the simplified flow diagram of FIG. 28. FIG. 28 begins with the user login step 2802. This step may comprise logging into an existing system where the user is already a "member" such that a preexisting profile can be accessed. Alternatively, a new user can provide profile information at the time of login. In the case of music or other media items, user preference can be expressed by identifying one or more favorite songs or artists, as explained previously. Step 2804 in FIG. 28 illustrates the case of accessing an existing user profile.

Next, the method calls for accessing venue profile information, step 2808. Again, in the case of media items, a venue profile may consist of the current media items offered along with the current users logged into the system. This refers to users or "guests" who are currently in attendance at the venue, as further explained below. The media items offered by a venue may be ordered in time resulting in a sequence of media items. For example, in the case of music, the current media items offered by a venue would be a playlist. Additionally, a venue profile may contain general attributes like location, style, price range, opening hours, and other properties that describe the static profile aspects.

Finally, the system recommends a venue, step 2810, based upon the user profile and the venue profile. The recommendations could be done in real time as the venue profile changes in response to guests entering and leaving the venue, and the media items offered, as further explained below. The system may weight the importance of media items offered with respect to their associated time. In this way, older items would be less weighted than recent items.

For example, if a group of users wanted to go dancing to disco music, they could use an appropriate device to access the nearest club that was currently playing the kind of music that they liked. In real time, the users could check the current play list. After they arrive, the same users can begin to influence the music played at the venue, as explained below.

Figure 29:
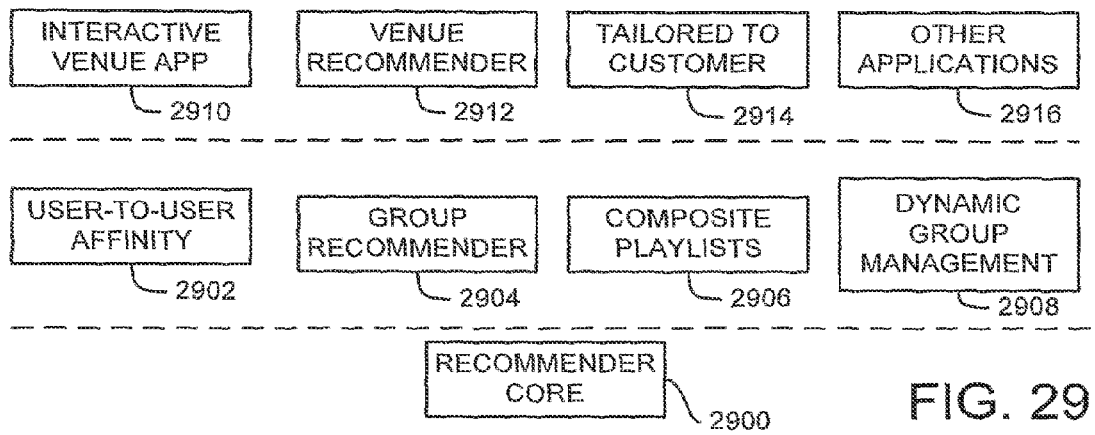
FIG. 29 is a conceptual software diagram illustrating a recommender core engine, various algorithms that may employ the core engine, and illustrative applications that may employ one or more of the various algorithms.

FIG. 29 is a simplified diagram illustrating software programs at three different conceptual levels. At the bottom, a recommender core engine 2900 may comprise a recommender system of the type described above, i.e. one for identifying a new set of media items in response to an input set (or "query set") of media items. Such a system in the preferred embodiment uses a knowledge base comprising a collection of mediasets.

At the intermediate conceptual level, FIG. 29 illustrates several examples of algorithms that may employ the recommender core 2900. For example, a user to user affinity algorithm 2902, a group recommender 2904, a composite play list generator 2906, and a dynamic group management algorithm 2908 are shown by way of examples. These algorithms were described above in detail. Finally, along the top level in FIG. 29 are some examples of applications that preferably employ one or more algorithms of the type illustrated in the drawing figure. Such applications can include an interactive venue application 2910, a venue recommender 2912, an application for a venue to tailor its offerings to a customer 2914, and other applications that are responsive to one or more user's personal preferences or interests. A venue recommender was described above with reference to FIG. 28. A method for tailoring a venue's offerings to a particular customer was described above with reference to FIG. 27. An application for providing dynamic, interactive entertainment at a given venue, 2910, is described in greater detail in the following example.

Real-Time Party Session

Figure 30:
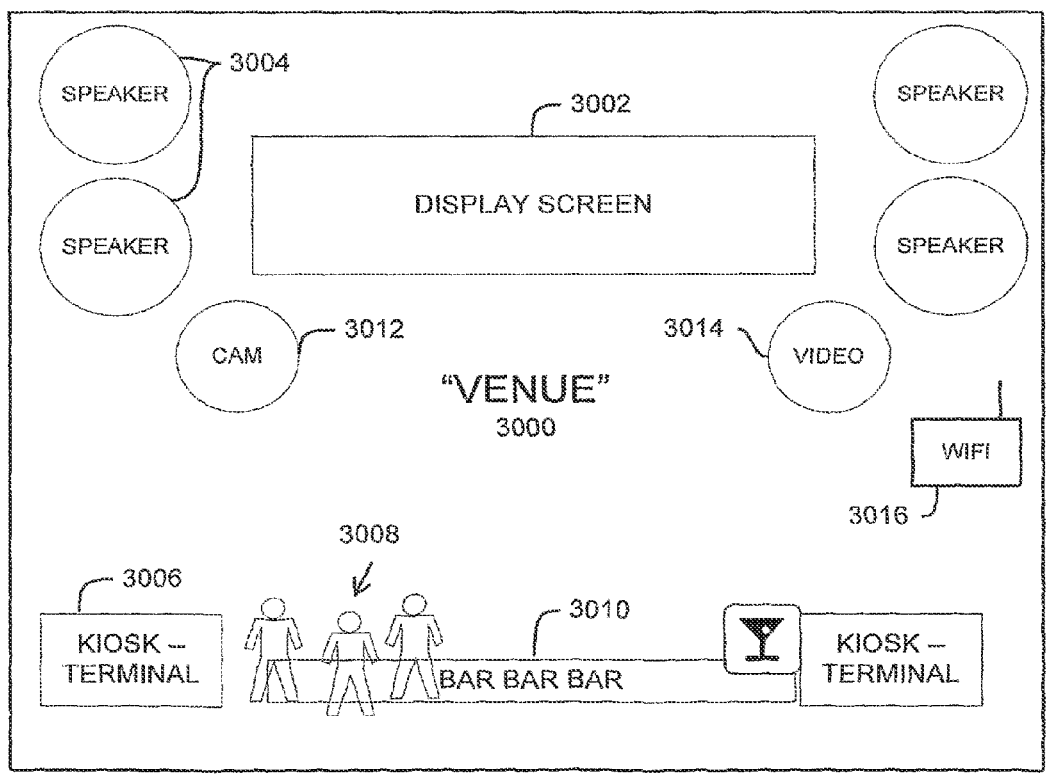
FIG. 30 is a simplified diagram illustrating some of the features and equipment that may be found at a venue and employed in accordance with aspects of the present invention to provide dynamic, interactive entertainment at the venue that is responsive to user tastes in real time.

The following example begins with a summary description of a venue 3000 which may be a disco, bar or a nightclub, selected elements of which are illustrated in FIG. 30. In FIG. 30, the venue 3000 includes a sound system with several speakers 3004, at least one display screen 3002, at least one kiosk or terminal 3006, each of which are described in greater detail below. A venue might optionally include one or more cameras 3012 for taking photographs of guests 3008 during the course of a party or a session, as well as one or more video cameras 3014 for a similar purpose. The venue 3000 often includes a bar 3010 for dispensing beverages. The venue 3000 might also include a wifi access point 3016 for wireless communications.

As noted, a venue includes one or more display screens 3002 which are arranged for displaying content to the guests there assembled. The number and dimensions and the display screen or screens are not critical, but they should be arranged for easy viewing by the guests in general. As discussed below, the display screen 3002 provides the principal medium for interactive communications between the venue proprietor or "host" and the guest, as well as among the guests.

Figure 31:
FIG. 31 is a simplified illustration of one example of venue display screen content including an advertisement, host welcome message, pictures and instructions for a user to join the party using a wireless telecom messaging service.

FIG. 31 is a simplified illustration of one example of venue display screen content. In FIG. 31, the display screen 3002 is currently showing an advertisement 3102 ("Bella Terra Bar and Grill"); and a welcome message from the host 3104 ("Welcome Partygoers. We're here with you tonight until 3:00 a.m."). The display screen example of FIG. 31 shows additional messages 3106 instructing a user on how to "join the party" i.e., how to log into the interactive system described herein. Hereinafter, we refer to a user who is currently logged into the venue system as a guest". FIG. 31 indicates two methods for user to log in and become a guest. The first is by sending an SMS message from a wireless device such as a cell phone or other multipurpose device such as a PDA. In fact, the messaging can be done from any wireless telecom messaging enabled device. The screen display message instructs the user to send a message having the format "PartyStrands J—nickname" to a specified telephone number. The format in this example is generically described as [server name, party identifier, nickname]. The server name, in this example "PartyStrands," refers to a remote server (in the presently preferred embodiment, one accessed via the Internet, as described later with reference to FIG. 39). Partystrands is a trademark of Mediastrands, Inc. The party identifier (in this example "J") identifies a particular party or venue that the user wishes to join, and finally, the user's nickname or user name. The telephone number provided corresponds to a wireless telecom gateway or the like where short messages can be received and routed as appropriate. In this case, the message will be routed to the PartyStrands server, further discussed below, and it will then log in the user "nickname" into the "Party J". In another embodiment, a dedicated telephone number can be provided for the specific venue, thus simplifying the messaging protocol. Details of the selected messaging format are not critical, but some examples follow.

A. Illustrative Message Formats.

The SMS messages to the system for each operation have a specific format. In addition, a response message is sent by the system to the user to acknowledge receipt of the user's SMS message by the system. As a practical matter, it is the response message back to the user for which the carrier bills the user and therefore for which the operator receives revenue.

(1) Join Party:

Log into a specific party and local system, and provide an initial artist preference to the system for the system to include in building the playlist currently being performed.

Message: <party_name> <user_nickname> <artist_name> where the <party_name> is an identifier for the venue or event that the user sees displayed on the screen and the <user_nickname> may be:

<nickname>—join as anonymous user

<mystrands_alias>: mystrands—join using MyStrands profile info

<mystrands_alias>: ms—join using MyStrands profile info (alternate form)<

<last_fm_alias>: lastfm—join using LastFM profile info

<myspace_alias>: myspace—join using MySpace profile info

Response: <text_response> where the <text_response> is a text message that states whether the user has successfully joined the party or not, and which may optionally provide additional explanatory information. Once the system indicates to the user that the user has joined the party, the user may send additional SMS messages to interact with the system and communicate with other users, for example:

(2) Text Party:
Send a text message to be displayed by the system on the screen.
Message: <party_name> t<text_message>
where <text_message> is any text message the user would like to send. In some embodiments, the system scans the text to remove any offensive language before displaying the message on the screen.
Response: <text_response>
where <text_response> is a text message that states whether the user's message has been accepted by the system or not, and which may optionally provide additional explanatory information.

(3) Add Artist:
Suggest a new artist to the system for the system to include in the process for building the playlist being performed.
Message: <party_name> a<artist_name>
where <text_message> is any text message the user would like to send. In some embodiments, the system scans the text to remove any offensive language before displaying the message on the screen.
Response: <text_response>
where <text_response> is a text message that states whether the user's suggested has been accepted by the system for inclusion in the playlist building process or not, and which may provide additional explanatory information.

(4) SMS another user: Send a private SMS message to another user logged into the party, as indicated by the presence of the user's avatar or alias appearing on the screen.
In one embodiment, the user sends a message for immediate delivery to the intended recipient with the form
Messagewhere the <user_nickname> is the name the intended recipient provided to the system during login and which the system displays on the screen. The <text_message> is any text message the user would like to send to the intended recipient. In some embodiments, the system scans the text to remove any offensive language before displaying the message on the screen.
Response: <text_response>
where <text_response> is a text message that states whether the user's message has been accepted by the system for attempted delivery to the recipient, and which may optionally provide additional explanatory information.

In an another embodiment, the user sends a message as described, but a system operated by the Software/IP Owner 4000 "holds" the message for delivery until the intended recipient sends a message requesting delivery. The intended recipient would receive a message from the system indicating a message is waiting, and then text back a message requesting delivery of the message:
Message: <party_name> g
where <party_name> may be optional if the System/IP Owner system is configured to expect a response of this type from the intended recipient.
Response: <text_response>
where the <text_response> is the <text_message> sent initially by the user for delivery to the intended recipient.

In the former scheme, the Software/IP Owner may receive revenues from the mobile carrier linked only the SMS message sent by the Initiating user. In the latter case, the Software/IP Owner may receive revenues from the mobile carrier linked to both the SMS message sent by the initiating user, and the message sent by the intended recipient requesting delivery of the initiating message. In addition, the avatars 3210 (FIG. 32) of users participating in the party may display a number indicating how many messages have been sent to them and/or how many messages are waiting for them for which they have requested delivery.

(5) Vote:
Send a vote in response to a question displayed on the screen.
Message: <party_name> v<vote>
where <vote> is the user's vote such as "y", "yes", "n", "no".<vote> may also be the identifier such as "a", "b", "c", etc. or "1", "2", "3", etc., for questions with multiple possible responses.
Response: <text_response>
where <text_response> is a text message that states whether the user's vote has been accepted for tallying by the system, and which may optionally provide additional explanatory information.

(6) Send Photo/Video to Party:
Send a photo for display on the party screen using MMS, if available through a messaging provider:
Message: <party_name> p<photo_file> or <party_name> f<photo_file>
where the <photo_file> is a digital photo or video file in a format accepted by the MMS service.
Response: <text_response>
where <text_response> is a text message that states whether the user's photo or video has been accepted for tallying by the system, and which may optionally provide additional explanatory information.

B. Optional Messaging Format and Strategy.

In one preferred embodiment, the Software/IP Owner 4001 (FIG. 40) may contract with mobile phone network operators for a "non-shared short code" that corresponds to a dedicated phone number. In this embodiment, the messages 3106 (FIG. 31), 3212 (FIG. 32), 3401 (FIG. 34), and 3506 (FIG. 35) may have the form:
"Send<message> to <short_code>"
where <message> is a message formatted as described earlier, and <short_code> is the text string of the short code provided to the Software/IP Owner by the mobile phone provider. On receipt of this message, the mobile phone provider would forward an message that includes the text <message> to the software/IP owner over a communications network such as the internet.

In another embodiment, the Software/IP Owner 4000 (FIG. 40) may not contract with mobile phone network operators for a "non-shared short code" that corresponds to a dedicated phone number, but instead may use a shared SMS delivery service such as 411Sync, or those provided by carriers such as Ericsson. Those services provide a shared phone number to which anyone may send an SMS message. The SMS message typically begins with an identifier keyword signifying a customer to whom the shared SMS delivery service should deliver the particular message. In this embodiment, the messages 3106 (FIG. 31), 3212 (FIG. 32), 3401 (FIG. 34), and 3506 (FIG. 35) may have the form:
"Send<ip_owner_keyword> <message> to <phone_number>"
where <ip_owner_keyword> is the identifier such as "fiesta" or "partyStrands" for the software/IP owner 4001 service, <message> is a message formatted as described earlier, and <phone_number> is the dedicated phone number of the shared SMS delivery service. On receipt of this message, the shared SMS delivery service would forward an message that includes the text <message> to the software/IP owner over a communications network such as the internet.

Figure 36:
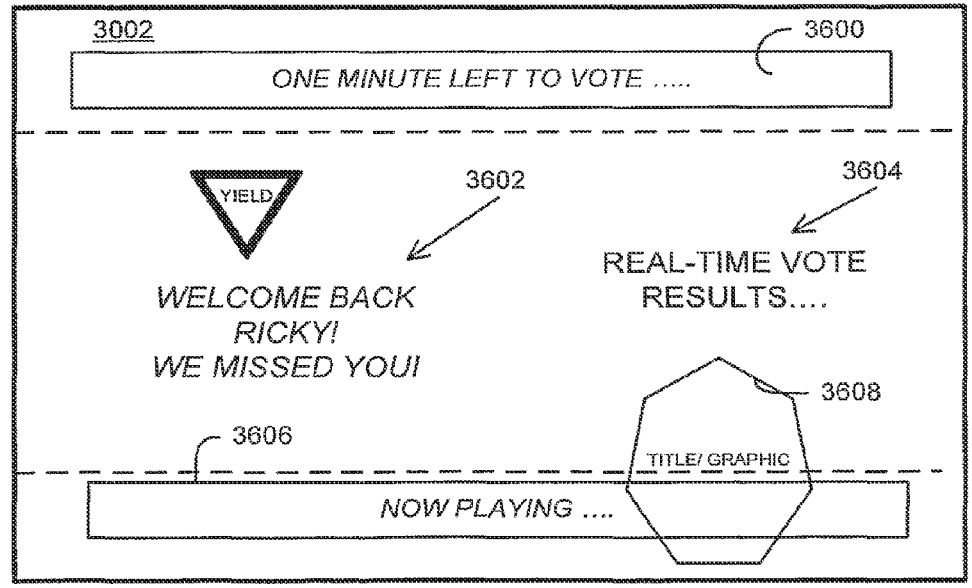

FIG. 36 also illustrates an alternative method for a user to log in to a party at a venue. That is, to access a kiosk or terminal physically located at the venue, where the user can log in. The terminal may be preconfigured to communicate to the "PartyStrands" server and automatically provide identification of the venue, since it is located at the venue. The user needs only to provide a nickname and, optionally, identification of the user's musical taste, for example in the form of a preferred song track, album or artist. If the user has a preexisting music profile stored at the remote server, that profile can be accessed in lieu of a favorite artist, etc. Whether contacted by SMS or through a terminal, the remote server determines the guest's musical taste, logs the user into the specified party, and delivers that user's musical taste information to the algorithm that creates the play stream for that party. Finally, FIG. 31 also illustrates displaying pictures 3108 which may be taken from time to time at the venue, using a camera 3012 (FIG. 30), actuated automatically, by a guest or by the host bartender. Similarly, a video camera (3014 in FIG. 30) can be used to provide a live video feed for display 3110 on the display screen 3002.

Figure 32:
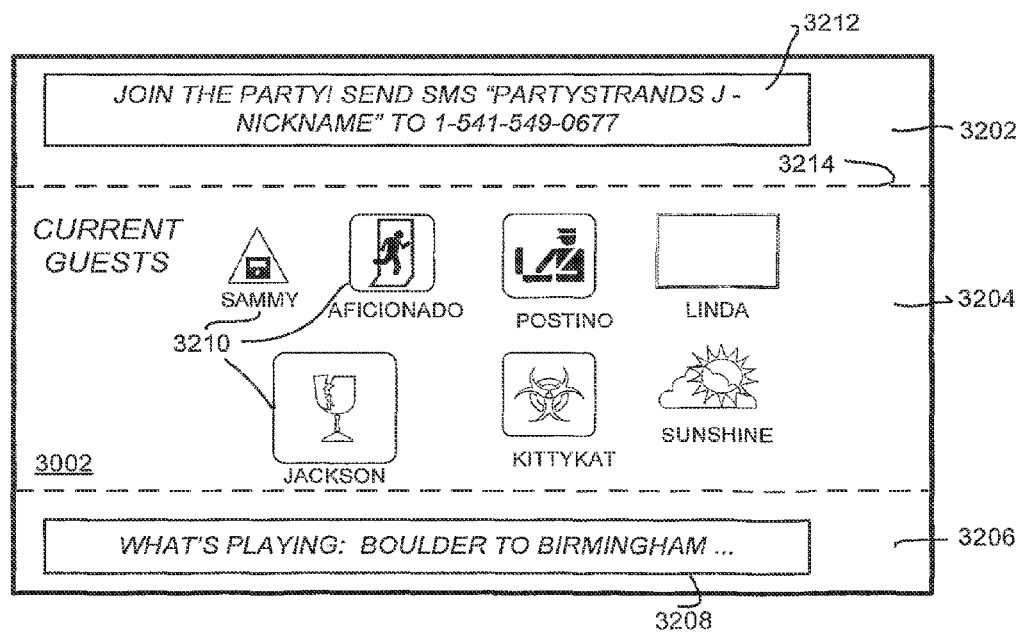
FIG. 32 is a simplified illustration of one example of venue display screen content including a current guest list that identifies each guest currently logged in by a corresponding nickname and symbol or avatar.

FIG. 32 is another illustration of a display screen 3002 for use at a venue during a party session. This figure shows the display screen 3002 as divided into three primary regions; a top region 3202, a central region 3204, and a bottom region 3206. This arrangement of the display screen is merely illustrative. The number of operative regions is not critical, nor is their size or arrangement. In this example, by way of illustration, the top region 3202 includes a host message 3212 which again invites the user to log into the party using the SMS system. In the bottom region 3206, the song currently playing is identified. It could also illustrate the last song played and potentially the next song to be played on the play list. Identifications of songs can include associated artwork such as album covers or other graphics.

In FIG. 32, the central region 3204 illustrates a graphical display of the guests who are currently logged into the system. Preferably, guests are not identified by their real names, but can be identified by nicknames or an alias, optionally together with graphic or avatar. The avatars can be provided automatically by the system upon login of a guest. The system might take the user's gender into account in assigning an avatar, if the gender can be determined from the user's profile or login information.

Figure 33:
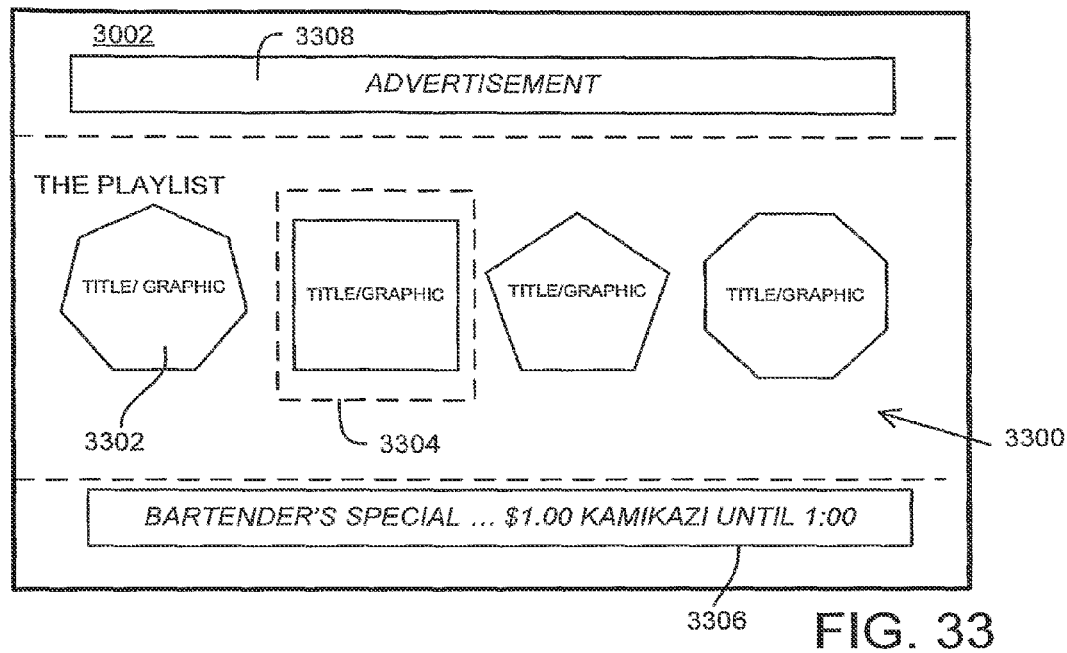
FIGS. 33-37 are simplified illustrations of additional examples of venue display screen content including various aspects and features more fully described below.

Referring now to FIG. 33, the central region of the display screen 3002 is showing a graphical play list. That is, it displays indicia of several songs, including an indication of which song is currently playing, in this case indicated by dash line 3304. The play list 3300 is of course updated dynamically as the play list is executed. This display screen in FIG. 33 also illustrates an advertisement 3308 which can be a source of advertising revenue for the venue host. In the lower region of the display screen in FIG. 33, a message from the host indicating a bartender's special is displayed, 3306. While these various display elements are of course illustrated as static in these drawings, preferably they would be animated in an actual implementation, and their content changing frequently to maintain the guests' interest.

Figure 34:
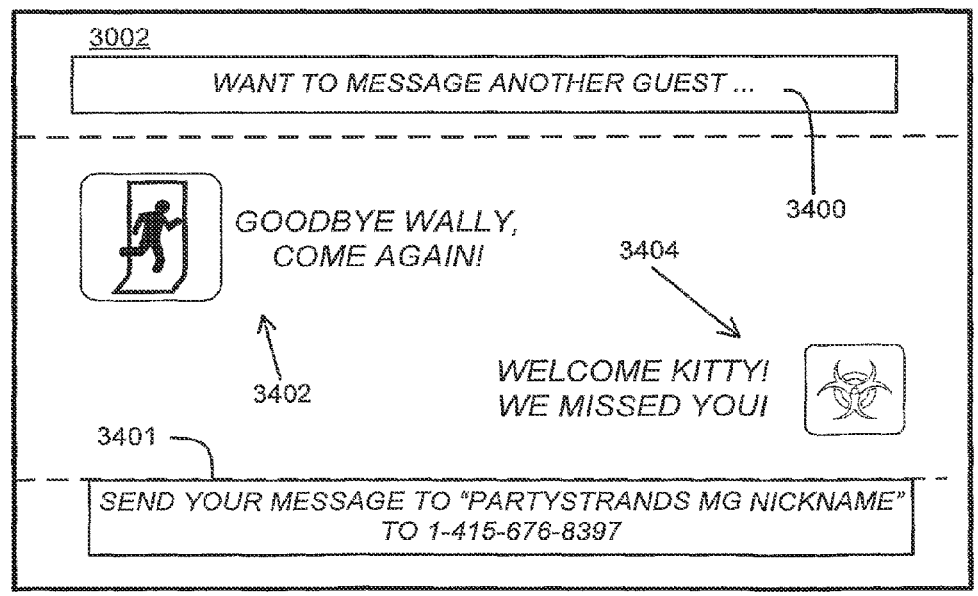

FIG. 34 shows another example of a venue display screen content. This figure introduces the concept of one guest sending a message to another. In FIG. 34, a message 3400 in the upper region of the display invites the guests to send a message to another guest, and a further message at the lower region of the display screen, instructs the user to send a message (using SMS or the like). Here, the message has the format [server name, party, "MG" and nickname]. In this case MG is an arbitrary code indicating a request to send a message to the user identified by "nickname". In this regard, when a user logs into the system (to become a guest), he or she may be given the option as to whether or not they wish to receive messages from other guests. The interactive venue application software can be configured to enforce that option or other appropriate rules for brokering messages.

FIG. 34 also illustrates a welcome message 3404 which can be displayed when a user logs in as a guest. Conversely, a salutation 3402 can be displayed when a guest is logged out of the venue. The logout can be effective by the user explicitly sending a message to that effect. Alternatively, if a user simply leaves a venue, the logout can be effective automatically after the passage of a predetermined period of time without receiving any messages from that user. In other words, the user's exit from the venue can be inferred. As noted earlier with reference to FIG. 32, a listing of the guests currently logged in can be displayed from time to time.

Figure 35:
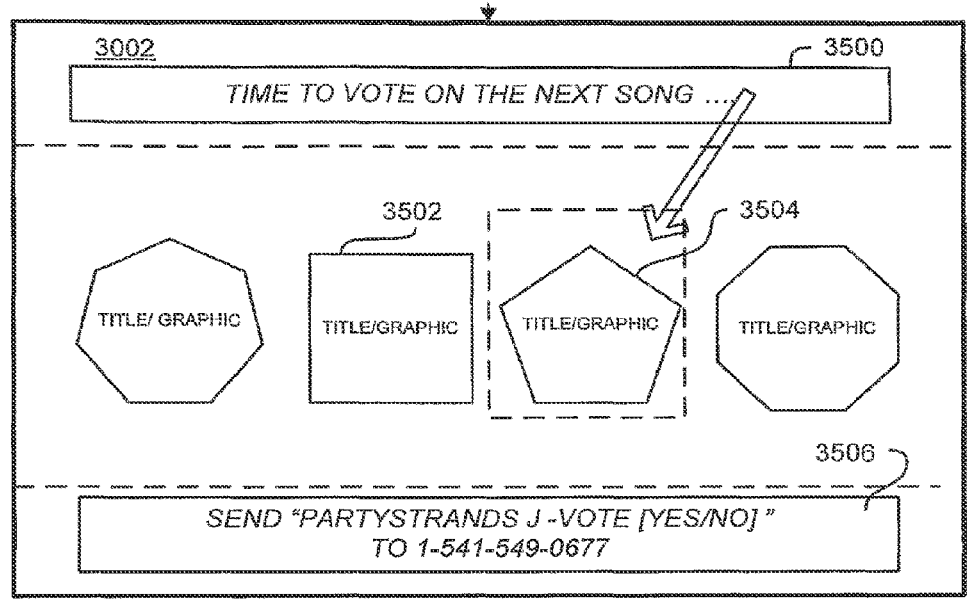

FIG. 35 introduces the concept of voting by the guests at a venue. Here, a play list 3502 is displayed in the central region of the display screen 3002. In this case, the currently playing song might be 3502, while 3504 is identified as the next song proposed to be played by the algorithm that is generating the play stream. In the upper region of the display screen, message 3500 invites the guests to vote on the next song. In the lower portion of the display screen, message 3506 provides instructions for interested guests to vote on the next song by sending an SMS message to a predetermined gateway, as noted above.

FIG. 36 shows a message 3600 reminding the guests that they have a limited time left to cast their vote on the proposed song 3504. Optionally, real time voting results 3604 can be displayed as the votes come in. FIG. 36 also shows a welcome message 3602, reflecting that a new guest recently logged in. The track currently playing is also identified in a message 3606 in the lower region of the display screen (song title 3608).

Figure 37:
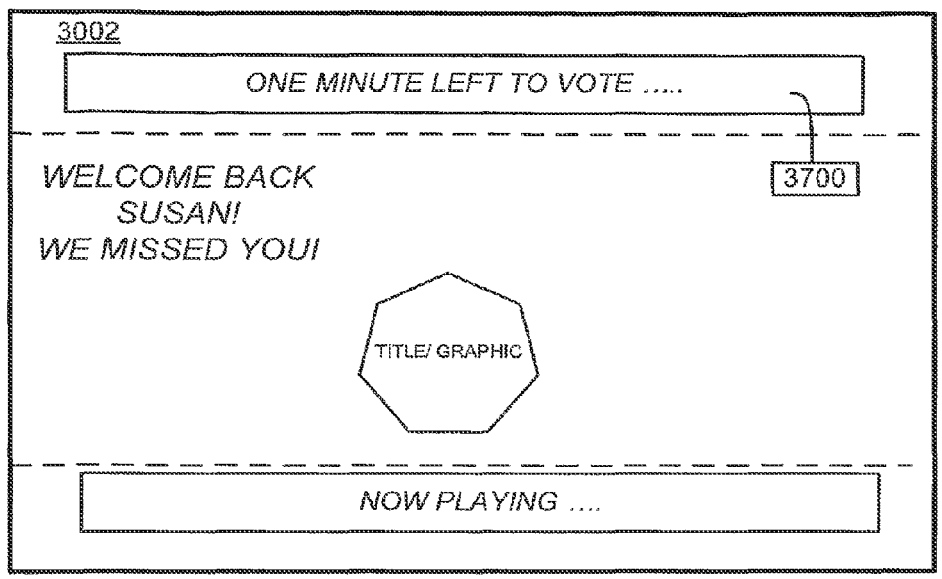
Figure 38:
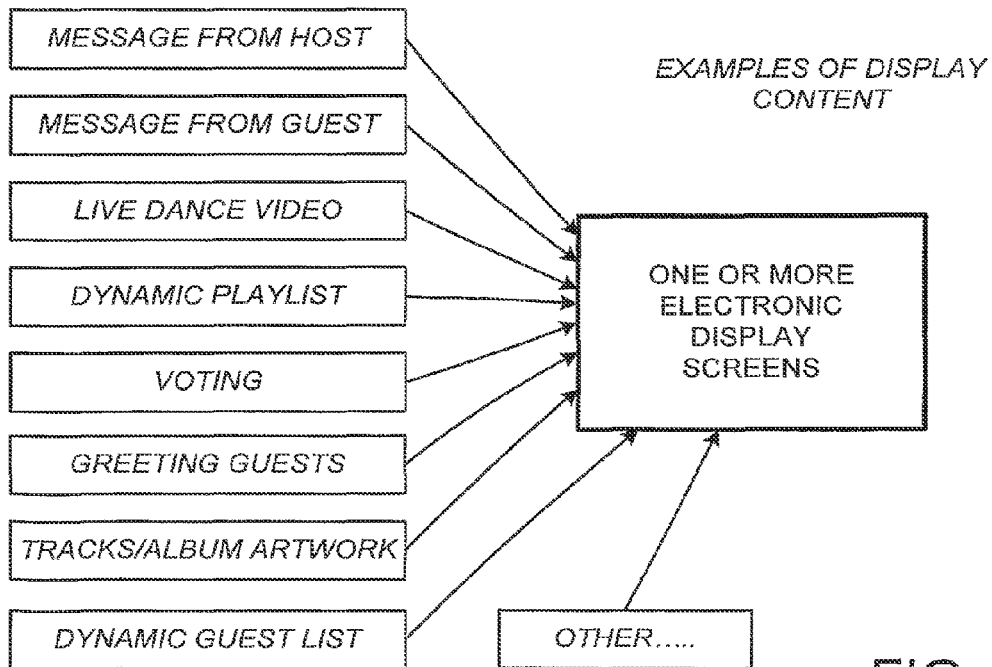
FIG. 38 is a simplified diagram that summarizes some examples of venue display screen content.
Figure 39:
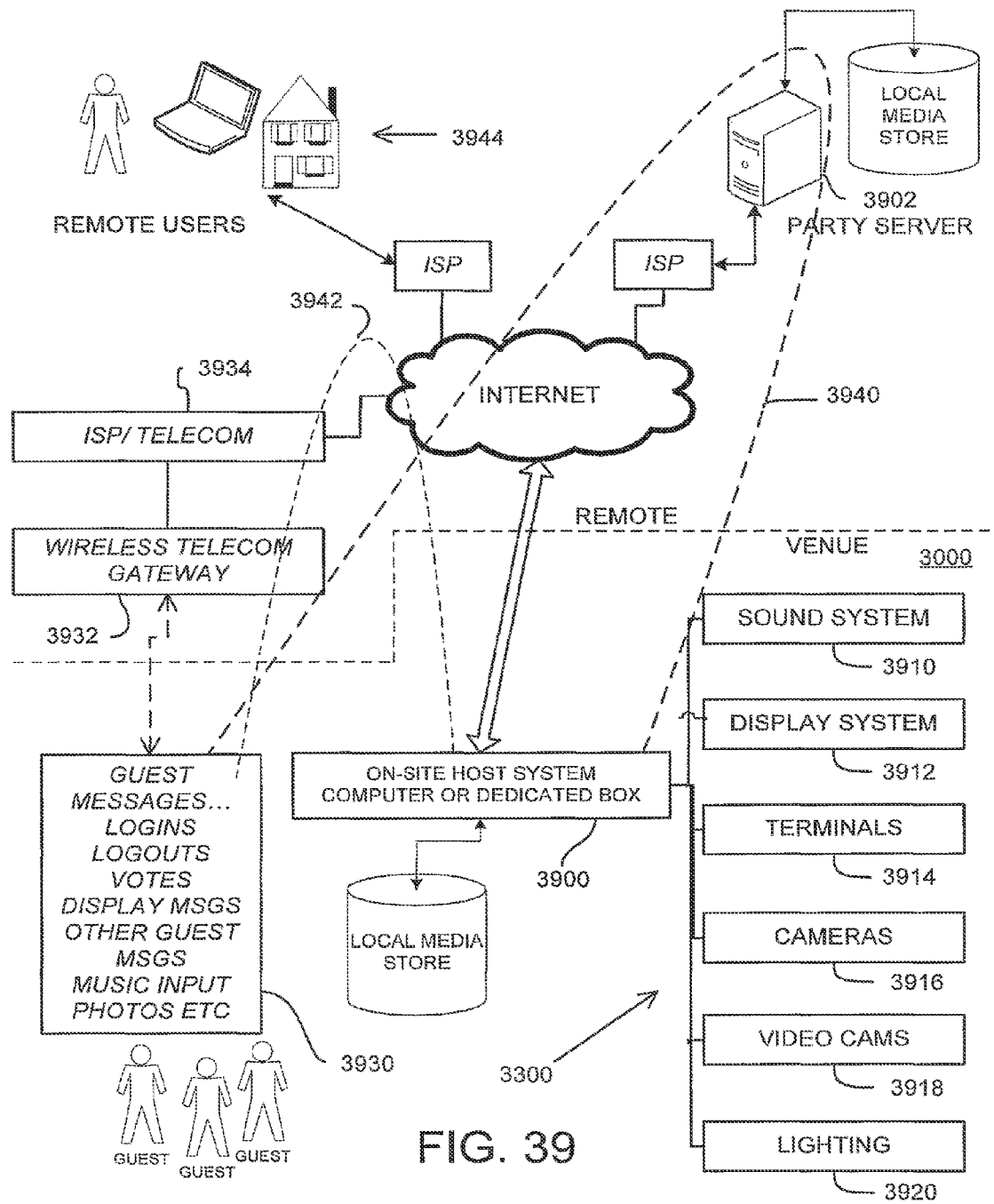
FIG. 39 is a simplified diagram illustrating one example of connections and dataflow paths involved in implementing dynamic interactive entertainment at a venue.

In FIG. 37, there is an additional message 3700 again reminding the guests of the remaining time to vote. It should be noted that the various screen display examples discussed above are merely illustrative. The other arrangements can be used for displaying the content and described above, or similar content. Preferably, the actual screen displays are colorful, animated and frequently changed. The reader will appreciate that the screen display, and the selection of music playing at the venue, are driven by the users who are logged into that venue. FIG. 38 summarizes some of the types of content that can be displayed at the venue. These were mentioned earlier and will not be repeated here, as they are apparent in the drawing figure. Referring now to FIG. 39, it shows a simplified diagram illustrating one example of the principal connections and data flow paths involved in implementing dynamic interactive entertainment at a venue in accordance with aspects of the present invention. In FIG. 39, a horizontal dash line divides the components (and people) located at the venue 3000, shown on the lower half of the figure, from the equipment and people that are remote from the venue (shown above the horizontal dash line).

Near the center of the figure, an on-site host system 3900 is shown. This can be a conventional computer or a special purpose computer dedicated to the purposes described herein. The host system 3900 executes a computer program, namely an interactive venue application, to carry out the functions described herein, i.e. to manage a party session as described. The application may be installed locally or provided in a client-server implementation with respect to the party server 3902. In a presently preferred embodiment, the host system 3900 is connected to the remote party server 3902 in any event, as further described below. It can be so connected via the Internet, as is illustrated. The host system 3900 preferably controls a venue sound system 3910 to play the selections in accordance with the play stream generated by the software algorithms as described. The host system 3900 is also connected to drive a display system 3912 which includes one or more display screens 3002 as described above. The host system 3900 preferably is also coupled to one or more terminals 3914 which are located at the venue. Such terminals, or kiosks, can provide various functions. For example:

1. A user who may not have a cell phone available can use the terminal to log in to the venue.

2. A user can use the terminal to access a remote Web site where she may update one or more play lists, thereby indirectly adjusting her preferences profile.

3. A terminal or kiosk could be used to download a selected music track to a personal device or player. For example, a guest might especially like one particular track that was recently played at the venue, and may decide to buy it at that time. The kiosk may be programmed to assist in that effort by displaying the play list that was played at the venue up to that time. Some online services may provide free media downloads.

4. The kiosk could be used to send a message to the public display or to upload a photo, video or other content for use potentially in the public display.

5. The kiosk could be used for voting on upcoming selections.

6. The kiosk could be used to access a music site on the Internet to search for music to then input to the local venue system. This input would not be received and then played as in a conventional "request" but instead would be input as an update to that particular user's profile which in turn will change how that guest influences the ongoing selection of tracks to be played at the venue.

The host system 3900 can also be coupled to one or more cameras 3916 as noted earlier, and/or one or more video cameras 3918 for a similar purpose. A lighting control system 3920 may also be interfaced to the host system 3900 in some applications to coordinate the venue lighting system with the music being played.

In FIG. 39, a box 3930 summarizes examples of the types of messages that guests can send, preferably using SMS or similar messaging system, for input to the host system 3900. In a presently preferred embodiment, the messages are received at a wireless telecom gateway 3932 and then routed via 3934 to the party server 3902. The party server 3902 processes these messages as appropriate and passes information down to the host system 3900, as indicated by a dash line 3940. In an alternative embodiment, the messages may be routed directly to a "standalone" configuration of host system 3900. This routing is indicated by dash line 3942.

FIG. 39 also illustrates remote users 3944 who may be at home or at any other venue where they have access to a computer or wireless device that enables them to communicate via the Internet. The remote users 3944 can communicate with the party server 3902 to log into the venue/host system 3900 prior to arrival. Or, a remote user might wish to see a record of the venue play stream and other interactions by accessing a venue Web page, provided by the party server 3902. In other words, another aspect of the present invention provides for interaction between the on-site venue system and a home or other remote user mediated by a Web site. In the presently preferred embodiment, after joining the party (logging in), guests receive an SMS invitation to go to the party server Web site and review the party at their convenience. Content that appears on the venue's party display system is sent to the party server Web page, and associated with the day of the party. This information may include unique identifiers for all music tracks played, nicknames and avatars of guests, and user-generated party content, such as messages and pictures.

Guests can sign up as "PartyStrands" members (Web site community) to add comments to the venue Web page, and send messages to other PartyStrands members listed as attendees at the party. In addition, PartyStrands members/guests may have their own PartyStrands/personal Web pages from which they can receive and send messages to other members/guests.

As noted above with regard to FIG. 34, the system can enable one guest to send a personal message to another guest at the party. When a message is sent, a "message sent" screen can appear on the party display system. The screen display does not include the message content. A guest who receives a personal message can optionally reply via the party server (3902) system. In a presently preferred embodiment, this functionality is implemented through SMS.

Figure 40:
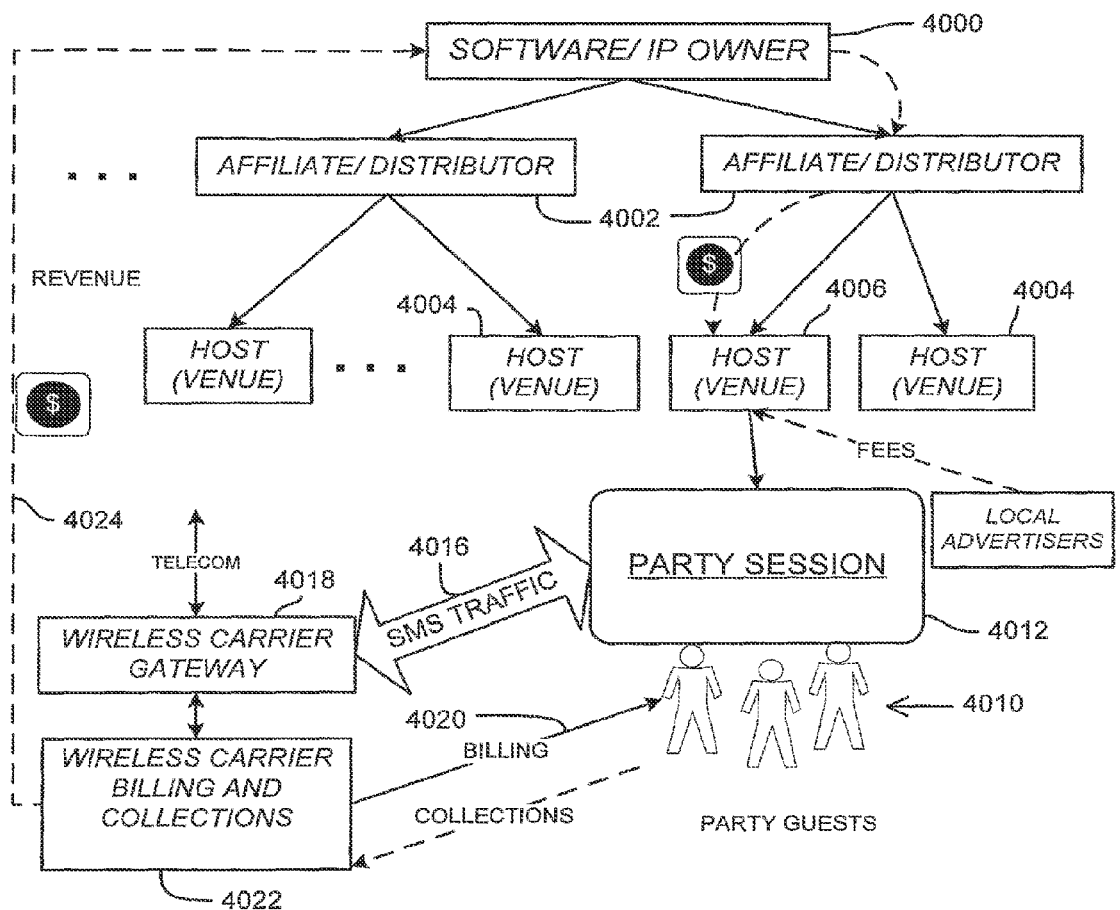
FIG. 40 is a simplified diagram illustrating one example of software distribution, licensing and revenue sharing business methods in accordance with one embodiment of the present invention.

FIG. 40 is a simplified schematic diagram illustrating one example of a business method in accordance with the present invention. In general, this business method seeks to reward venues (hosts) by providing a share of premium SMS and MMS revenues generated when the hosts use the software application to implement a party session as described above. Specifically, venue hosts will receive a payment each time they initiate a party session and guests interact via SMS and/or MMS in connection with that session.

Referring to FIG. 40, an entity 4000 shown at the top may be the developer or owner of computer software for implementing aspects of the present invention, and, in any event, is the owner, agent or licensee of the owner of the intellectual property associated with the technologies that are brought to bear in building and using an interactive entertainment system as described herein. Those technologies where they were described in detail earlier were summarized briefly with reference to FIG. 29. In accordance with one example of a business model, in accordance with the present invention, the software/IP owner 4000 distributes an interactive venue application which is executable on a host system (3900 in FIG. 39) to implement an interactive entertainment session at a venue (aka a "party") consistent with the foregoing description. The IP owner 4000 may distribute such software through one or more affiliates or distributors 4002. The affiliates, in turn, redistribute the software application to a plurality of venue hosts 4004, for example.

In the diagram of FIG. 40, one particular host (venue) 4006 is shown as receiving the application via a distributor 4002. Alternatively, a venue host may be able to download the application or otherwise acquire it directly from the IP owner 4000. The host then conducts a session (party) at her venue, as described previously, involving a number of party guests 4010 who attend the party session reference number 4012. As discussed above, the guests in attendance have various opportunities to interact with the host and/or with each other via SMS and/or MMS during that session. This is shown as "SMS traffic" 4016.

The SMS traffic is routed through a wireless carrier gateway 4018 as discussed above. The wireless carrier handling that traffic will in due course render billings 4020 to the guests who send the messages. Those party guests, in turn, will render payment (either directly or through their home carrier, etc.), to the wireless carrier billing and collections facility 4022. In one illustrative embodiment, a portion of that revenue or, more simply, an amount of money that is based upon the number of such messages, is paid by the wireless carrier to the IP owner 4000 as indicated by dash line 4024. The IP owner 4000 may distribute a portion of that revenue to the affiliate 4002 who distributed the software and otherwise supports the corresponding venue host 4006. If the host 4006 acquired the software directly from the IP owner 4000, it may receive revenue directly from the IP owner 4000, again preferably based upon the number of messages originating at the party session conducted by that host.

This business model in various implementation allows broad and potentially free distribution of the interactive venue application software, while encouraging businesses (venues) who receive the application to promote its use, because they will share in revenue generated from appropriate use of the software. As noted, in some embodiments, the application software may be distributed through an affiliate. Affiliates may be paid for each copy of the software installed, or for each party session conducted by a host or at a venue to which they distributed the software. This business model encourages distribution of the software, which may be free, but also encourages affiliates to stay in touch with and support their clients (venues) to promote product use. In a presently preferred model, the affiliate would also receive a revenue share based on the number of SMS and MMS messages or based on the revenues generated by that message.

Recommender Example

The following section provides a detailed description of one example or implementation of recommender technology that can be used to provide individual mediaset recommendations. In addition, this recommender technology can be applied to groups of users as discussed above. For example, in the discussion above with reference to FIG. 2, a system provides a recommended mediaset for each user using a recommender engine (204, 212, and 220, respectively) that processes user tastes (mediasets 202, 210, and 218) to produce recommended mediasets 206, 214, and 222. One embodiment of such a recommender engine is described next. Others, for example the Yahoo! music recommender could be used.

By way of background, new technologies combining digital media item players with dedicated software, together with new media distribution channels through computer networks (e.g., the Internet) are quickly changing the way people organize and play media items. As a direct consequence of such evolution in the media industry, users are faced with a huge volume of available choices that clearly overwhelm them when choosing what item to play in a certain moment. This overwhelming effect is apparent in the music arena, where people are faced with the problem of selecting music from very large collections of songs. However, in the future, we might detect similar effects in other domains such as music videos, movies, news items, etc.

In general, the following disclosure is applicable to any kind of media item that can be grouped by users to define "mediasets". For example, in the music domain, these mediasets are called playlists. Users put songs together in playlists to overcome the problem of being overwhelmed when choosing a song from a large collection, or just to enjoy a set of songs in particular situations. For example, one might be interested in having a playlist for running, another for cooking, etc.

Different approaches can be adopted to help users choose the right options with personalized recommendations. One kind of approach is about using human expertise to classify the media items and then use these classifications to infer recommendations to users based on an input mediaset. For instance, if in the input mediaset the item x appears and x belongs to the same classification as y, then a system could recommend item y based on the fact that both items are classified in a similar cluster. However, this approach requires an incredibly huge amount of human work and expertise. Another approach is to analyze the data of the items (audio signal for songs, video signal for video, etc) and then try to match users preferences with the extracted analysis. This class of approaches is yet to be shown effective from a technical point of view.

Our technology instead leverages the subjective judgment of a large collection of users, as reflected in their playlists, to make recommendations. Thus we address the challenge of assisting users in building their mediasets, or simply discovering new music selections, by recommending media items that go well together with an initial (or input) mediaset. The recommendation is computed using metrics among the media items of a knowledge base of the system. This knowledge base comprises collections of mediasets from a community of users. (As explained below, a mediaset is not a collection of media items or content. Rather, it is a list of such items, and may include various metadata.) Preferably, the methods of the present invention are implemented in computer software.

In commercial applications, features of the present technology can be deployed in various ways. Recommender services can be provided, for example, to remote users of client computing machines via a network of almost any kind, wired or wireless. Here we use "computing machines" to include traditional computers, as well as cell phones, PDA's, portable music players etc. The knowledge base of the system, a database, can be local or remote from the user. It may be at one location or server, or distributed in various ways. As noted, the recommender engine can be applied to a group of users in connection with forming a "collective playlist," i.e., a list of media items that a group of users probably will like.

The recommender technology in one aspect embodies a system for identifying a set of media items in response to an input set of media items. The system requires a knowledge base consisting of a collection of mediasets. Mediasets are sets of media items, which are naturally grouped by users. They reflect the users subjective judgments and preferences. The mediasets of the knowledge base define metrics among items. Such metrics indicate the extent of correlation among media items in the mediasets of the knowledge base. Various different metrics between and among media items can be generated from the knowledge base of mediasets. Such metrics can include but are not limited to the follow examples:

a) Pre-concurrency (for ordered mediasets) between two items is computed as the number of times a given item precedes the other item in the mediasets of the knowledge base.

b) Post-concurrency (for ordered mediasets) between two items is computed as the number of times an item follows another item in the mediasets of the knowledge base.

c) Co-concurrency between two items is computed as the number of times the items appear together in a mediaset.

d) Metadata similarities may be computed as well by considering keywords associated with the media items such as artist, actor, date, etc.

e) Combinations of the previous metrics can be useful.

f) Combinations of the previous metrics applying transitivity.

Such metrics can be represented in an explicit form that directly associates media items with other media items. For each media item of the input set, the system retrieves n media items with highest metrics. These media items are called candidates. Then, the recommended set of media items is a subset of the candidates that maximize an optimization criterion. Such criterion can be simply defined using the metrics of the knowledge base of the system. Furthermore, such criterion can also include filters including but not limited to:
 a) Filters that the user expresses to focus the recommendation only on a determined type of items.
 b) Filters that the user expresses to focus the recommendations on items that meet certain keyword-based criteria, such as a specific artist/s, year/s, genre/s, etc.
 c) Filters that personalize the recommendations to the user. This kind of filtering includes recommending only items that the user knows about, or only items that the user does not know about, etc.

Recommender Definitions

A recommender system preferably comprises or has access to a knowledge base which is a collection of mediasets. A mediaset is a list of media items that a user has grouped together. A media item can be almost any kind of content; audio, video, multi-media, etc., for example a song, a book, a newspaper or magazine article, a movie, a piece of a radio program, etc. Media items might also be artists or albums. If a mediaset is composed of a single type of media items it is called a homogeneous mediaset, otherwise it is called a heterogeneous mediaset. A mediaset can be ordered or unordered. An ordered mediaset implies a certain order with respect to the sequence in which the items are used by the user. (Depending on the nature of the item, it will be played, viewed, read, etc.) Note again that a mediaset, in a preferred embodiment, is a list of media items, i.e. meta data, rather than the actual content of the media items. In other embodiments, the content itself may be included. Preferably, a knowledge base is stored in a machine-readable digital storage system. It can employ well-known database technologies for establishing, maintaining and querying the database.

In general, mediasets are based on the assumption that users group media items together following some logic or reasoning, which may be purely subjective, or not. For example, in the music domain, a user may be selecting a set of songs for driving, hence that is a homogeneous mediaset of songs. In this invention, we also consider other kinds of media items such as books, movies, newspapers, and so on. For example, if we consider books, a user may have a list of books for the summer, a list of books for bus riding, and another list of books for the weekends. A user may be interested in expressing a heterogeneous mediaset with a mix of books and music, expressing (impliedly) that the listed music goes well with certain books.

A set of media items is not considered the same as a mediaset. The difference is mainly about the intention of the user in grouping the items together. In the case of a mediaset the user is expressing that the items in the mediaset go together well, in some sense, according to her personal preferences. A common example of a music mediaset is a playlist. On the other hand, a set of media items does not express necessarily the preferences of a user. We use the term set of media items to refer to the input of the system of the invention as well as to the output of the system.

A metric M between a pair of media items i and j for a given knowledge base k expresses some degree of relation between i and j with respect to k. A metric may be expressed as a "distance," where smaller distance values (proximity) represent stronger association values, or as a similarity, where larger similarity values represent stronger association values. These are functionally equivalent, but the mathematics are complementary. The most immediate metric is the co-concurrency (i, j, k) that indicates how many times item i and item j appear together in any of the mediasets of k. The metric pre-concurrency (i, j, k) indicates how many times item i and item j appear together but i before j in any of the mediasets of k. The metric post-concurrency (i, j, k) indicates how many times item i and item j appear together but only i after j in any of the mediasets of k. The previous defined metrics can also be applied to considering the immediate sequence of i and j. So, the system might be considering co/pre/post-concurrencies metrics but only if items i and j are consecutive in the mediasets (i.e., the mediasets are ordered). Other metrics can be considered and also new ones can be defined by combining the previous ones.

A metric may be computed based on any of the above metrics and applying transitivity. For instance, consider co-concurrency between item i and j, co(i,j), and between j and k, co(j,k), and consider that co(i,k)=0. We could create another metric to include transitivity, for example d(i,k)=1/co(i,j)+1/co(j,k). These type of transitivity metrics may be efficiently computed using standard branch and bound search algorithms. This metric reveals an association between items i and k notwithstanding that i and k do not appear within any one mediaset in K.

A matrix representation of metric M, for a given knowledge base K can be defined as a bidimensional matrix where the element M(i,j) is the value of the metric between the media item i and media item j.

A graph representation for a given knowledge base k, is a graph where nodes represent media items, and edges are between pairs of media items. Pairs of media items i, j are linked by labeled directed edges, where the label indicates the value of the similarity or distance metric M(i,j) for the edge with head media item i and tail media item j.

Figure 42:
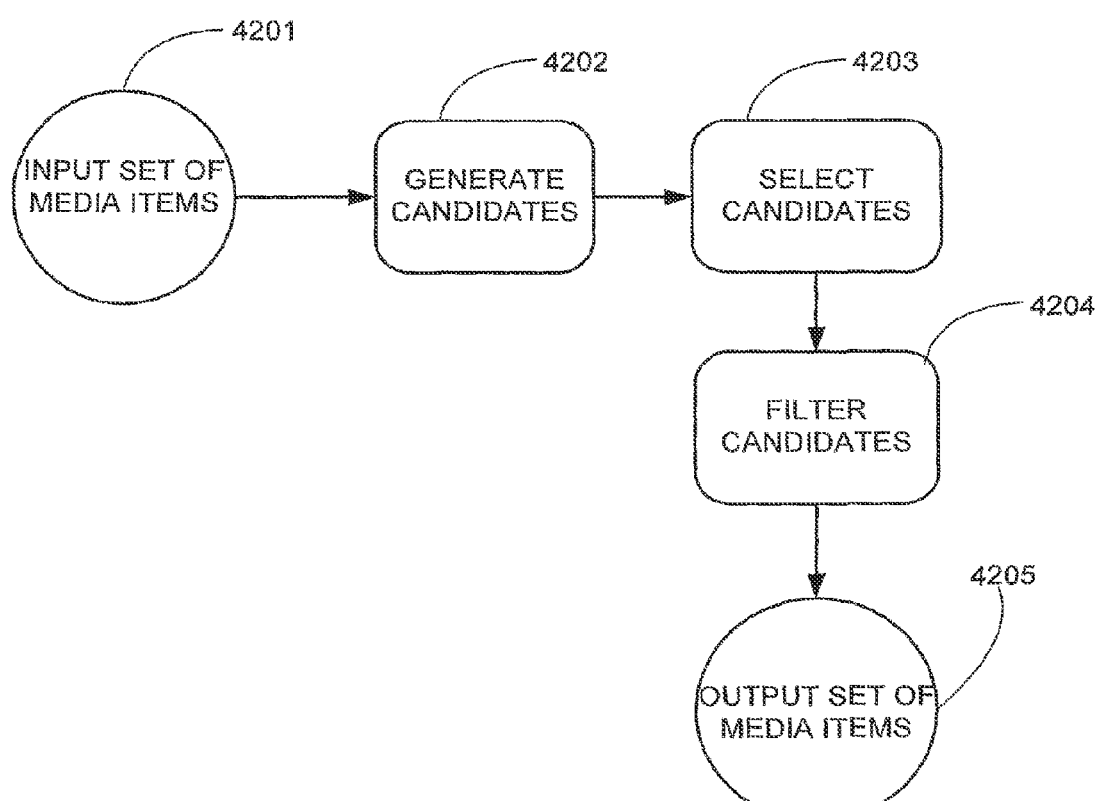
FIG. 42 is a block diagram of one method for selecting a set of media items corresponding to an Initial set of media items in accordance with an embodiment of the invention.

One embodiment of the present technology is illustrated by the flow diagram shown in FIG. 42. This method accepts an input set 4201 of media items. Usually, this is a partial mediaset, i.e. a set of media items (at lease one item) that a user grouped together as a starting point with the goal of building a mediaset. A first collection of candidate media items most similar to the input media items is generated by process 4202 as follows.

As a preliminary matter, in a presently preferred embodiment, a pre-processing step is carried out to analyze the contents of an existing knowledge base. This can be done in advance of receiving any input items. As noted above, the knowledge base comprises an existing collection of mediasets. A knowledge base includes a plurality of mediasets; each mediaset comprising at least two media items. The presence of media items within a given mediaset creates an association among them.

Pre-processing analysis of a knowledge base can be conducted for any selected metric. In general, the metrics reflect and indeed quantify the association between pairs of media items in a given knowledge base. The process is described by way of example using the co-concurrency metric mentioned earlier. For each item in a mediaset, the process identifies every other item in the same mediaset, thereby defining all of the pairs of items in that mediaset. This process is repeated for every mediaset in the knowledge base, thus every pair of items that appears in any mediaset throughout the knowledge base is defined.

Next, for each pair of media items, a co-concurrency metric is incremented for each additional occurrence of the same pair of items in the same knowledge base. For example, if a pair of media items, say the song "Uptown Girl" by Billy Joel and "Hallelujah" by Jeff Buckley, appear together in 42 different mediasets in the knowledge base (not necessarily adjacent one another), then the co-concurrency metric might be 42 (or some other figure depending on the scaling selected, normalization, etc. In some embodiments, this figure or co-concurrency "weight" may be normalized to a number between zero and one.

Figure 41A:
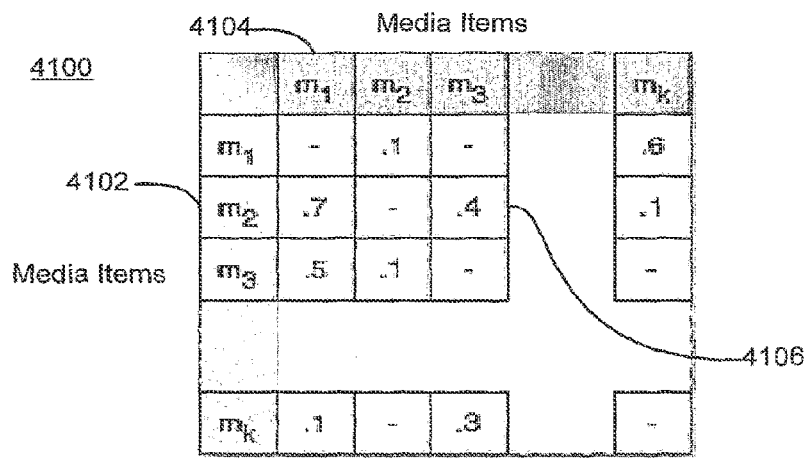
FIG. 41A is a representation in matrix form of a metric describing the similarity values between collections of media items.

Referring now to FIG. 41A, matrix 4100 illustrates a useful method for storing the metric values or weights for any particular metric. Here, individual media items in the knowledge base, say $m_1, m_2, m_3 \ldots m_k$ are assigned corresponding rows and columns in the matrix. In the matrix, the selected metric weight for every pair of items is entered at row, column location x,y corresponding to the two media items defining the pair. In FIG. 41A, the values are normalized.

Now we assume an input set of media items is received, step 4201. Referring again to process step 4202, a collection of "candidate media items" most similar to the input media items is generated, based on a metric matrix like matrix 4100 of FIG. 41A. For instance, for each media item, say (item $m_2$) in the input set 4201, process 4202 could add to a candidate collection of media items every media item ($m_1, m_3 \ldots m_k$ in FIG. 41A) that has a non-zero similarity value, or exceeds a predetermined threshold value, in the corresponding row 4102 of metric matrix 4100 for the media item $m_2$, labeling each added media item with the corresponding metric value (0.7, 0.4 and 0.1, respectively). See the edges in the graph of FIG. 41B. For each media item in the input set of size m, process 4202 selects n media items as candidates; thus the aggregation of all the candidates produces a set of at most m*n media items.

In one embodiment, a process 4203 receives the candidate set from process 4202 which contains at the most m*n media items. This component selects p elements from the m*n items of the candidate set. This selection can be done according to various criteria. For example, the system may consider that the candidates should be selected according to the media item distribution that generated the candidate set. This distribution policy may be used to avoid having many candidates coming from very few media items. Also, the system may consider the popularity of the media items in the candidate set. The popularity of a media item with respect to a knowledge base indicates the frequency of such media item in the mediasets of the knowledge base.

Finally, from the second collection of [p] media items, a third and final output set 4205 of some specified number of media items is selected that satisfy any additional desired external constraints by a filter process 4204. For instance, this step could ensure that the final set of media items is balanced with respect to the metrics among the media sets of the final set. For example, the system may maximize the sum of the metrics among each pair of media items in the resulting set. Sometimes, the system may be using optimization techniques when computation would otherwise be too expensive. Filtering criteria such as personalization or other preferences expressed by the user may also be considered in this step. In some applications, because of some possible computational constraints, these filtering steps may be done in the process 4203 instead of 4204. Filtering in other embodiments might include genre, decade or year of creation, vendor, etc. Also, filtering can be used to demote, rather then remove, a candidate output item.

Figure 41B:
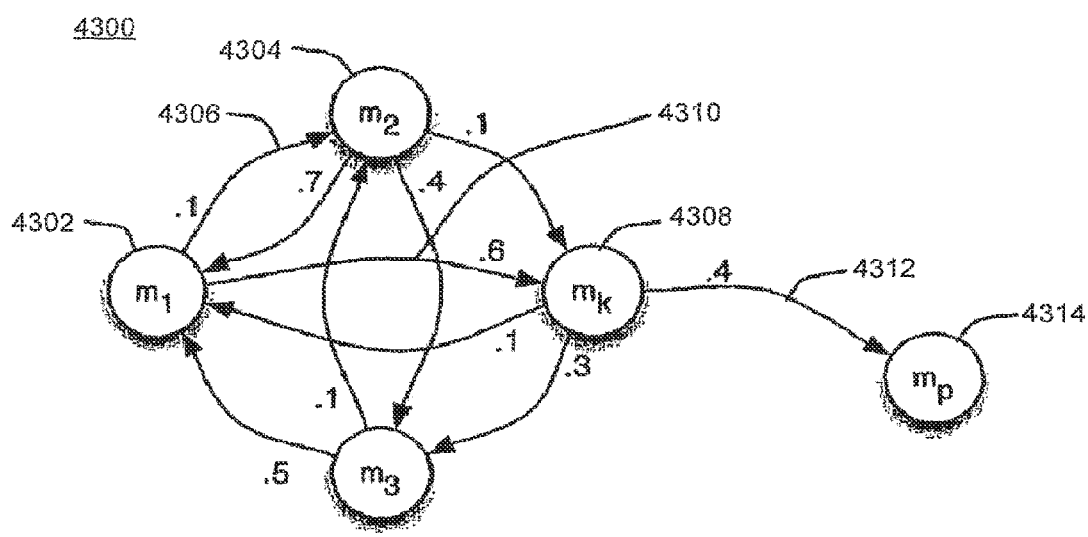
FIG. 41B provides a weighted graph representation for the associations within a collection of media items. Each edge between two media items is annotated with a weight representing the value of the metric for the similarity between the media items.

In another embodiment or aspect of the invention, explicit associations including similarity values between a subset of the full set of media items known to the system, as shown in graph form in FIG. 41B, may be used. FIG. 41B shows a portion of a directed graph 4300, reflecting various media items (4302 or $m_1$, 4304 or $m_2$, 4308 or $m_k$ etc.) Edge 4306 shows the similarity value (0.1) from $m_1$ to $m_2$. To illustrate, if the similarity value between a first media item 4302, generally denoted below by the index i, and a second media item, say 4314, generally denoted below by the index j, is not explicitly specified, an implicit similarity value can instead be derived by following a directed path such as that represented by edges 4310 and 4312 from the first media item to an intermediate item, and finally to the second media item of interest, in this example item $m_p$. Any number of intermediate items can be traversed in this manner, which we call a transitive technique. The list of similarity values M(i, i+1), M(i+1, i+2), ..., M(i+k, j) between pairs of media items along this path through the graph are combined in a manner such that the resulting value satisfies a definition of similarity between media item i and media item j appropriate for the application. For example, the similarity M(i,j) might be computed as:

$$M(i,j)=\min\{M(i,i+1),M(i,i+2),\ldots,M(i+k,j)\}$$

or $$M(i,j)=M(i,i+1)*M(i,i+2)*\ldots*M(i+k,j)$$

Other methods for computing a similarity value M(i,j) for the path between a first media item i and a second, non-adjacent media item j where the edges are labeled with the sequence of similarity values M(i, i+1), M(i+1, i+2), ..., M(i+k, j) can be used. From the user standpoint, this corresponds to determining an association metric for a pair of items that do not appear within the same mediaset.

The above description fully discloses the invention including preferred embodiments thereof. Without further elaboration, it is believed that one skilled in the art can use the preceding description to utilize the invention to its fullest extent. Therefore the examples and embodiments disclosed herein are to be construed as merely illustrative and not a limitation of the scope of the present invention in any way.

It will be obvious to those having skill in the art that many changes may be made to the details of the above-described embodiments without departing from the underlying principles of the invention. Therefore, it is to be understood that the invention is not to be limited to the specific embodiments disclosed and that modifications and other embodiments are intended to be included within the scope of the appended claims. For example, one of ordinary skill in the art will understand various aspects of the embodiments disclosed herein could be used in any system for building and sharing a composite playlist from collective group tastes on multiple media playback devices.

The scope of the present invention should, therefore, be determined only by the following claims.

We claim:

1. A computer-implemented method comprising:
    obtaining media library data for each user in a group, the media library data including media item playcount data, genres, and a frequency that each media item appears in the user's playlists;
    computing a frequency distribution of genres for the group, wherein the frequency distribution describes a frequency that each genre occurs in each of the user's media library data and is used to adjust an aggregated mediaset;
    ranking media items described in each user's media library data based on a number of play counts for each media item and based on the frequency that each media item appears in the user's playlists;
    selecting media items from each user's media library whose ranking exceeds a predetermined threshold value for inclusion in a recommended mediaset for each user;
    aggregating recommended mediasets from each of the users in the group into the aggregated mediaset;

dynamically re-adjusting, upon a user joining or leaving the group, which media items are included in the aggregated mediaset to result in a re-adjusted aggregated mediaset, wherein a frequency distribution of genres in the re-adjusted aggregated mediaset approximates the computed frequency distribution of genres for the group; and providing the re-adjusted aggregated mediaset to the users communicating with the system.

2. The computer-implemented method of claim 1, wherein a user is selected for inclusion into the group by an electronic device communicating in an ad-hoc network of network-connected devices.

3. The computer-implemented method of claim 1, further comprising:

removing the user's recommended mediaset from the re-adjusted aggregated mediaset upon the user leaving the group.

4. The computer-implemented method of claim 1, further comprising:

diversifying the aggregated mediaset by redistributing the media items within the aggregated mediaset such that no individual users taste dominates a segment of the aggregated mediaset.

5. The computer-implemented method of claim 1, further comprising:

diversifying the aggregated mediaset by replacing media items within the aggregated mediaset with additional media items not provided by any members in the group according to a diversifying criteria.

6. The computer-implemented method of claim 1, further comprising:

identifying an evolving optimal genre distribution for the group;

determining a list of relevant media items to fulfill the evolving optimal genre distribution for the group; and adding one or more of the relevant media items to the aggregated mediaset to fulfill the evolving optimal genre distribution for the group.

7. The computer-implemented method of claim 1, wherein the frequency distribution of genres for the group is re-computed upon a new user entering the group.

8. The computer-implemented method of claim 1, wherein the selecting a threshold number of media items from each user's media library comprises:

recommending a mediaset for each user wherein the recommended mediasets comprise new music not included in the user's media library data.

9. The computer-implemented method of claim 1, wherein the adjusting which media items are included in the aggregated mediaset comprises:

removing media items from the aggregated mediaset.

10. The computer-implemented method of claim 1, wherein the adjusting which media items are included in the aggregated mediaset comprises:

adding media items to the aggregated mediaset.

11. A system comprising:

a processor; and a computer-readable storage medium including instructions which, when executed by the processor, cause the processor to:

obtain media library data for each user in a group, the media library data including media item playcount data, genres, and a frequency that each media item appears in the user's playlists;

compute a frequency distribution of genres for the group, wherein the frequency distribution describes a frequency that each genre occurs in each of the user's media library data and is used to adjust an aggregated mediaset;

rank media items described in each user's media library data based on a number of play counts for each media item and based on the frequency that each media item appears in the user's playlists;

select media items from each user's media library whose ranking exceeds a predetermined threshold value for inclusion in a recommended mediaset for each user;

aggregate recommended mediasets from each of the users in the group into the aggregated mediaset;

dynamically re-adjust, upon a user joining or leaving the group, which media items are included in the aggregated mediaset to result in a re-adjusted aggregated mediaset, wherein a frequency distribution of genres in the re-adjusted aggregated mediaset approximates the computed frequency distribution of genres for the group; and provide the re-adjusted aggregated mediaset to the users communicating with the system.

12. The system of claim 11, wherein the instructions further cause the processor to:

diversify the aggregated mediaset by redistributing the media items within the aggregated mediaset such that no individual users taste dominates a segment of the aggregated mediaset.

13. The system of claim 11, wherein the instructions further cause the processor to:

diversify the aggregated mediaset by replacing media items within the aggregated media with additional media items not provided by any members in the group according to a diversifying criteria.

14. The system of claim 11, wherein the instructions further cause the processor to:

identify an evolving optimal genre distribution for the group;

determine a list of relevant media items to fulfill the evolving optimal genre distribution for the group; and add one or more of the relevant media items to the optimized aggregated mediaset to fulfill the evolving optimal genre distribution for the group.

15. The system of claim 11, wherein the frequency distribution of genres for the group is re-computed upon a new user entering the group.

16. The system of claim 11, wherein the instructions causing the processor to select a threshold number of media items from each user's media library further cause the processor to:

recommend a mediaset for each user wherein the mediasets recommended comprise new music not included in the user's media library data.

17. A non-transitory computer-readable storage medium including instructions which, when executed by a processor, cause the processor to:

obtain media library data for each user in a group, the media library data including media item playcount data, genres, and a frequency that each media item appears in the user's playlists;

compute a frequency distribution of genres for the group, wherein the frequency distribution describes a frequency that each genre occurs in each of the user's media library data and is used adjust an aggregated mediaset;

rank media items described in each user's media library data based on a number of play counts for each media item and based on the frequency that each media item appears in the user's playlists;

select media items from each user's media library whose ranking exceeds a predetermined threshold value for inclusion in a recommended mediaset for each user;

aggregate recommended mediasets from each of the users in the group into the aggregated mediaset;

dynamically re-adjust, upon a user joining or leaving the group, which media items are included in the aggregated mediaset to result in a re-adjusted aggregated mediaset, wherein a frequency distribution of genres in the re-adjusted aggregated mediaset approximates the computed frequency distribution of genres for the group; and provide the re-adjusted aggregated mediaset to the users communicating with the system.

18. The non-transitory computer-readable storage medium of claim 17, wherein a user is selected for inclusion into the group by an electronic device communicating in an ad-hoc network of network-connected devices.

19. The non-transitory computer-readable storage medium of claim 17, wherein the instructions further cause the processor to:

remove the user's recommended mediaset from the aggregated mediaset upon the user leaving the group.

20. The non-transitory computer-readable storage medium of claim 17, wherein the instructions further cause the processor to:

diversify the aggregated mediaset by redistributing the media items within the aggregated mediaset such that no individual users taste dominates a segment of the aggregated mediaset.

21. The non-transitory computer-readable storage medium of claim 17, wherein the instructions further cause the processor to:

diversify the aggregated mediaset by replacing media items within the aggregated media with additional media items not provided by any members in the group according to a diversifying criteria.

22. The non-transitory computer-readable storage medium of claim 17, wherein the instructions further cause the processor to:

identify an evolving optimal genre distribution for the group;

determine a list of relevant media items to fulfill the evolving optimal genre distribution for the group; and add one or more of the relevant media items to the optimized aggregated mediaset to fulfill the evolving optimal genre distribution for the group.

23. The computer-implemented method of claim 1, wherein the frequency distribution of genres for the group is re-computed upon a new user entering the group.

24. The non-transitory computer-readable storage medium of claim 17, wherein the instructions causing the processor to select a threshold number of media items from each user's media library further cause the processor to:

recommend a mediaset for each user wherein the mediasets recommended comprise new music not included in the user's media library data.

\* \* \* \* \*